(12) United States Patent
Qin

(10) Patent No.: US 12,174,795 B2
(45) Date of Patent: Dec. 24, 2024

(54) FILE MANAGEMENT METHOD, ELECTRONIC DEVICE, AND COMPUTER-READABLE STORAGE MEDIUM

(71) Applicant: Honor Device Co., Ltd., Shenzhen (CN)

(72) Inventor: Chuan Qin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/553,649

(22) PCT Filed: Apr. 28, 2022

(86) PCT No.: PCT/CN2022/089758
§ 371 (c)(1),
(2) Date: Oct. 2, 2023

(87) PCT Pub. No.: WO2023/015963
PCT Pub. Date: Feb. 16, 2023

(65) Prior Publication Data
US 2024/0184749 A1 Jun. 6, 2024

(30) Foreign Application Priority Data
Aug. 12, 2021 (CN) .......................... 202110926898.5

(51) Int. Cl.
*G06F 16/16* (2019.01)
*G06F 3/04817* (2022.01)
(Continued)

(52) U.S. Cl.
CPC ........ *G06F 16/168* (2019.01); *G06F 3/04817* (2013.01); *G06F 3/0482* (2013.01); *G06F 3/04842* (2013.01)

(58) Field of Classification Search
CPC .. G06F 16/168; G06F 3/04817; G06F 3/0482; G06F 3/04842
See application file for complete search history.

(56) References Cited

U.S. PATENT DOCUMENTS 8,972,464 B2 * 3/2015 Davis ..................... G06F 16/16
707/822
11,068,442 B1 * 7/2021 Meyer ................... G06F 16/358
(Continued)

FOREIGN PATENT DOCUMENTS

CN 105892830 A 8/2016
CN 108563684 A 9/2018
(Continued)

*Primary Examiner* — Etienne P Leroux
(74) *Attorney, Agent, or Firm* — Slater Matsil, LLP

(57) ABSTRACT

This application relates to the field of electronic technologies, and provides a file management method, an electronic device, and a computer-readable storage medium. The method includes: displaying a first interface, where the first interface includes a received first file; receiving a first operation performed by a user on the first file; displaying a second interface when downloading of the first file is completed, where the second interface includes a preview interface of the first file and a first banner notification, and the first banner notification includes a first control; storing the first file in a directory of a destination folder in response to a second operation performed by the user on the first control; displaying a third interface, where the third interface is an interface of a file management application; and displaying the first file in response to a third operation performed by the user on the destination folder.

20 Claims, 56 Drawing Sheets

(51) Int. Cl.
*G06F 3/0482* (2013.01)
*G06F 3/04842* (2022.01)

(56) References Cited

U.S. PATENT DOCUMENTS

| | | |
|---|---|---|
| 11,347,685 B2 | 5/2022 | Zeng et al. |
| 2016/0335282 A1 | 11/2016 | Deshan et al. |
| 2021/0141769 A1* | 5/2021 | Sharma ................ G06F 16/185 |

FOREIGN PATENT DOCUMENTS

| | | |
|---|---|---|
| CN | 110308837 A | 10/2019 |
| EP | 3678031 A1 | 7/2020 |

* cited by examiner

CONT. FROM FIG. 5B

CONT. FROM FIG. 8B

CONT. FROM FIG. 8A

CONT. FROM

FILE MANAGEMENT METHOD, ELECTRONIC DEVICE, AND COMPUTER-READABLE STORAGE MEDIUM

CROSS-REFERENCE TO RELATED APPLICATIONS

This application is a national stage of International Application No. PCT/CN2022/089758 filed on Apr. 28, 2022, which claims priority to Chinese Patent Application No. 202110926898.5 filed on Aug. 12, 2021. The disclosures of both of the aforementioned application are hereby incorporated by reference in their entireties.

TECHNICAL FIELD

This application relates to the field of electronic technologies, and specifically, to a file management method, an electronic device, and a computer-readable storage medium.

BACKGROUND

Generally, people transmit information through different APPs, for example, may send files such as documents, audio, videos, pictures, and installation packages through third-party APPs such as chat APPs and mail APPs.

In a conventional Android system, a path used by a terminal device to store a received file is complex and obscure, and save paths of files received by different APPs may not be the same. Generally, to find a file named "Document 1" received in a chat APP, a user needs to know a default save path of files of the chat APP in the Android system. Then the user operates the terminal device, enters a file management APP, and performs a multi-level search based on the default save path of the chat APP in the Android system.

If the user is a common user and does not know a storage path in Android, it is difficult to find a required file. As a result, it is difficult to find a file, and user experience is poor.

SUMMARY

This application provides a file management method and apparatus, and an electronic device, a chip, a computer-readable storage medium and a computer program product. This makes it convenient for a user to find a received file, and improves user experience.

In a first aspect, a file management method is provided. The method includes:

displaying a first interface, where the first interface includes a received first file; receiving a first operation performed by a user on the first file, where the first operation is used for downloading the first file; displaying a second interface when downloading of the first file is completed, where the second interface includes a preview interface of the first file and a first banner notification, and the first banner notification includes a first control; storing the first file in a directory of a destination folder in response to a second operation performed by the user on the first control, where the destination folder is a folder with custom permissions, and the destination folder is different from a system folder; displaying a third interface, where the third interface is an interface of a file management application APP, and the third interface includes the destination folder and the system folder; and displaying the first file in response to a third operation performed by the user on the destination folder.

The first operation may be an operation of tapping the first file, and a terminal device may download the first file in a chat interface based on the tap operation performed by the user. The first operation may alternatively be an operation in which the user taps a menu of the first file and taps a save button in the menu. The terminal device downloads the first file based on the operation in which the user manually saves the first file. The first operation may alternatively be an operation in which the user taps a link of the first file in a browser. The terminal device triggers saving of the first file after the user taps the link of the first file. The first control may be a button for saving the first file separately, such as "Copy to", "Save as", "Move to", etc. The second operation may be an operation of tapping the first control, or an operation of selecting the first control by double-tapping the first control. The system folder is a default save directory of a file of a third-party APP. The file received by the terminal device through the third-party APP may be saved into a directory of the system folder based on a default path. Generally, a default path of a third-party APP is complex and obscure, and is difficult to be mastered by a common user. The destination folder is different from the system folder. The destination folder and the system folder are displayed on the interface of the file management APP. The user has custom permissions on the destination folder, such as the user may operate in the destination folder to create a new folder, delete a folder, rename a folder, etc., and may alternatively establish a multi-level subdirectory as needed. The destination folder may be named "My Folder", "My Files", or the like. The user may store the first file in a customized path in the destination folder. After opening the interface of the file management APP, the user may find a required file based on the customized path in the destination folder. In the method, file searching may be implemented without requiring the user to master an obscure and complex default path. This makes file searching more convenient and faster, and improves user experience.

Optionally, the method further includes: receiving a fourth operation performed by the user on a second file, where the fourth operation is used for downloading the second file, and the second file is different from the first file; displaying a fourth interface when downloading of the second file is completed, where the fourth interface includes a preview interface of the second file and a second banner notification; and storing the second file in the system folder based on a default path.

The fourth operation may be an operation of tapping the second file. The terminal device downloads the second file based on the tap operation performed by the user. The second operation may alternatively be an operation in which the user taps a menu of the second file and taps a save button in the menu. The terminal device downloads the second file based on an operation in which the user manually saves the second file. If the user does not operate on the second banner notification, the second file may be stored in the system folder based on a default storage path, instead of being stored in the destination folder. The second file is any one of a document, a picture, a video, audio, an installation package, and a compressed package.

Optionally, the first banner notification further includes a second control, and the method further includes: displaying a fifth interface in response to a fifth operation performed by the user on the second control, where the fifth interface includes the preview interface of the first file and a share window, the share window includes icons of a plurality of share objects, and the icons of the plurality of share objects include an icon of a target object; displaying an operation interface of the target object in response to a sixth operation performed by the user on the icon of the target object; and sending the first file to the target object in response to a seventh operation performed by the user on the operation interface of the target object.

The second control is a button that starts a sharing function, such as a button "Share". When the user selects the second control by performing the fifth operation such as tapping or double-tapping on the second control, the terminal device pulls up a sharing service, displays the fifth interface including the share window on the screen, and further displays the preview interface of the first file in a lower layer of the share window. The share window may include the icons of the plurality of share objects, such as an icon of a chat APP, an icon of meeting APP, an icon of a mail APP, an icon of a messaging APP, an icon of a browser APP, an icon of a mobile phone or a tablet, an icon of a printer, an icon of a large-screen device (a TV, a smart screen), an icon of a desktop computer, an icon of Bluetooth, an icon of Wi-Fi, and so on. The user may perform the sixth operation such as tapping or double-tapping a corresponding icon, and select a share object as the target object. Then the terminal device opens the operation interface of the target object, and the user performs the seventh operation on the operation interface to share the first file. The seventh operation varies based on the selected target object. When the target object is a chat APP, the seventh operation is to send a file to a specified object based on a chat interface. When the target object is a mail APP, the seventh operation is to send mail based on a mail sending interface. When the target object is a meeting APP, the seventh operation is to display the preview interface of the first file in a meeting interface and share the desktop or the preview interface with an attendee. When the target object is a printer, the seventh operation is to perform printing on an operation interface of the printer. When the target object is a browser APP, the seventh operation is to view or upload the first file to a server in a browser interface. The terminal device pulls up the share window by the user operating the second control of the first banner notification, and shares the first file to the target object selected by the user, thereby implementing resource sharing and enriching a function of the terminal device. Compared to a process in which the user actively finds the first file and then shares it, the method in which file sharing is implemented by directly pulling up the share window by operating the second control of the first banner notification in this embodiment makes operations more convenient and faster, improves efficiency of resource sharing, and improves user experience.

Optionally, the target object is a target APP, and the terminal device may share the first file to the APP, leading to more rich and diverse resource sharing.

Optionally, the target object is a target device, and the terminal device may share the first file to another device, making resource sharing richer and more diverse.

Optionally, the storing the first file in a directory of a destination folder in response to a second operation performed by the user on the first control includes: displaying a sixth interface in response to the second operation performed by the user on the first control, where the sixth interface includes an interface of a root directory of the destination folder and a first prompt box, and the first prompt box includes a third control; and storing the first file in the root directory of the destination folder in response to an eighth operation performed by the user on the third control.

When the user performs the second operation such as tapping or double-tapping on the first control, the terminal device jumps to the sixth interface including the interface of the root directory of the destination folder and the first prompt box. The first prompt box is used to ask the user whether to store the first file in the destination folder. The first prompt box may include a third control. The third control may be a confirm button, such as "V", or a button displayed as "Confirm". When the user performs the eighth operation such as tapping or double-tapping on the third control, the terminal device stores the first file in the root directory of the destination folder. Optionally, the first prompt box may further include a New button for a new folder. If the user taps the New button, a new folder is created in the root directory of the destination folder. Optionally, the first prompt box may further include a cancel button, such as "x". If the user taps the cancel button, an operation of saving a file may be canceled. Optionally, after canceling the operation of saving a file, the terminal device may display the interface of the root directory of the destination folder. In the method, the first file is stored, based on a user operation, in a customized path selected by the user. This makes it convenient for the user to find a file, and improves user experience.

Optionally, the method further includes: displaying a seventh interface in response to a ninth operation performed by the user on a first folder in the sixth interface, where the seventh interface includes the interface of the root directory of the destination folder and a second prompt box, the second prompt box includes a fourth control, and the first folder is a folder in the root directory of the destination folder; and storing the first file in a directory of the first folder in response to a tenth operation performed by the user on the fourth control.

The first folder is a folder in the root directory of the destination folder. If the user needs to store the first file in the first folder, the ninth operation, such as tapping or double-tapping the first folder, may be performed to select the first folder, and the seventh interface including the second prompt box may be displayed on the screen. The second prompt box is used to ask the user whether to store the first file in the first folder. The first prompt box may include a fourth control. The fourth control may be a confirm button, such as "V", or a button displayed as "Confirm". When the user performs the tenth operation such as tapping or double-tapping on the fourth control, the terminal device stores the first file in a root directory of the first folder. Optionally, the second prompt box may further include a New button for a new folder. If the user taps the New button, a new folder is created in the root directory of the first folder. Optionally, the second prompt box may further include a cancel button, such as "x". If the user taps the cancel button, an operation of saving a file may be canceled. Optionally, after canceling the operation of saving a file, the terminal device may display the interface of the root directory of the destination folder or an interface of the root directory of the first folder. In the method, the first file is stored, based on a user operation, in a customized path selected by the user. This makes it convenient for the user to find a file, and improves user experience.

Optionally, the method further includes: displaying an eighth interface in response to an eleventh operation performed by the user, where the eighth interface includes a first notification message of the first file; and displaying a first control and a second control of the first notification message in response to a twelfth operation performed by the user on a menu button of the first notification message, where the second control is a control for pulling up the share window, and the share window includes the icons of the plurality of share objects.

When the user performs the eleventh operation such as a single-finger pull-down or a double-finger pull-down on the screen to open a pull-down notification bar, the terminal device displays the eighth interface including the first notification message, and the first notification message is used to characterize that the terminal device has received the first file. When the user performs the twelfth operation such as tapping a menu button of the first notification message, the first control and the second control are displayed on a widget of the first notification message. The user may tap the first control to store the first file in the destination folder, or tap the second control to share the first file to the target object. In the method, a notification message indicating that a file has been received is operated in a pull-down notification bar, and the file may be saved and shared without requiring the user to search a complex file storage path. This is easy and fast.

Optionally, the method further includes: displaying a ninth interface in response to a twelfth operation performed by the user on the first banner notification, where the ninth interface is the interface of the file management APP, and the ninth interface includes a widget of the first file; and displaying the first control and the second control in response to a thirteenth operation performed by the user on a menu button of the widget of the first file, where the second control is a control for pulling up the share window, and the share window includes the icons of the plurality of share objects.

When the user performs the twelfth operation such as tapping a message body of the first banner notification, that is, tapping an area other than the first control and the second control in the first banner notification, the terminal device jumps to the interface of the file management APP, such as displaying a recent tab of the file management APP, or displaying a widget of a recently accessed file, including a widget of the first file that has just been accessed. The user performs the thirteenth operation such as tapping a menu button on the widget of the first file, the first control and the second control are displayed on the widget of the first file. The user may tap the first control to store the first file in the destination folder, or tap the second control to share the first file to the target object. In the method, by tapping a message body of a banner notification to enter an interface of a file management APP, and operating a widget of a newly received file in the interface of the file management APP, the file may be saved and shared without requiring the user to search a complex file storage path. This is easy and fast.

Optionally, the first file is any one of a document, a picture, a video, audio, an installation package, and a compressed package.

Optionally, the first interface is a chat interface.

Optionally, the first interface is an inbox interface for email.

Optionally, the first interface is an interface of a web page including a download link.

The user may store files received by different APPs based on a specified path. This makes it convenient for the user to save and manage the files received by different APPs in a centralized and orderly manner, and it is convenient for the user to find files from different sources, thereby improving user experience.

Optionally, it is more noticeable for the first banner notification to be displayed at a top of the screen, and does not affect the user viewing an interface of a middle area of the screen. As a result, user experience is better.

Optionally, the first banner notification may alternatively be displayed on a side or at a bottom of the screen.

Optionally, the method further includes: A system service reads a switch of a file management service. When the switch of the file management service is on, the system service regularly accesses a server corresponding to a third-party APP, to obtain a default save path of the first file, where the default save path is a path in a directory of the system folder. The system service monitors whether the first file is generated in the default save path. If the first file is generated in the default save path, the system service sends a file update message to a file manager. The file manager sends the first banner notification to a system user interface UI in response to the file update message. The system user interface (user interface, UI) displays the first banner notification, where the first banner notification includes a share button and a copy button. The file manager stores the first file in the directory of the destination folder in response to a tap operation performed by the user on the share button, where the destination folder is a folder with custom permissions, and the destination folder is different from the system folder. The system UI displays the share window in response to the tap operation performed by the user on the share button, where the share window includes the icons of the plurality of share objects, and the icons of the plurality of share objects include the icon of the target object. A display module displays the operation interface of the target object in response to a tap operation performed by the user on the icon of the target object. The file manager sends the first file to the target object in response to a share operation performed by the user on the operation interface of the target object. The display module displays the interface of the file management APP, where the interface of the file management APP includes the destination folder and the system folder. The display module displays the first file in response to a select operation performed by the user on the destination folder.

In a second aspect, a file management apparatus is provided. The apparatus includes a unit including software and/or hardware, where the unit is configured to perform any one of the methods in the technical solutions in the first aspect.

In a third aspect, an electronic device is provided. The electronic device includes a processor, a memory, and an interface. The processor, the memory, and the interface cooperate with each other, to enable the electronic device to perform any one of the methods in the technical solutions in the first aspect.

In a fourth aspect, an embodiment of this application provides a chip, including a processor. The processor is configured to read and execute a computer program stored in a memory, to perform any one of the methods in the technical solutions in the first aspect.

Optionally, the chip further includes the memory, and the memory is connected to the processor through a circuit or an electric wire.

Further optionally, the chip further includes a communication interface.

In a fifth aspect, a computer-readable storage medium is provided. The computer-readable storage medium stores a computer program, and when the computer program is executed by a processor, the processor is enabled to perform any one of the methods in the technical solutions in the first aspect.

In a sixth aspect, a computer program product is provided. The computer program product includes computer program code, where when the computer program code is run on an electronic device, the electronic device is enabled to perform any one of the methods in the technical solutions in the first aspect.

DETAILED DESCRIPTION OF ILLUSTRATIVE EMBODIMENTS

The following describes technical solutions in embodiments of this application with reference to accompanying drawings in the embodiments of this application. In the description of the embodiments of this application, unless otherwise stated, "/" means or, for example, A/B means A or B; The "and/or" in this specification is merely an association relationship for describing an associated object, and indicates that three relationships may exist. For example, A and/or B may represent only A exists, both A and B exist, and only B exists. In addition, in the description of the embodiments of this application, "a plurality of" refers to two or more than two.

In the following, the terms "first", "second", "third", . . . , and "thirteenth" are used merely for descriptive purposes, and cannot be understood as indicating or implying relative importance or implicitly indicating the quantity of indicated technical features. Therefore, a feature limited by "first", "second", "third", . . . , and "thirteenth" may explicitly or implicitly include one or more features.

The file management method provided in embodiments of this application may be applied to a terminal device, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). A specific type of the terminal device is not limited in embodiments of this application.

Figure 1:
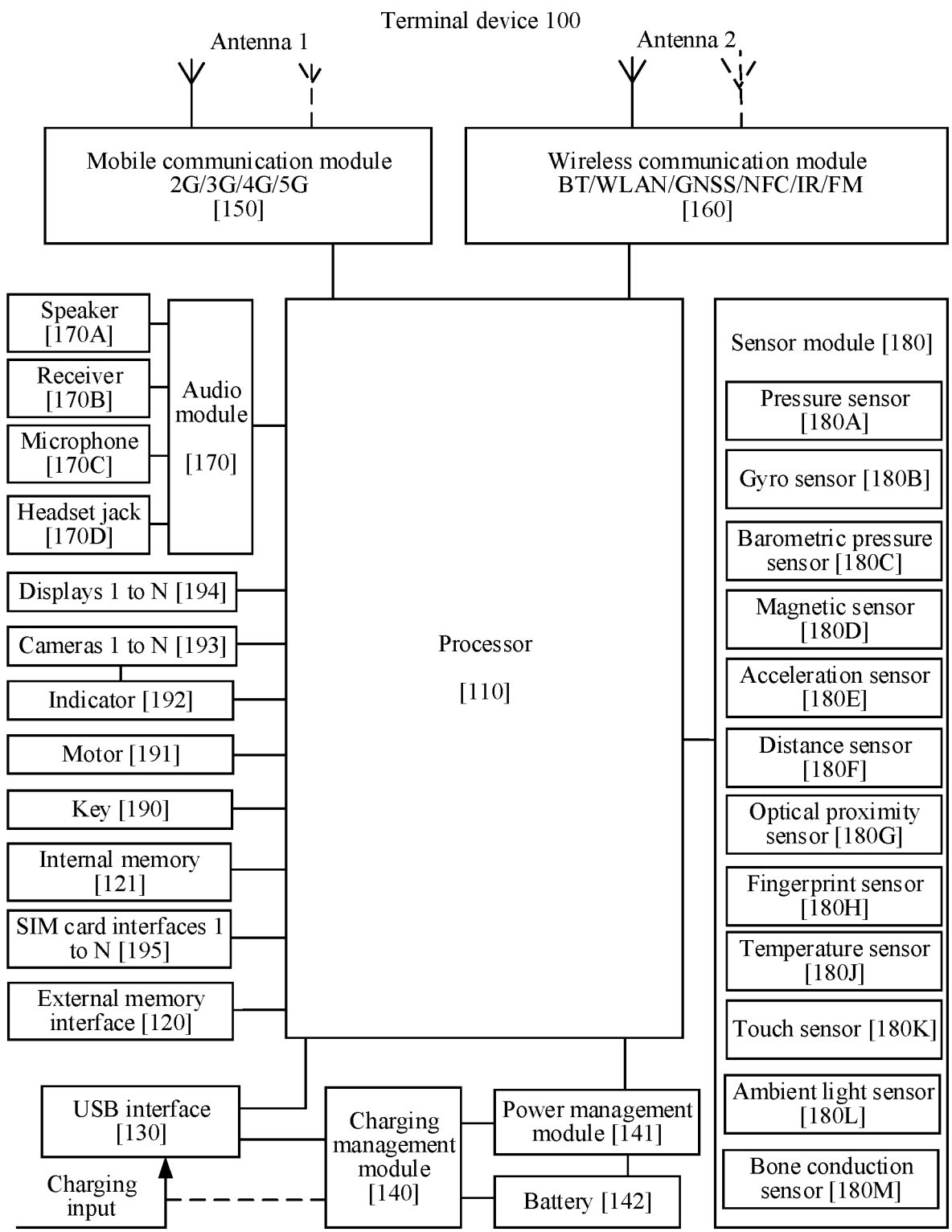
FIG. 1 is a schematic diagram of a structure of a terminal device 100 according to an embodiment of this application.

For example, FIG. 1 is a schematic diagram of a structure of an example terminal device 100 according to an embodiment of this application. The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, etc. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, etc.

It may be understood that an example structure in this embodiment of this application does not constitute a specific limitation on the terminal device 100. In some other embodiments of this application, the terminal device 100 may include more or fewer components than those shown in the figure, or some components may be combined, or some components may be split, or components may be arranged in different manners. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), etc. Different processing units may be independent components, or may be integrated in one or more processors.

The controller may be a nerve center and a command center of the terminal device 100. The controller may generate an operation control signal based on instruction operation code and a timing signal, and implement control on instruction fetching and instruction execution.

A memory configured to store instructions and data may be further disposed in the processor 110. In some embodiments, the memory in the processor 110 is a cache. The memory may store instructions or data recently used or to be cyclically used by the processor 110. When needing to use the instruction or the data again, the processor 110 may directly call the instruction or the data from the memory. This avoids repeated accessing and reduces a wait time for the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, etc.

The I2C interface is a two-way synchronization serial bus, and includes one serial data line (serial data line, SDA) and one serial clock line (serial clock line, SCL). In some embodiments, the processor 110 may include a plurality of sets of I2C buses. The processor 110 may be respectively coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device 100.

The I2S interface may be configured to perform audio communication. In some embodiments, the processor 110 may include a plurality of sets of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and perform sampling, quantization, and coding on an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is typically configured to connect the processor 110 to the wireless communications module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal device 100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, and the like.

The USB interface 130 is an interface that conforms to a USB standard specification, and may be specifically a mini USB interface, a micro USB interface, a USB Type C interface, and the like. The USB interface 130 may be configured to connect to a charger to charge the terminal device 100, or may be used for data transmission between the terminal device 100 and a peripheral device, or may be configured to connect to a headset for playing audio through the headset. The interface may be further configured to connect to another terminal device, such as an AR device.

It can be understood that the interface connection relationship between the modules illustrated in this embodiment of this application is merely an example for description, and does not constitute a limitation on the structure of the terminal device 100. In some other embodiments of this application, the terminal device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive wireless charging input through a wireless charging coil of the terminal device 100. When charging the battery 142, the charging management module 140 may further supply power to the terminal device through the power management module 141.

The power supply management module 141 is configured to connect the battery 142, the charge management module 140, and the processor 110. The power management module 141 receives input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by the antenna 1, the antenna 2, the mobile communication module 150, the wireless communication module 160, a modem processor, a baseband processor, and the like.

The antenna 1 and the antenna 2 are configured to transmit and receive an electromagnetic wave signal. In FIG. 1, structures of the antenna 1 and the antenna 2 are merely an example. Each antenna in the terminal device 100 may be configured to cover one or more communication frequency bands. Different antennas may also be reused to improve antenna utilization. For example, the antenna 1 may be reused as a diversity antenna of a wireless local area network. In some other embodiments, the antenna may be used in combination with a tuning switch.

The mobile communication module 150 may provide a solution applied to the terminal device 100 for a wireless communication including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave via the antenna 1, perform processing such as filtering and amplification on the received electromagnetic wave, and transmit the electromagnetic wave to the modem processor for demodulation. The mobile communication module 150 may further amplify a signal modulated by the modem processor. The amplified signal is converted into an electromagnetic wave and radiated out via the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Next, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, and the like), or displays an image or a video through the display 194. In some embodiments, the modem processor may be an independent component. In some other embodiments, the modem processor may be separate from the processor 110, and is disposed in a same device as the mobile communication module 150 or another functional module.

The wireless communication module 160 may provide a solution applied to the terminal device 100 for a wireless communication including a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communications processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, and perform frequency modulation and amplification on the signal. The amplified signal is converted into an electromagnetic wave and radiated out via the antenna 2.

In some embodiments, the antenna 1 of the terminal device 100 is coupled to the mobile communication module 150, and the antenna 2 is coupled to the wireless communication module 160, so that the terminal device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The terminal device 100 implements a display function through the GPU, the display 194, the application processor, and the like. The GPU is a microprocessor for image processing, and is connected to the display 194 and the application processor. The GPU is configured to perform mathematical and geometric computation, to implement image rendering. The processor 110 may include one or more GPUs, which execute program instructions to generate or change display information.

The display 194 is configured to display an image, a video, and the like. The display 194 includes a display panel. The display panels may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), and the like. In some embodiments, the terminal device 100 may include one or N displays 194. N is a positive integer greater than 1.

The terminal device 100 can implement a photographing function through the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal, and the photosensitive element of the camera transmits the electrical signal to the ISP for processing. The ISP converts the electrical signal into a visible image. The ISP may further perform algorithm optimization on noise, brightness, and complexion of the image. The ISP may further optimize parameters, such as exposure and color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP. The ISP converts the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, and N is a positive integer greater than 1.

The digital signal processor is configured to process a digital signal, and may further process another digital signal in addition to the digital image signal. For example, when the terminal device 100 performs frequency channel selection, the digital signal processor is configured to perform Fourier transformation and the like on frequency channel energy.

The video codec is configured to compress or decompress a digital video. The terminal device 100 may support one or more video codecs. In this way, the terminal device 100 may play or record videos in a variety of encoding formats, for example, moving picture experts group (moving picture experts group, MPEG) 1, MPEG2, MPEG3, MPEG4, etc.

The NPU is a neural-network (neural-network, NN) computing processor, and quickly processes input information by referring to a biological neural network structure such as a mode of transmission between human-brain nerve cells, and may further perform continuous self-learning. Applications such as intelligent cognition, for example, image recognition, face recognition, speech recognition, and text understanding, of the terminal device 100 can be implemented through the NPU.

The external memory interface 120 may be configured to connect to an external storage card such as a Micro SD card, to expand a storage capability of the terminal device 100. The external storage card communicates with the processor 110 through the external memory interface 120, to implement a data storage function, for example, to store music, videos, and other files into the external storage card.

The internal memory 121 may be configured to store computer-executable program code. The executable program code includes instructions. The processor 110 executes various function applications and data processing of the terminal device 100 by running the instructions stored in the internal memory 121. The internal memory 121 may include a program storage area and a data storage area. The program storage area may store an operating system, an application required by at least one function (such as a sound playback function and an image display function), and the like. The data storage area may store data (for example, audio data, a phone book, or the like) created during use of the terminal device 100. In addition, the internal memory 121 may include a high-speed random access memory, and may further include a non-volatile memory, such as at least one magnetic disk storage device, a flash memory, or a universal flash storage (universal flash storage, UFS).

The terminal device 100 may implement an audio function, for example, music playing or sound recording, through the audio module 170, the speaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. Music can be listened to or a hands-free call can be answered through the speaker 170A in the terminal device 100.

The receiver 170B, also referred to as an "earpiece", is configured to convert an electrical audio signal into a sound signal. When a call is answered or audio information is listened to by using the terminal device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through his mouth, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, reduce noise, and further identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines intensity of the pressure based on a change in the capacitance. When a touch operation is performed on the display 194, the terminal device 100 detects intensity of the touch operation based on the pressure sensor 180A. The terminal device 100 may further calculate a touch position based on a detection signal of the pressure sensor 180A. In some embodiments, touch operations performed on a same touch position with different touch operation intensities may correspond to different operation instructions. For example, when a touch operation is performed on a Messages application icon with a touch operation intensity less than a first pressure threshold, instructions for viewing an SMS message are performed. When a touch operation is performed on the Messages application icon with a touch operation intensity greater than or equal to the first pressure threshold, instructions for creating a new SMS message are performed.

The gyro sensor 180B may be configured to determine a moving posture of the terminal device 100. In some embodiments, an angular velocity of the terminal device 100 around three axes (namely, axes x, y, and z) may be determined through the gyro sensor 180B. The gyro sensor 180B may be configured to implement image stabilization during photographing. For example, when a shutter is pressed, the gyro sensor 180B detects an angle at which the terminal device 100 jitters, and calculates, based on the angle, a distance for which a lens module needs to compensate, so that the lens cancels the jitter of the terminal device 100 through a reverse motion, thereby implementing image stabilization. The gyro sensor 180B may also be used in a navigation scenario and a somatic game scenario.

The barometric pressure sensor 180C is configured to measure barometric pressure. In some embodiments, the terminal device 100 calculates an altitude through the barometric pressure measured by the barometric pressure sensor 180C, to assist in positioning and navigation.

The magnetic sensor 180D includes a Hall sensor. The terminal device 100 may detect opening and closing of a flip leather case through the magnetic sensor 180D. In some embodiments, when the terminal device 100 is a clamshell phone, the terminal device 100 may detect opening and closing of a flip cover based on the magnetic sensor 180D. Further, a feature such as automatically unlocking when flipping is set based on a detected opening or closing state of the leather case or a detected opening or closing state of the flip cover.

The acceleration sensor 180E may detect magnitudes of accelerations of the terminal device 100 in various directions (generally three axes). When the terminal device 100 is still, a magnitude and a direction of gravity may be detected. The acceleration sensor 180E may be further configured to identify a posture of the terminal device, and is applied to an application such as horizontal and vertical screen switching and a pacemaker.

The distance sensor 180F is configured to measure a distance. The terminal device 100 may measure a distance in an infrared manner or in a laser manner. In some embodiments, in a photographing scene, the terminal device 100 may use the distance sensor 180F to measure a distance to implement fast focusing.

The optical proximity sensor 180G may include, for example, a light emitting diode (LED) and a photodetector, for example, a photodiode. The light emitting diode may be an infrared light emitting diode. The terminal device 100 emits infrared light through the light emitting diode. The terminal device 100 uses a photodiode to detect infrared reflected light from an object nearby. When sufficient reflected light is detected, it may be determined that there is an object near the terminal device 100. When insufficient reflected light is detected, the terminal device 100 may determine that there is no object near the terminal device 100. The terminal device 100 may detect, by using the optical proximity sensor 180G, that a user holds the terminal device 100 close to an ear to make a call, to automatically turn off a screen for power saving. The optical proximity sensor 180G may alternatively be used in a smart cover mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G to detect whether the terminal device 100 is in a pocket, so prevent an accidental touch.

The fingerprint sensor 180H is configured to collect a fingerprint. The terminal device 100 may implement fingerprint-based unlocking, application lock accessing, fingerprint-based photographing, fingerprint-based call answering, and the like by using a feature of the collected fingerprint.

The temperature sensor 180J is configured to detect a temperature. In some embodiments, the terminal device 100 performs a temperature processing policy by using the temperature detected by the temperature sensor 180J. For example, when the temperature reported by the temperature sensor 180J exceeds a threshold, the terminal device 100 lowers performance of a processor located near the temperature sensor 180J, to reduce power consumption and implement thermal protection. In some other embodiments, when the temperature is below another threshold, the terminal device 100 heats the battery 142, to avoid an abnormal shutdown of the terminal device 100 caused by a low temperature. In some other embodiments, when the temperature is lower than still another threshold, the terminal device 100 boosts an output voltage of the battery 142, to avoid abnormal shutdown due to a low temperature.

The touch sensor 180K is also referred to as a "touch panel". The touch sensor 180K may be disposed in the display 194. The touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event.

A visual output related to the touch operation may be provided through the display 194. In some other embodiments, the touch sensor 180K may alternatively be disposed on a surface of the terminal device 100 at a position different from that of the display 194.

The bone conduction sensor 180M may obtain a vibration signal. In some embodiments, the bone conduction sensor 180M may obtain a vibration signal of a vibrating bone of a human vocal-cord part. The bone conduction sensor 180M may also be in contact with a body pulse to receive a blood pressure beating signal. In some embodiments, the bone conduction sensor 180M may also be disposed in the headset, forming a bone conduction headset. The audio module 170 may obtain a speech signal through parsing based on the vibration signal that is of the vibrating bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The terminal device 100 may receive a key input, generate a key signal input related to user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also provide different vibration feedback effects corresponding to touch operations performed on different areas of the display 194. Different application scenarios (e.g., a time reminder, receiving information, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or unplugged from the SIM card interface 195, to come into contact with or be separated from the terminal device 100. The terminal device 100 may support one or N SIM card interfaces, where N is a positive integer greater than 1. The SIM card interface 195 may support a Nano SIM card, a Micro SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The terminal device 100 interacts with a network through the SIM card, to implement a call function, a data communication function, and the like. In some embodiments, the terminal device 100 uses an eSIM, i.e., an embedded SIM card. The eSIM card may be embedded in the terminal device 100, and cannot be separated from the terminal device 100.

A software system of the terminal device 100 may use a layered architecture, an event-driven architecture, a microkernel architecture, a micro-service architecture, or a cloud architecture. In embodiments of this application, an Android system of the layered architecture is used as an example to illustrate a software architecture of the terminal device 100.

Figure 2:
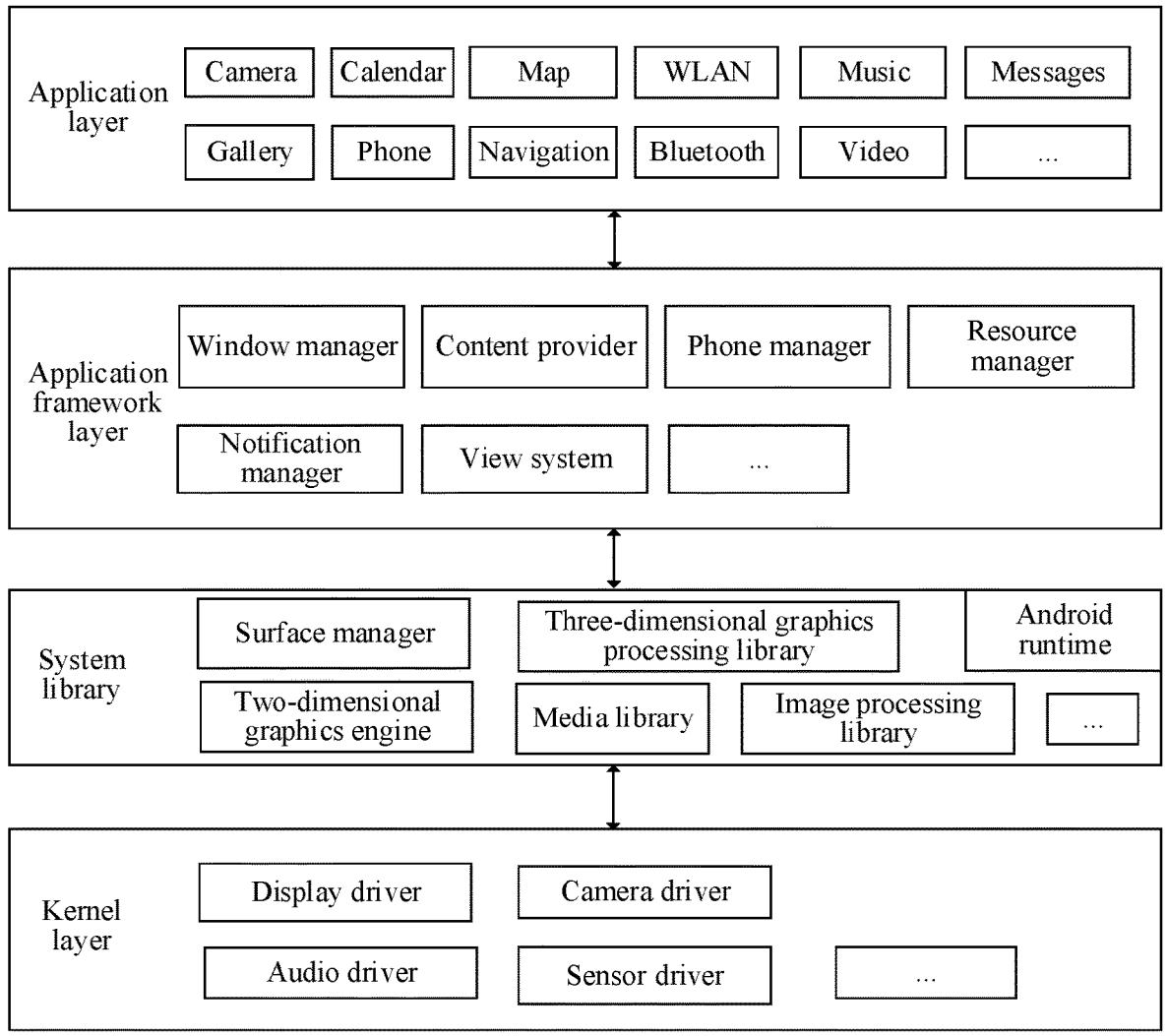
FIG. 2 is a block diagram of a software architecture of a terminal device 100 according to an embodiment of this application.
Figure 3A:
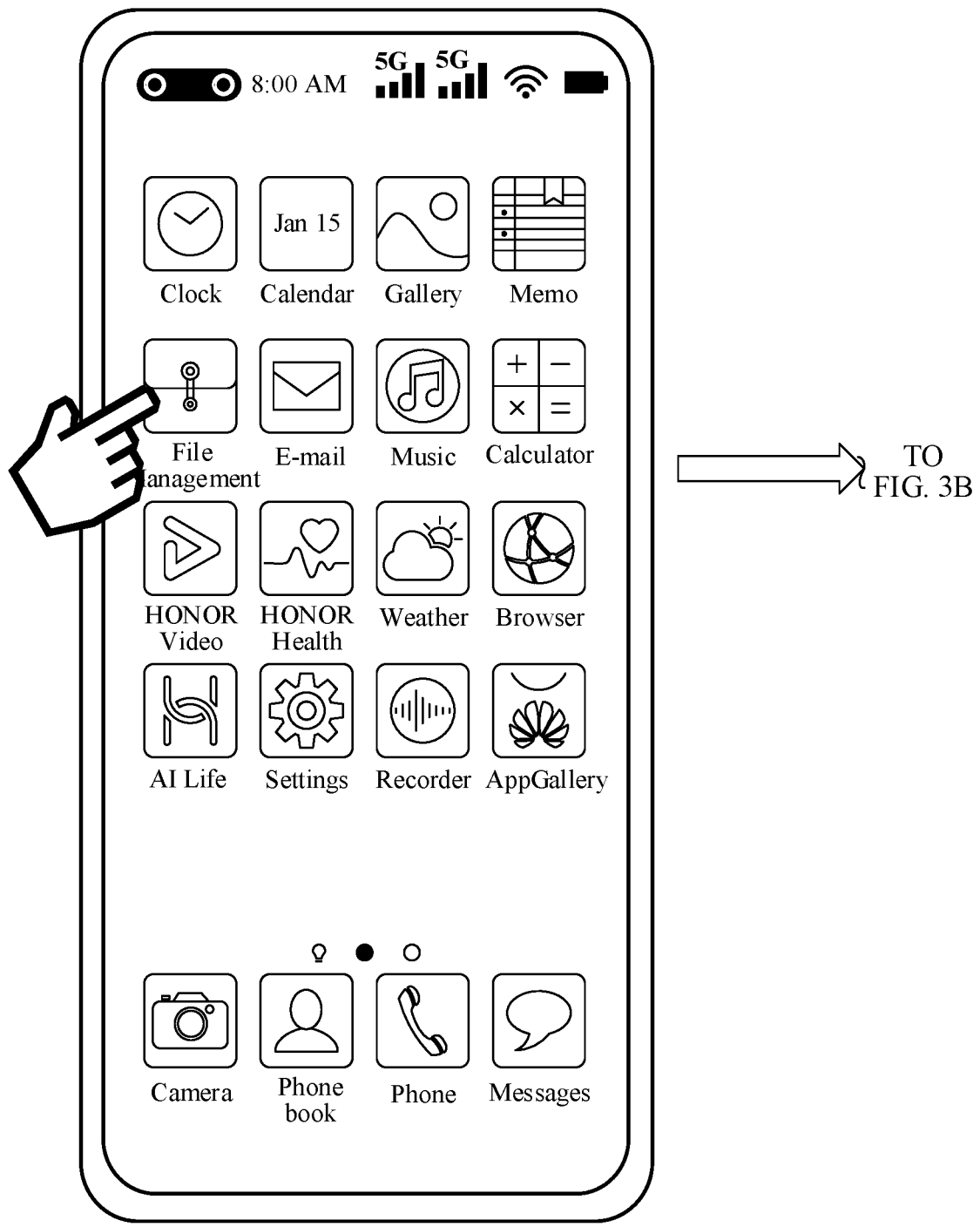
FIG. 3A to FIG. 3D are a schematic diagram of an interface of a file management APP according to an embodiment of this application.
Figure 3B:
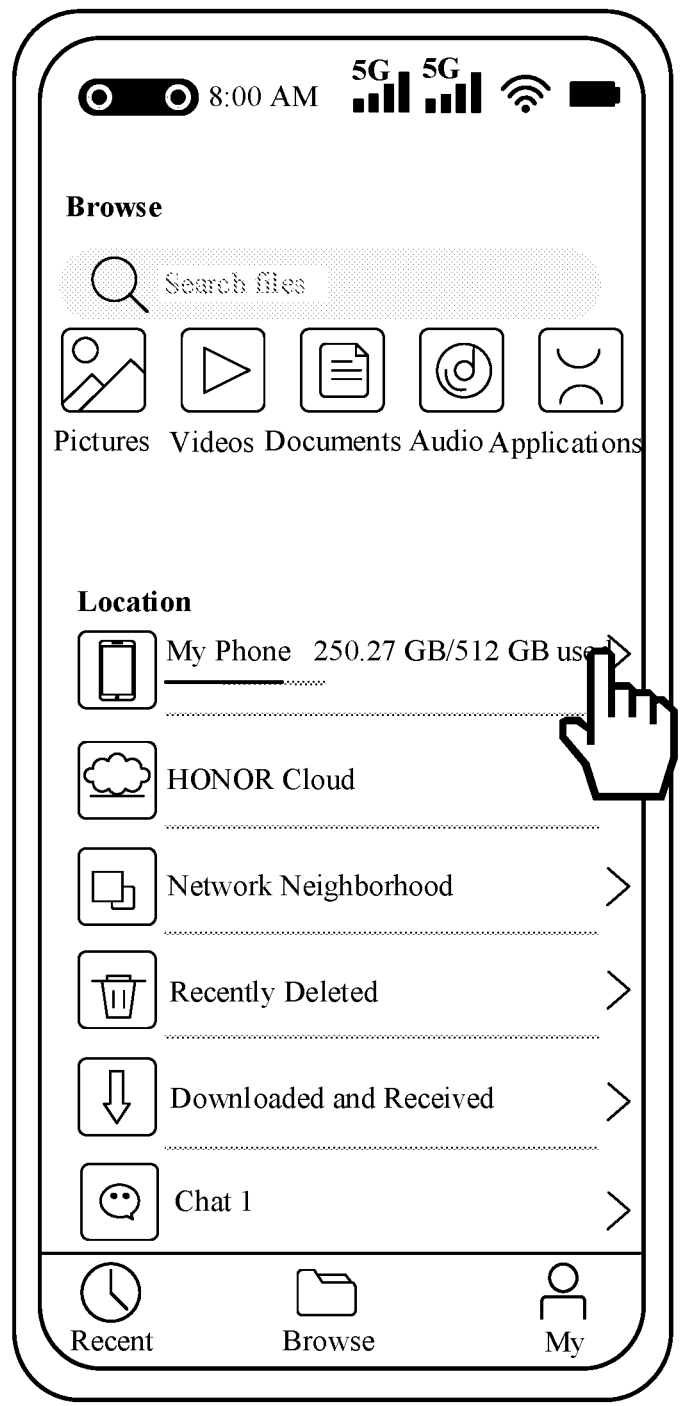
Figure 3C:
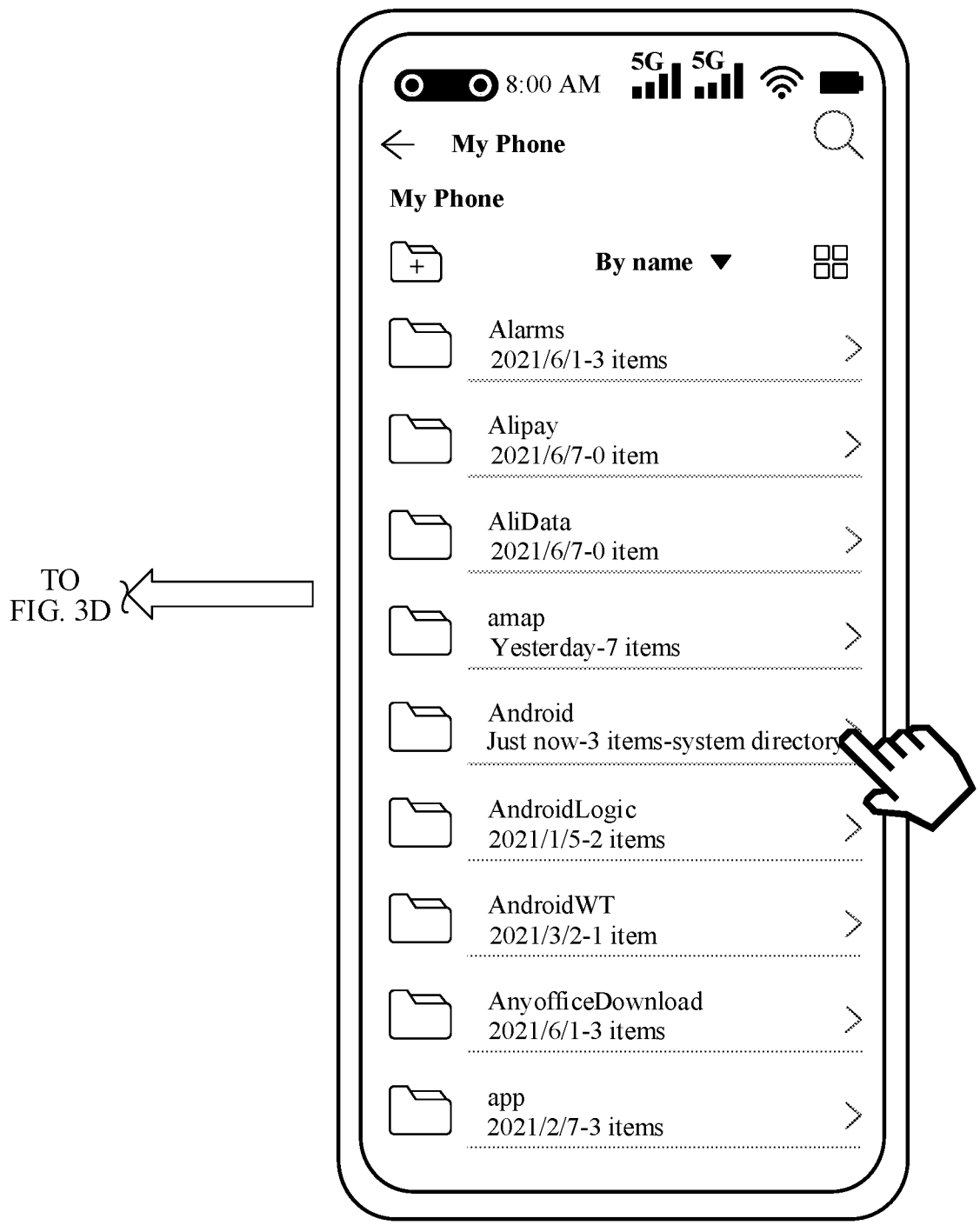
Figure 3D:
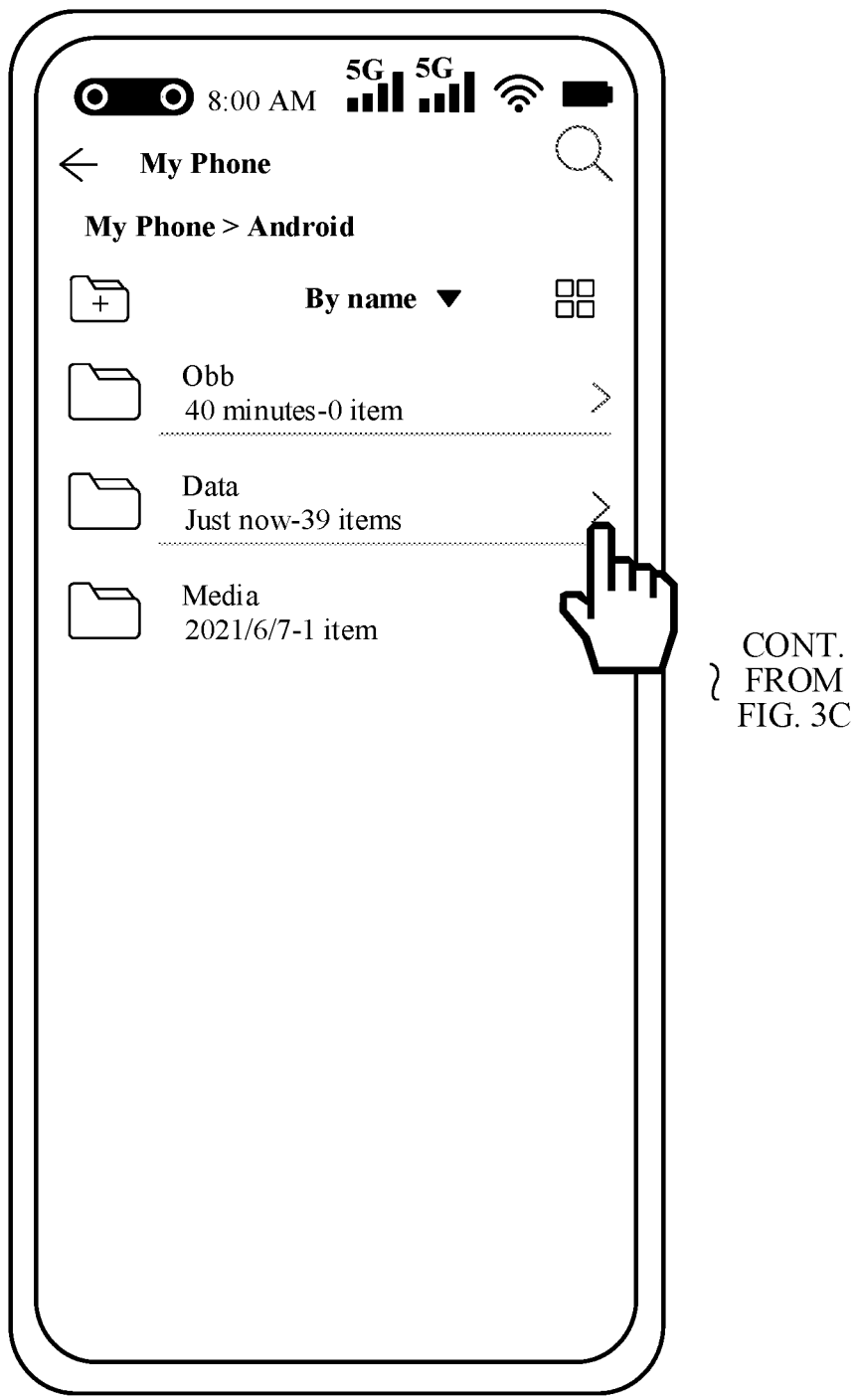

FIG. 2 is a block diagram of a software architecture of the terminal device 100 according to an embodiment of this application. In a layered architecture, software is divided into several layers, and each layer has a clear role and responsibilities. The layers communicate with each other through software interfaces. In some embodiments, an Android system is divided into four layers from top to bottom: an application layer; an application framework layer; an Android runtime (Android runtime) and system library; and a kernel layer. The application layer may include a series of application packages.

As shown in FIG. 2, the application layer may include applications such as Camera, Gallery, Calendar, Phone, Map, Navigation, WLAN, Bluetooth, Music, Video, and Messages.

The application framework layer provides an application programming interface (application programming interface, API) and a programming framework for the applications in the application layer. The application framework layer includes some predefined functions.

As shown in FIG. 2, the application program framework layer may include a window manager, a content provider, a view system, a phone manager, a resource manager, a notification manager, and the like.

The window manager is configured to manage a window program. The window manager may obtain a size of a display, determine whether there is a status bar, perform screen locking, perform screen capturing, and so on.

The content provider is configured to store and retrieve data and make the data accessible to an application. The data may include a video, an image, audio, phone calls made and answered, a browsing history, favorites, a phone book, etc.

The view system includes a visual control, for example, a control for displaying text or a control for displaying a picture. The view system may be configured to build an application. A display interface may include one or more views. For example, a display interface including an SMS notification icon may include a view for displaying text and a view for displaying a picture.

The phone manager is configured to provide a communication function of the terminal device 100. For example, the communication function includes call status management (including call connection, hang-up, and the like).

The resource manager provides various resources for an application, such as a localized string, an icon, a picture, a layout file, and a video file.

The notification manager enables an application to display a notification message in a status bar. The notification messages may be used to convey an informative message that may disappear automatically after a short period of time, and no user interaction is required. For example, the notification manager is configured to notify completion of downloading, remind a message, and the like. The notification manager may alternatively provide, on a status bar at a top of the system, a notification in a form of a chart or scroll bar text, for example, a notification of an application running in the background, or provide, on the screen, a notification in a form of a dialog window. For example, text information is prompted on the status bar, a prompt tone is made, the terminal device vibrates, and an indicator light flashes.

The Android runtime includes a kernel library and a virtual machine. The Android runtime is responsible for scheduling and managing an Android system.

The kernel library includes two parts: a functional function that java needs to call, and an Android kernel library.

The application layer and the application framework layer run in the virtual machine. The virtual machine executes java files of the application layer and the application framework layer as binary files. The virtual machine is configured to implement functions such as object life cycle management, stack management, thread management, security and exception management, and garbage collection.

The system library may include a plurality of functional modules. For example, the functional modules include a surface manager (surface manager), a media library (media libraries), a three-dimensional graphics processing library (e.g., OpenGL ES), a 2D graphics engine (e.g., SGL), and the like.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, such as MPEG4, H.264, MP3, AAC, AMR, JPG, and PNG.

The three-dimensional graphics processing library is configured to implement three-dimensional drawing, image rendering, compositing, and layer processing.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, a terminal device having the structure shown in FIG. 1 and FIG. 2 is used as an example to describe, in detail with reference to the accompanying drawings and application scenarios, a file management method provided in embodiments of this application.

Figure 4A:
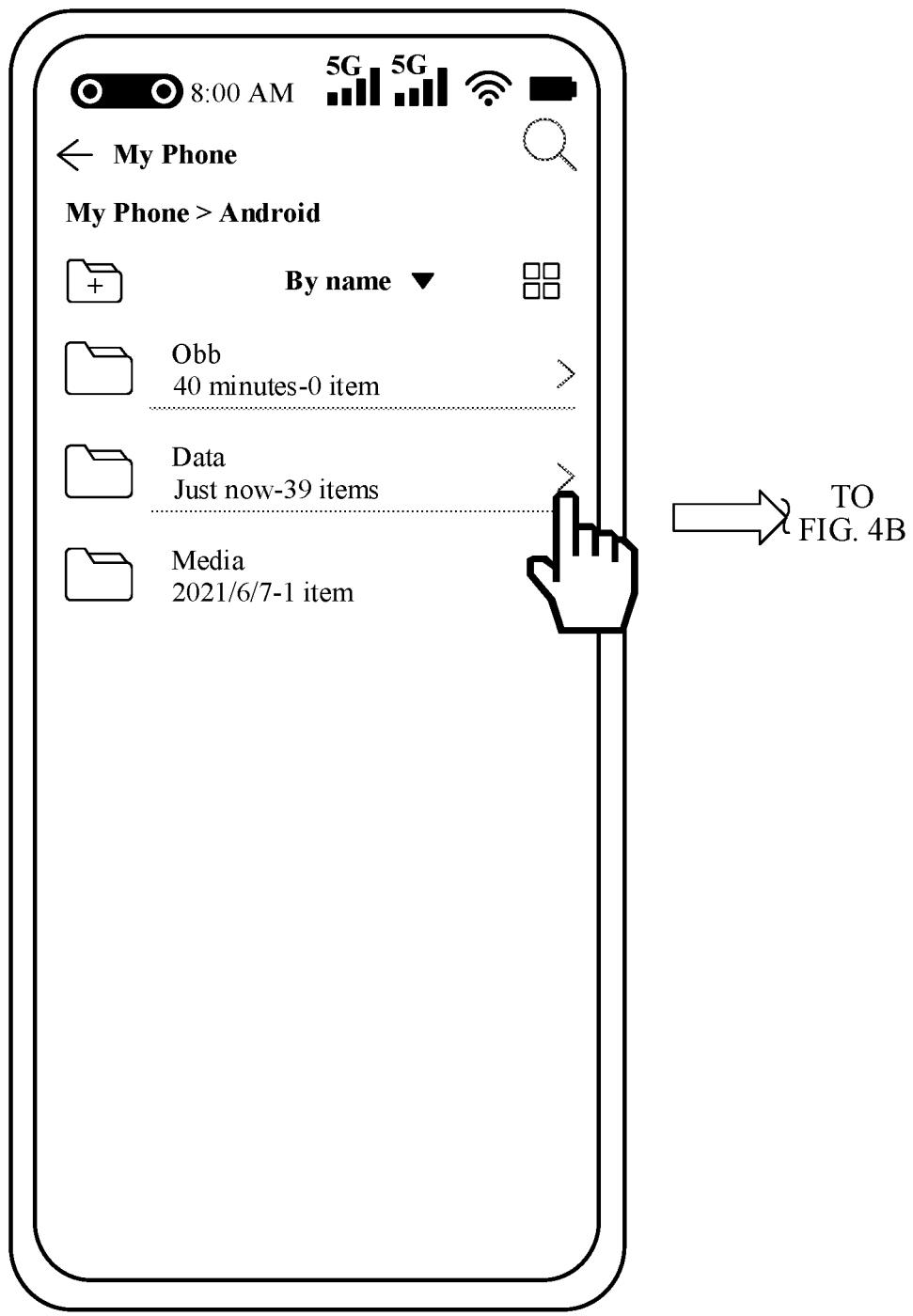
FIG. 4A and FIG. 4B are a schematic diagram of an interface of a file management APP according to an embodiment of this application.
Figure 4B:
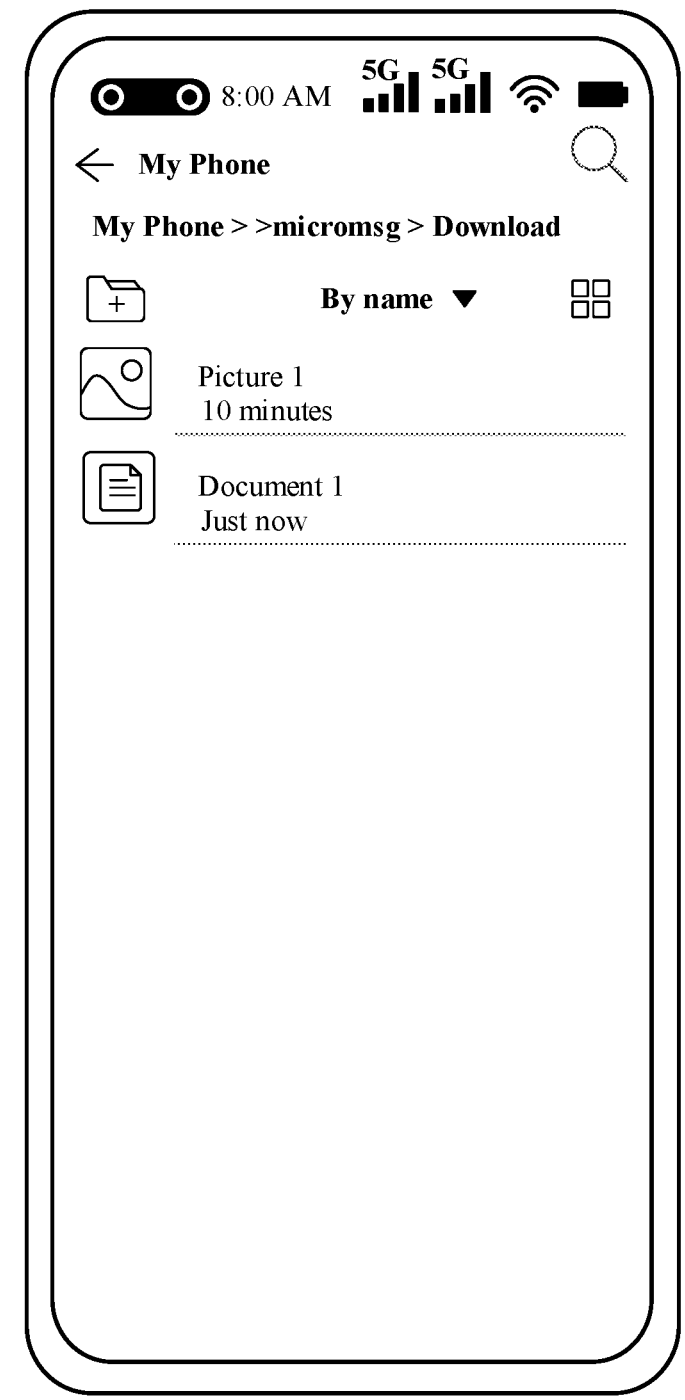

Generally, people transmit information through different APPs, for example, may sends files such as documents, audio, videos, pictures, audio, installation packages, and compressed packages through third-party APPs such as chat APPs and mail APPs. In a conventional Android system, a path used by a terminal device to store a received file is complex and obscure, and save paths of files received by different APPs may not be the same. Therefore, it is very difficult for a common user to find a file received by an APP. Generally, to find a file named "Document 1" received in a chat APP, a user needs to know a default save path of files of the chat APP in the Android system. Then the user operates the terminal device, enters a file management APP, and performs searching based on the default save path of the chat APP in the Android system. Generally, a file received by a third-party APP may be saved in a folder "My Phone". If knowing that a default path of the third-party APP for file saving is Android>Data>com.tencent.mm>MicroMsg>Download, as shown in FIG. 3A to FIG. 3D, a user may first tap an icon of a file management APP on the desktop to enter an interface of the file management APP, then taps the folder "My Phone", and then access a path Android>Data. As shown in FIG. 4A and FIG. 4B, the user continues to enter directories Data>com.tencent.mm>MicroMsg>Download (not all directories are shown in FIG. 4A and FIG. 4B) step by step, and finds an icon of Document 1 in the Download folder. Thereafter, the user may operate on Document 1. If the user is a common user and does not know a file storage path in an Android system, it is difficult to find a required file. As a result, it is difficult to find a file, and user experience is poor.

This application provides a file management method. In the method, a file may be classified and stored based on an element such as a type, a location, a receiving time, or a customized name of the received file. This makes it convenient for a user to find a file, and improves user experience.

Figure 5A:
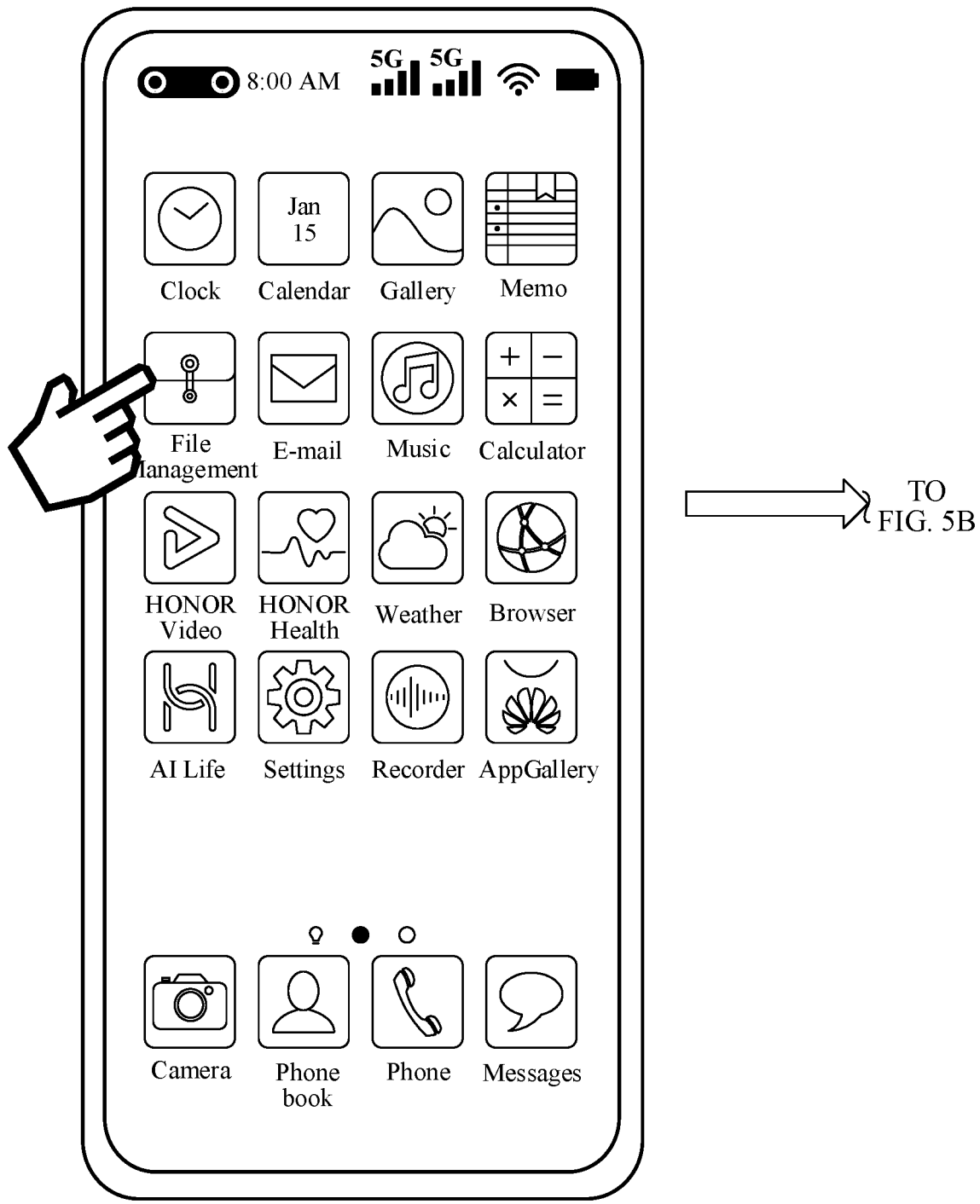
FIG. 5A to FIG. 5D are a schematic diagram of an interface of a file management APP with "My Folder" added according to an embodiment of this application.

In embodiments of this application, a directory "My Folder" (which may alternatively be named "My Files", and is illustrated with "My Folder" in FIG. 5A to FIG. 5D) is added to a file management APP, to store files received by third-party APPs. When a user taps an icon of a file management APP on the desktop of a terminal device, as shown in FIG. 5A, for example, the user enters an interface of the file management APP, in which a new folder "My Folder" is established above an existing folder "My Phone", such as an interface shown in FIG. 5B. The user may tap an icon of "My Folder" to enter the folder. In "My Folder", a new customized folder may be created. For example, an interface shown in FIG. 5C includes "Folder 1", "Folder 2", "Folder 3" . . . "Folder 9", and even more folders may be included. The user may browse other folders by pulling down an interface shown in FIG. 5C. In a directory of "My Folder", a file may be stored directly. For example, in an interface shown in FIG. 5D, "Document 1" may be stored directly in the directory of "My Folder". The user may add a new folder in "My Folder", and perform an operation such as sorting, sharing, uploading, deletion, and multi-selecting on the file and folder.

Figure 5B:
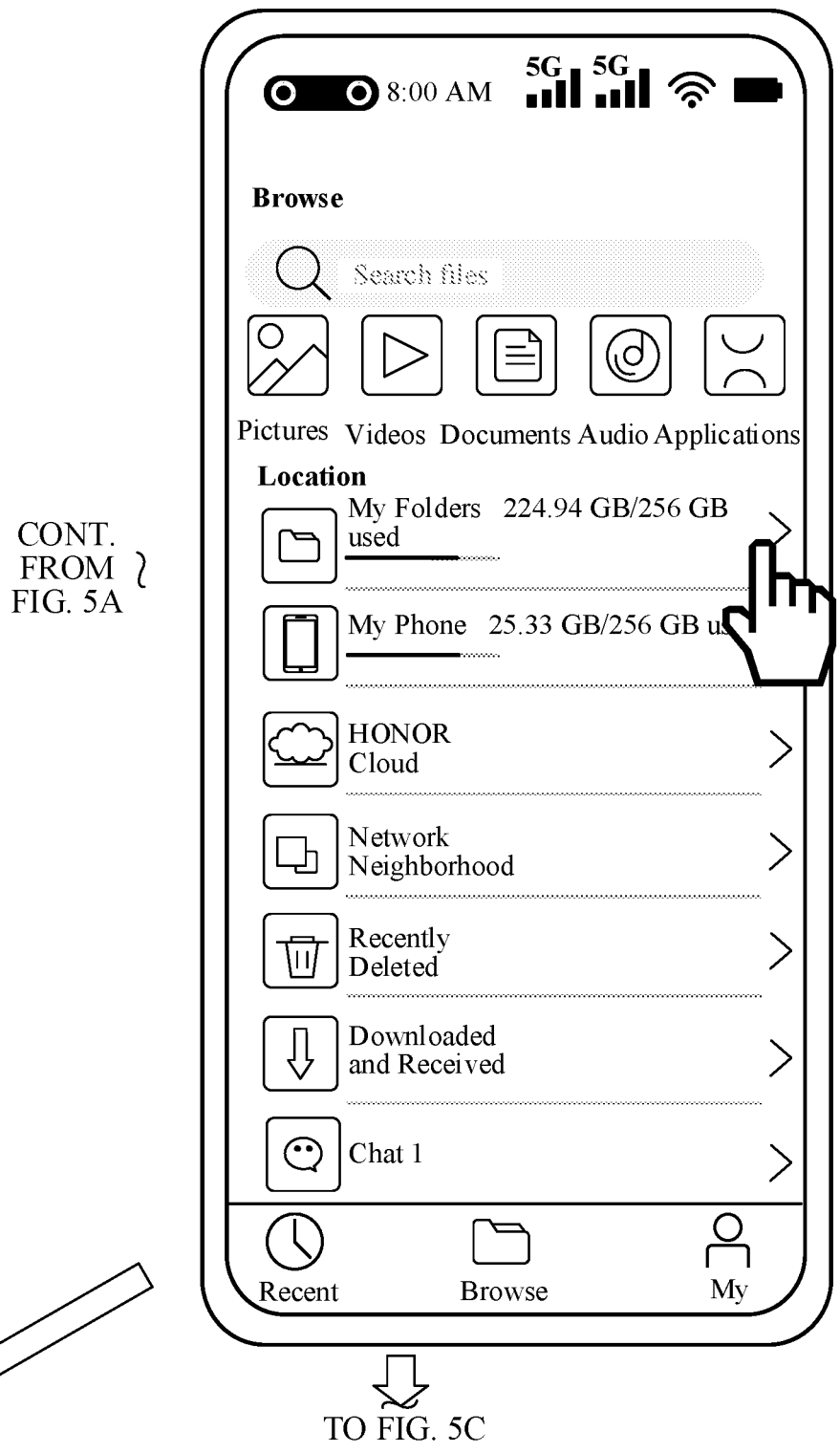
Figure 5C:
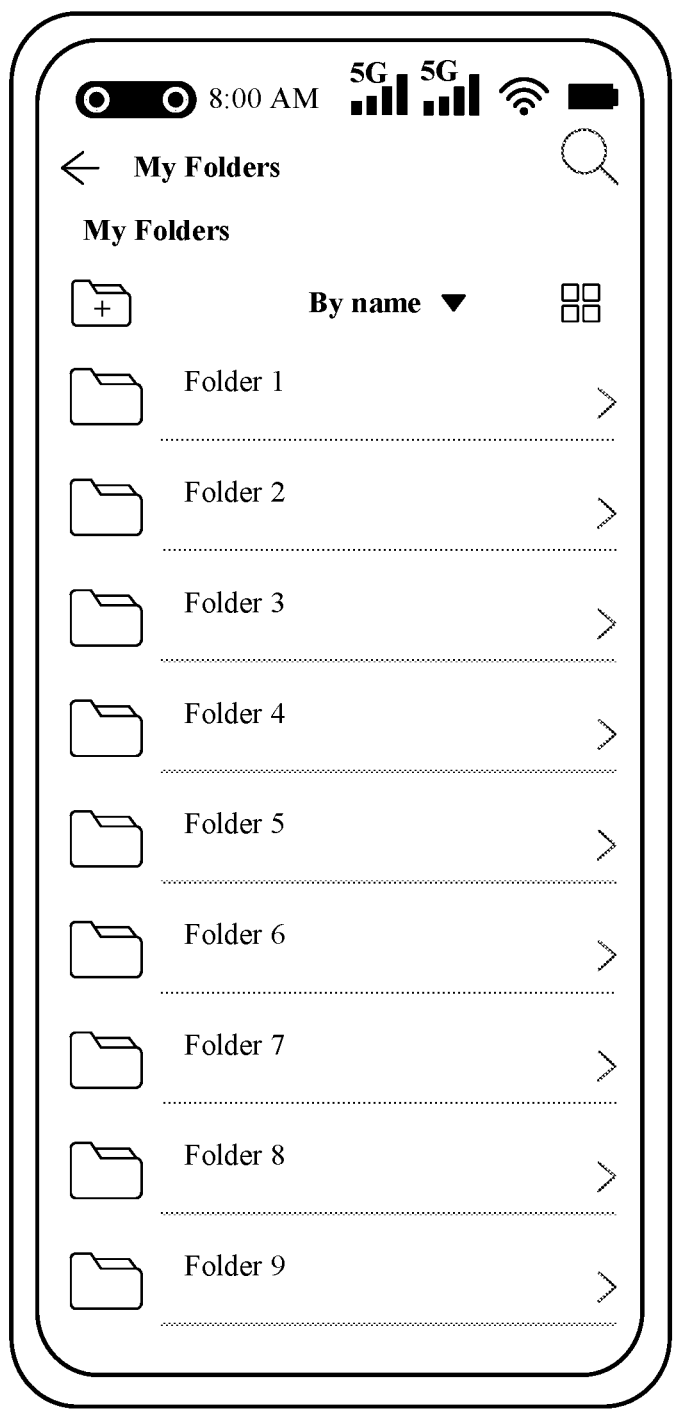
Figure 5D:
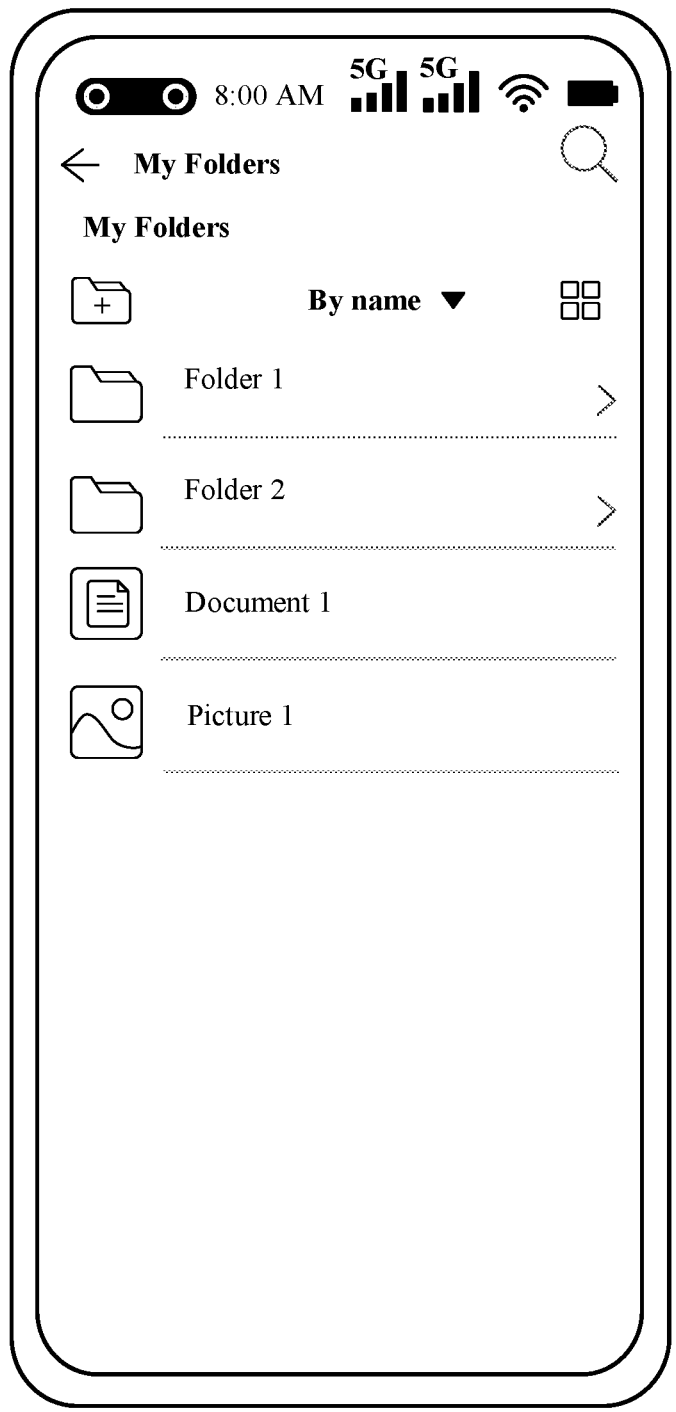

The interface of the file management APP shown in FIG. 5B may further include a search bar, in which the user may enter a file name to search. Searching scope includes all files in the directory of "My Folder". The interface of the file management APP may further include icons of file types including picture, video, document, audio, and application. The user may tap the icons of different file types and view a corresponding type of file stored in the terminal device. For example, the user may tap the icon of picture and view a picture stored in the terminal device. The user may also tap the icon of video and view a video stored in the terminal device. If tapping a directory of "My Phone", the user will enter a default directory in an Android system. When the user taps an icon such as "HONOR Cloud", "Network Neighborhood", "Recently Deleted", "Downloaded and Received", or "Chat 1", the terminal device may display a list of files or folders stored in these different locations, or a thumbnail of the files or folders. When displaying the list of files in a folder, the terminal device may further display a quantity of objects included in the folder. FIG. 5B is a schematic diagram of an interface of a tab "Browse". When the user taps a tab "Recent", the terminal device may display recently accessed files in a form of a list in a chronological order. The user may also view a page, such as personal login information, cloud space, favorites, settings, and help, of the file management APP in a tab "My".

Figure 6A:
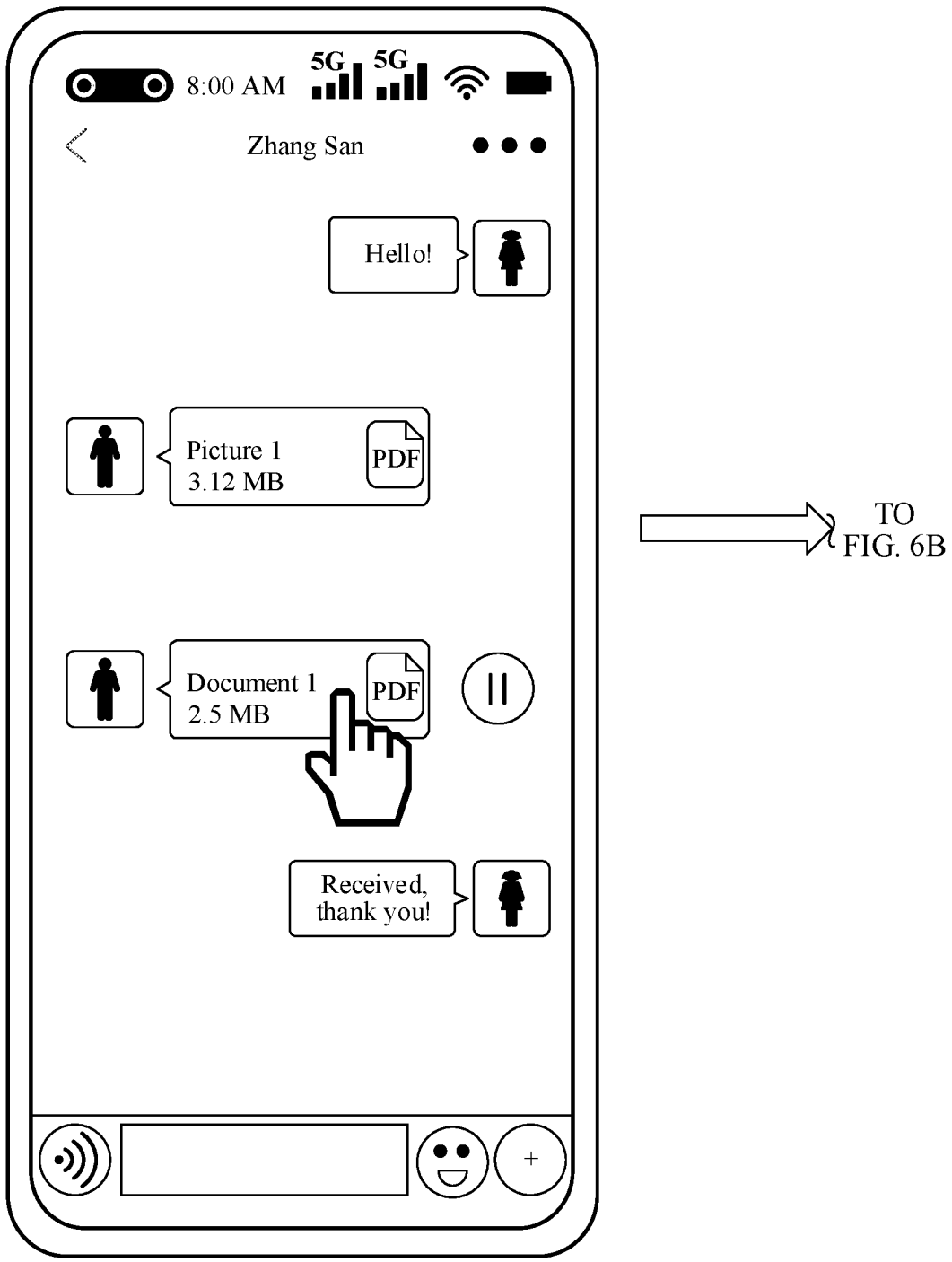
FIG. 6A to FIG. 6D are a schematic diagram of changes in an interface of a terminal device generating a banner notification according to an embodiment of this application.
Figure 6B:
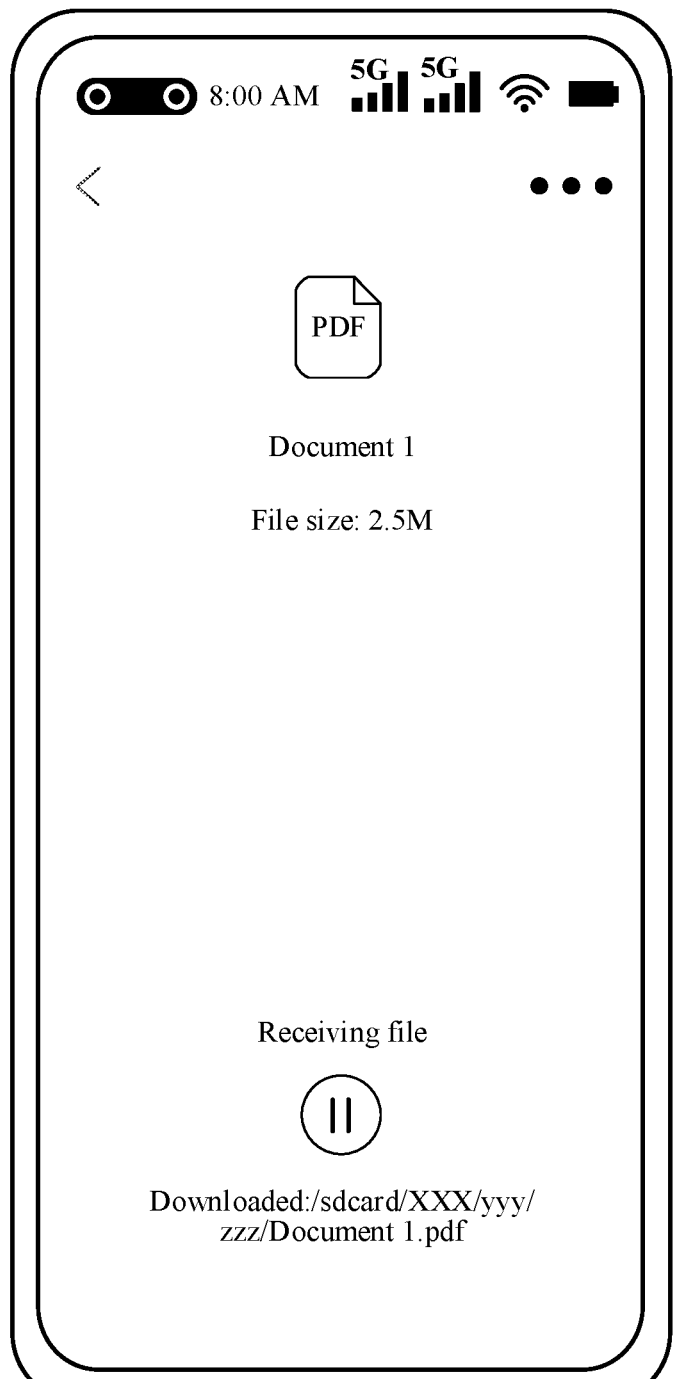
Figure 6C:
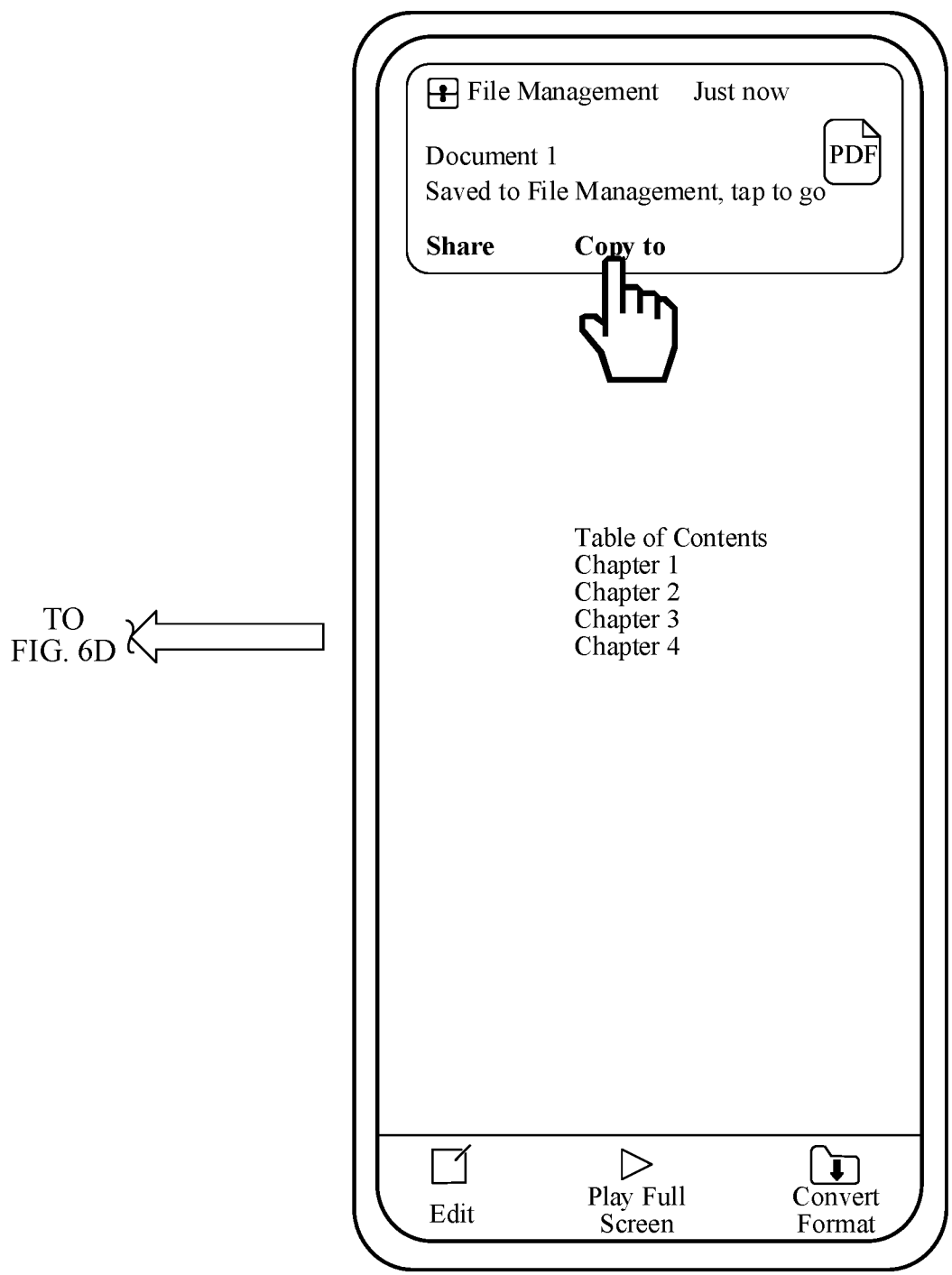
Figure 6D:
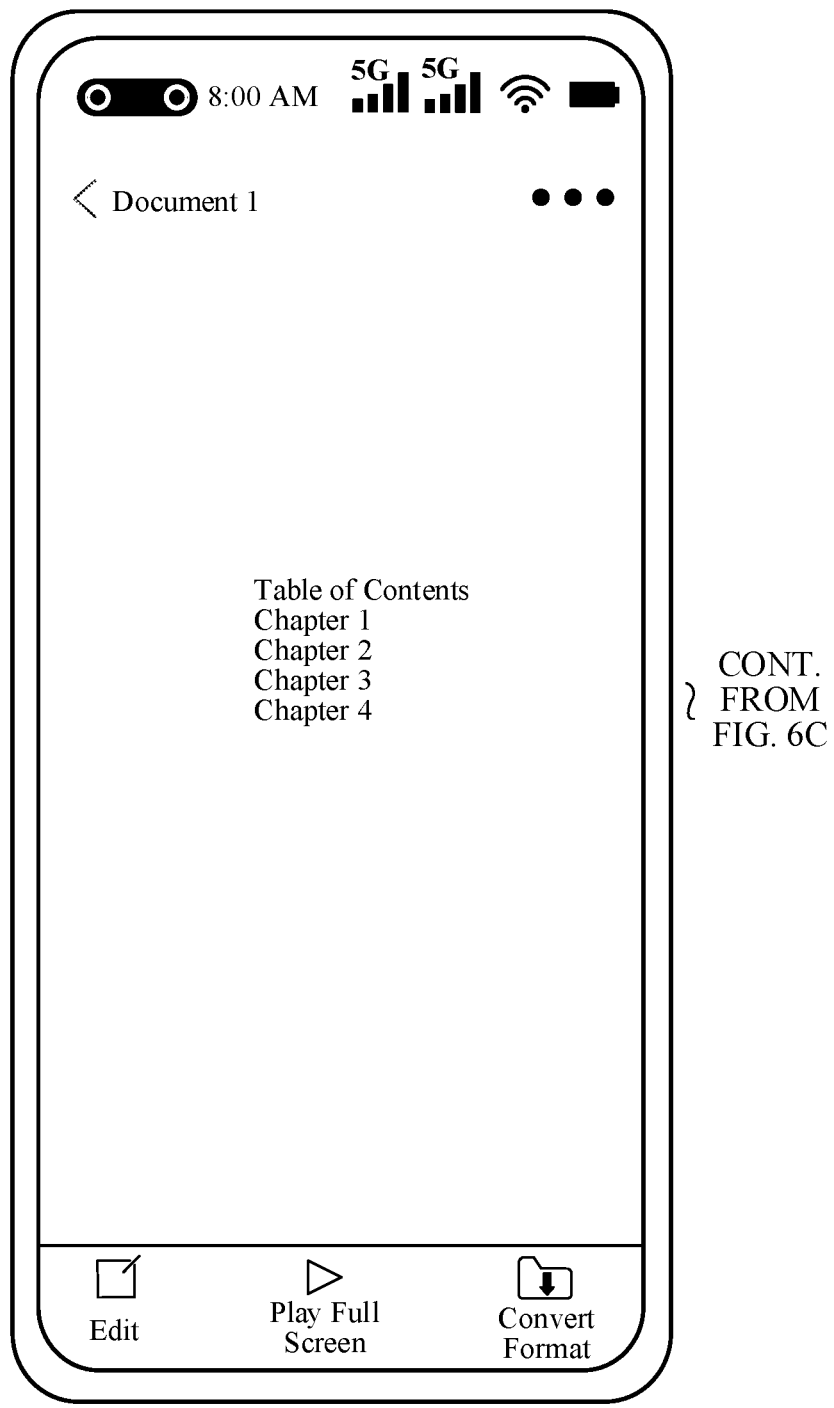

An example in which a user receives a file through an APP of chat 1 is used. For example, in an interface shown in FIG. 6A, when the other party sends a file named "Document 1", the user taps the file in the chat interface, and the system automatically downloads the file. In addition, a download progress identifier as shown in FIG. 6B is displayed on the interface, to display download progress of the current document. Optionally, the download progress identifier may also be added next to an icon of Document 1 in FIG. 6A, to display the download progress of the current document. During file downloading, the user may also tap a pause button to pause the file downloading. When the file downloading is completed, the interface may further display a reminding message that downloading is completed and a download path, such as a reminding message "Downloaded:/sdcard/XXX/yyy/zzz/Document 1.pdf" shown in FIG. 6B, and the reminding message disappears after a few seconds. When the file downloading is completed, the terminal device may display a preview interface of the file, and a banner notification shown in FIG. 6C pops up on the preview interface of the file. The user may alternatively tap an icon of the file on the chat interface, and the terminal device displays the preview interface of the file in response to the user's tap operation. Then the user swipes up on the preview interface of the file, pulls out a menu of the file and taps a save button in the menu. In this case, the terminal device starts to download the file based on an operation of the user saving the file. When the file downloading is completed, the terminal device may pop up the banner notification as shown in FIG. 6C on the interface. Alternatively, the terminal device may automatically download a file sent on the chat interface. When file downloading is completed, the banner notification as shown in FIG. 6C will pop up on the interface. The above-mentioned banner notification may include a share button and a copy button. If the user taps the share button, the file may be shared to an object to be shared. If the user taps the copy button, the file may be stored in a specified directory. Optionally, the banner notification may further display one or more of an icon, a name, a type, a source, a size, and the like of a received file. The banner notification is used to notify the user that a document has been stored in the file management APP. If the user does not operate on the banner notification at this time, the banner notification will automatically disappear after a period of time. For example, if the banner notification is not operated for five seconds, the banner notification disappears, and is received into a pull-down notification bar. The interface directly displays content of Document 1 as shown in FIG. 6D, and displays, when the user pulls down the notification bar, a notification message that the file has been received. In this case, the user may drag Document 1 up or down to read on the interface shown in FIG. 6D. The user may also tap a button "Play Full Screen", to switch a display interface of Document 1 to full screen mode. The user may also tap a button "Edit", to enter edit mode to edit the content of Document 1. The user may also tap a button "Convert Format", to convert Document 1 from PDF format to another format, such as convert to picture format, convert to long image format, convert to doc format, and so on.

Alternatively, the terminal device may receive a file in an inbox interface in email, or in a browser interface, or receive the file by the user tapping a download link, or in an interface of another APP. A banner notification will pop up when the terminal device receives the file. The user may store files received by different APPs based on a specified path. This makes it convenient for the user to save and manage the files received by different APPs in a centralized and orderly manner, and it is convenient for the user to find files from different sources, thereby improving user experience.

Optionally, a banner notification may be displayed at a top of a screen, on a side of a screen, or at a bottom of a screen. It is more noticeable for the banner notification to be displayed at the top of the screen, and does not affect the user viewing an interface of a middle area of the screen. As a result, user experience is better.

Next, the user may open the file management APP, tap a destination folder "My Files" on the interface of the file management APP, and find, in a directory of "My Files", a file that needs to be searched. In the method, by storing a file in a directory of a destination folder where a user has custom permissions, the user may find a required file in the destination folder based on a customized path. In this way, file searching may be implemented without requiring the user to master an obscure and complex default path for file storage. This makes file searching more convenient and faster, and improves user experience.

Figure 7A:
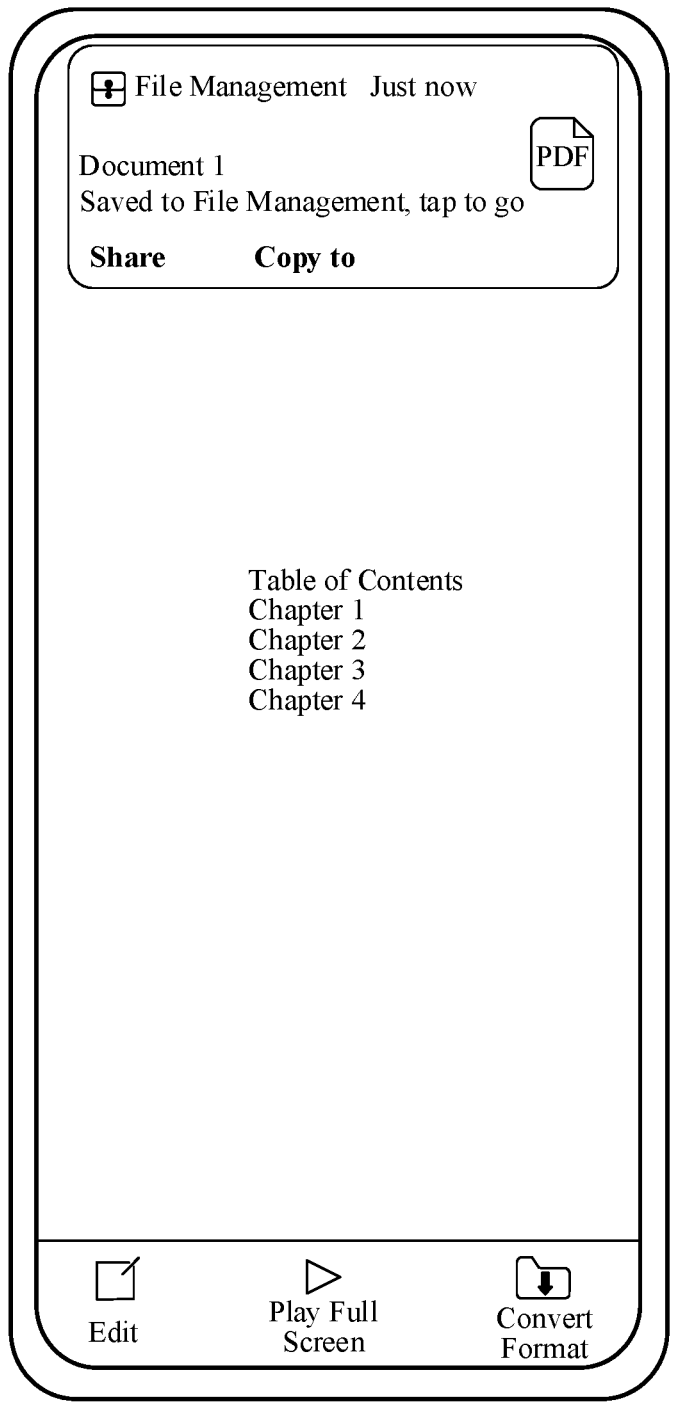
FIG. 7A to FIG. 7C are a schematic diagram of changes in an interface of a terminal device generating a banner notification according to an embodiment of this application.
Figure 7B:
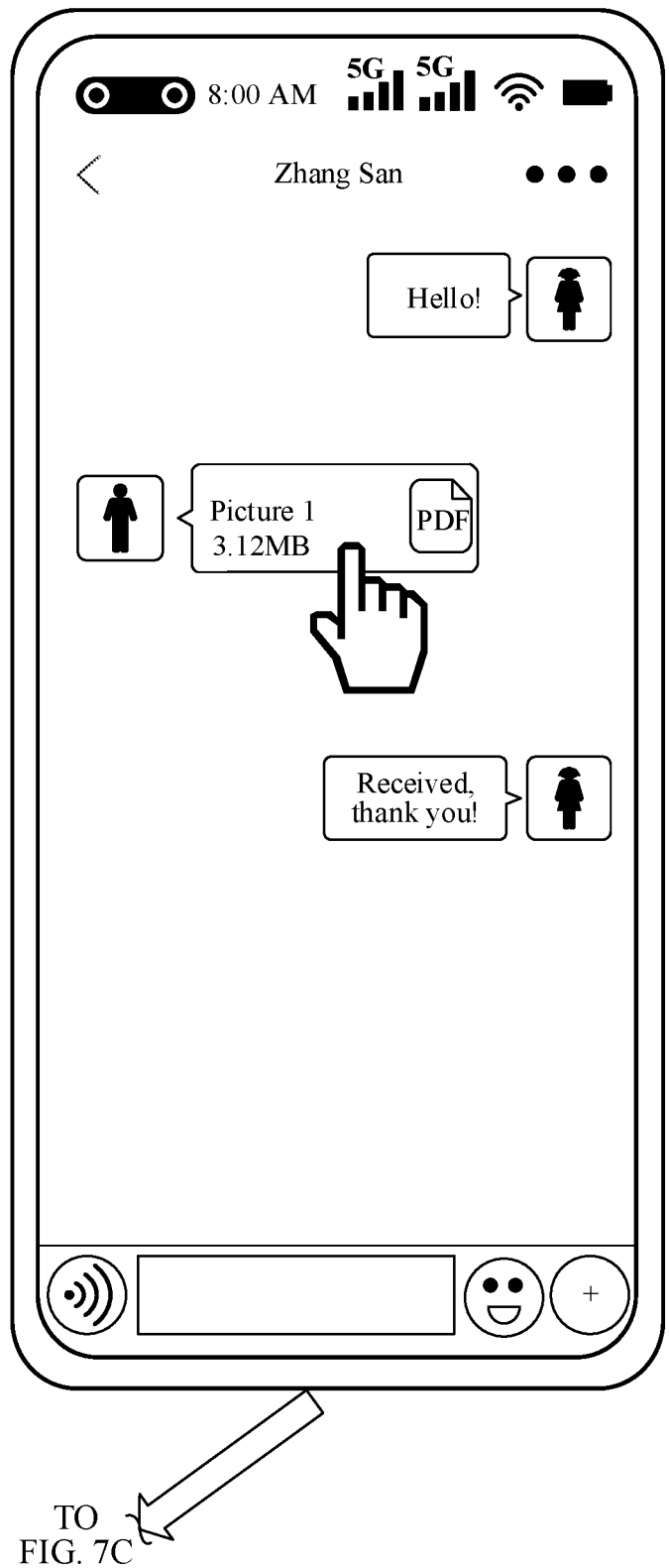
Figure 7C:
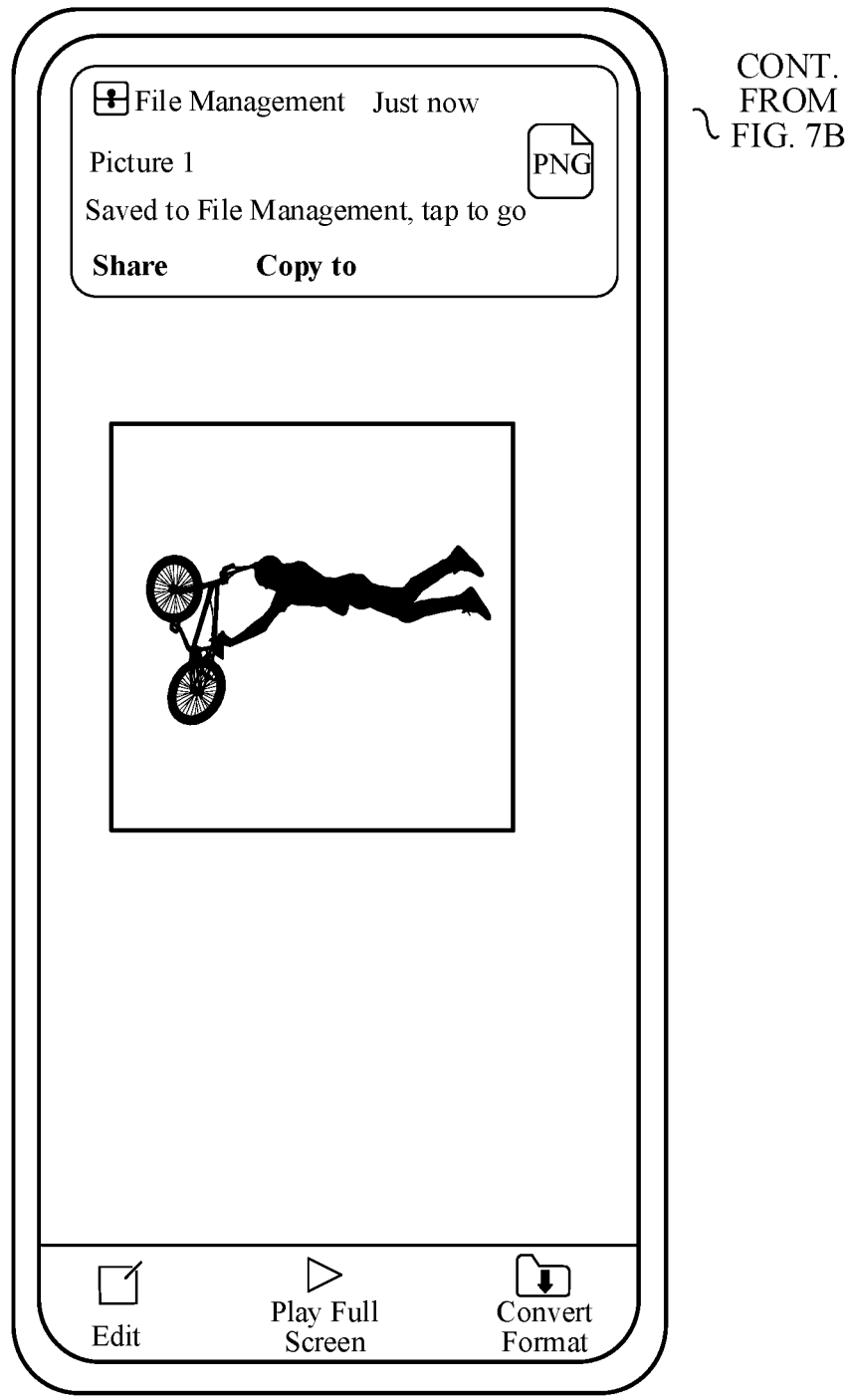

The terminal device may continuously receive a plurality of files. For each file received, a banner notification corresponding to the file will be displayed, and a banner notification of a previously received file will be replaced. Specifically, when the user receives a first file, a banner notification of the first file appears on the interface. If the first banner notification has not disappeared while a second file is received, a banner notification corresponding to the second file will be displayed on the interface of the terminal device, covering the banner notification of the first file. The example in which a user receives a file through an APP of chat 1 continues to be used. When the user taps an icon of Document 1, the terminal device displays a preview interface of Document 1. When downloading of Document 1 is completed, a banner notification of Document 1 as shown in FIG. 7A pops up on the interface of the terminal device. If the user does not tap or swipe up the banner notification, the banner notification may be displayed for a period of time. During the period of time for which the banner notification of Document 1 is displayed, if the user switches the current display interface to a chat 1 shown in FIG. 7B and taps an icon of Picture 1 sent by the other party, the terminal device downloads Picture 1. During the period of time for which the banner notification of Document 1 is displayed, the user may alternatively tap an icon of Picture 1 on the chat interface, and the terminal device displays a preview interface of the file in response to the user's tap operation. Then the user swipes up on the preview interface of the file, pulls out a menu of Picture 1 and taps a save button in the menu. In this case, the terminal device starts to download Picture 1 based on an operation of the user saving the picture. When downloading of Picture 1 by the terminal device is completed, the terminal device may display a preview interface of Picture 1, and a banner notification corresponding to Picture 1 shown in FIG. 7C may be displayed on the preview interface of Picture 1, to replace the banner notification of Document 1. In FIG. 7A to FIG. 7C above, an example in which the second file is a picture is used. In the embodiment shown in FIG. 7A to FIG. 7C, both the first file and the second file may alternatively be documents. In some embodiments, the terminal device may alternatively not display a banner notification if a file received by the terminal device is a picture or video.

If the user does not want to see a banner notification for certain files, the banner notification can be swiped up. Thereafter, the terminal device will not have a banner notification for the same type of file for a period of time. For example, when the terminal device receives a picture file and displays a banner notification of the picture file, if the user swipes up the banner notification, and within 60 seconds after the swiping up, the terminal device receives a picture file again, it will no longer be reminded in a form of a banner notification. After 60 seconds after the swiping up, the terminal device resumes a banner notification for a picture file.

If the user taps a button "Copy to" (which may alternatively be a button "Save as". A specific form of a button for transferring a file is not limited in embodiments of this application, and the embodiments of this application is described by using the button "Copy to" as an example) on the banner notification, the interface jumps to the directory of "My files". That is, the interface shown in FIG. 6D jumps to an interface shown in FIG. 8A. At this time, a file and folder in the directory of "My Files" are displayed on the interface, and a first prompt box pops up to prompt the user. The first prompt box displays: Copy one item to "My Files". If the user taps a confirm button of "V" (that is, a third control) on the prompt box, Document 1 may be stored in a root directory of "My Files", as shown in FIG. 8D. The first prompt box may further include a cancel button, such as "x". If the user taps the cancel button, an operation of saving a file may be canceled. Optionally, after canceling the operation of saving a file, the terminal device may display an interface of a root directory of a destination folder. If the user wants to save Document 1 to a specified folder, for example, save into a directory of Folder 2 (that is, a first folder), the user may tap an icon of Folder 2 on the interface shown in FIG. 7A, and a second prompt box is displayed. Prompt content in the second prompt box may be displayed as shown in FIG. 8B, as follows: Copy one item to "Folder 2". If the user taps a confirm button of "V" on the second prompt box (that is, a fourth control), Document 1 may be stored in Folder 2. Optionally, the second prompt box may further include a cancel button, such as "x". If the user taps the cancel button, an operation of saving a file may be canceled. Optionally, after canceling the operation of saving a file, the terminal device may display an interface of a root directory of a destination folder or an interface of a root directory of the first folder. Next, the user may enter the directory by tapping an icon of Folder 2, and the interface of the terminal device may present the icon of Document 1, as shown in FIG. 8C. In the method, the first file is stored, based on a user operation, in a customized path selected by the user. This makes it convenient for the user to find a file, and improves user experience.

When the user taps the icon of Document 1 on the interface shown in FIG. 8C, the terminal device may use a default program to open Document 1 for the user to read. When more than one files exist in the directory of Folder 2, the user may further switch the way the files are arranged. In FIG. 8C, an example in which files are arranged by name is used, and the user may further tap a button for switching an arrangement order, to switch the file arrangement order to a chronological order, size order, type order, or the like. The user may also switch a viewing mode of files and folders. In FIG. 8C, an example in which the viewing mode is a list form is used, and the user may tap a button for switching a viewing mode, to switch a list form of files and folders to a viewing mode of thumbnail.

Figure 9A:
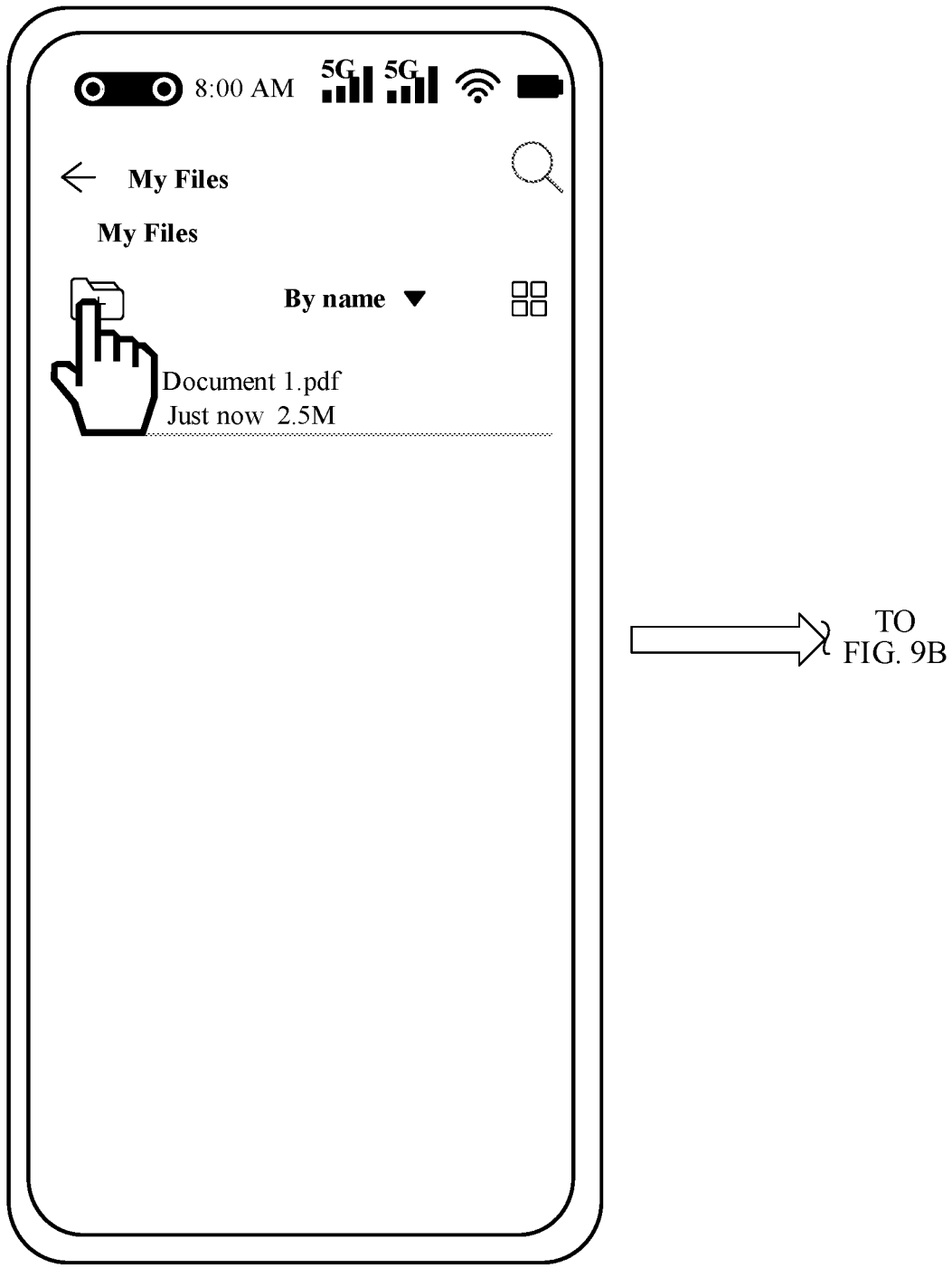
FIG. 9A to FIG. 9D are a schematic diagram of changes in an interface of a terminal device creating a new folder in "My Folder" according to an embodiment of this application.
Figure 9B:
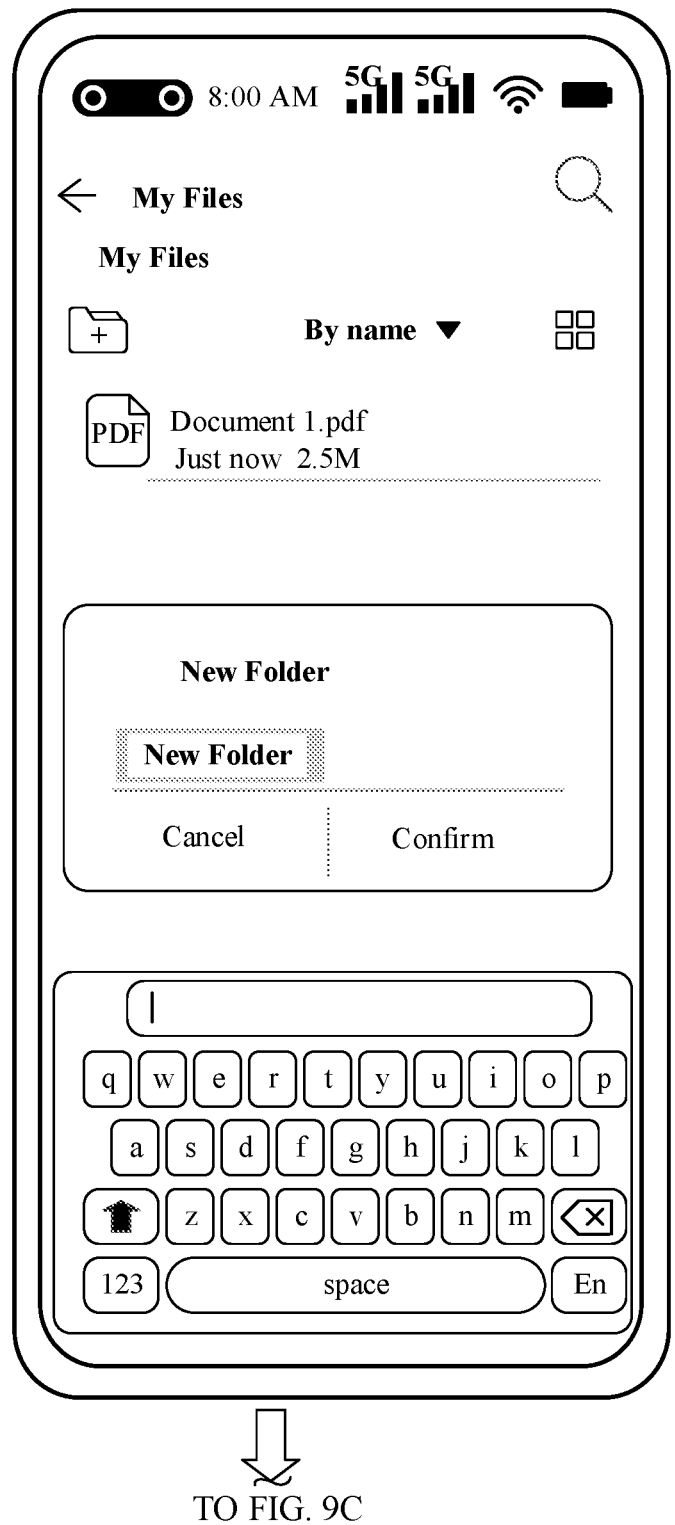
Figure 9C:
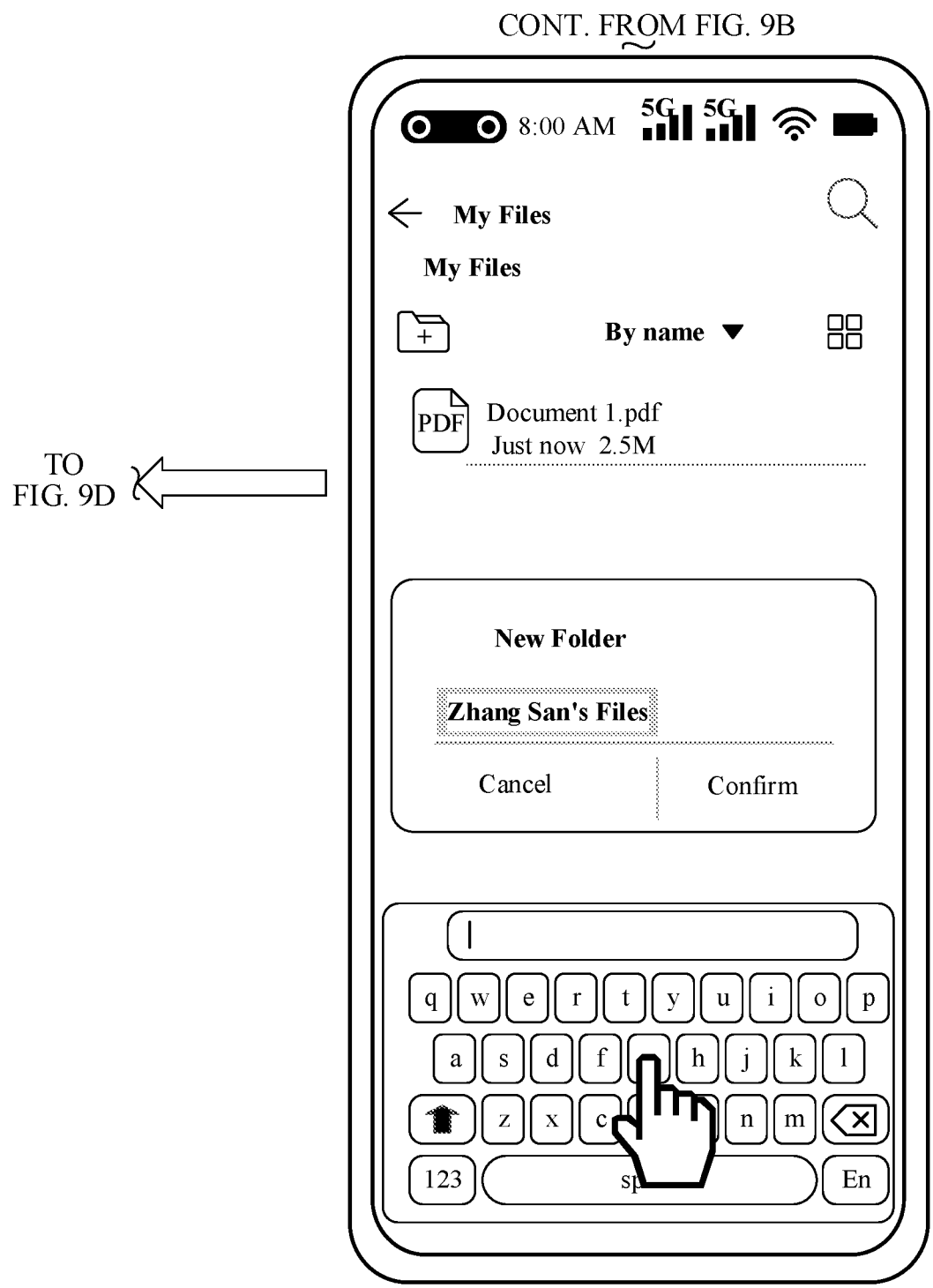
Figure 9D:
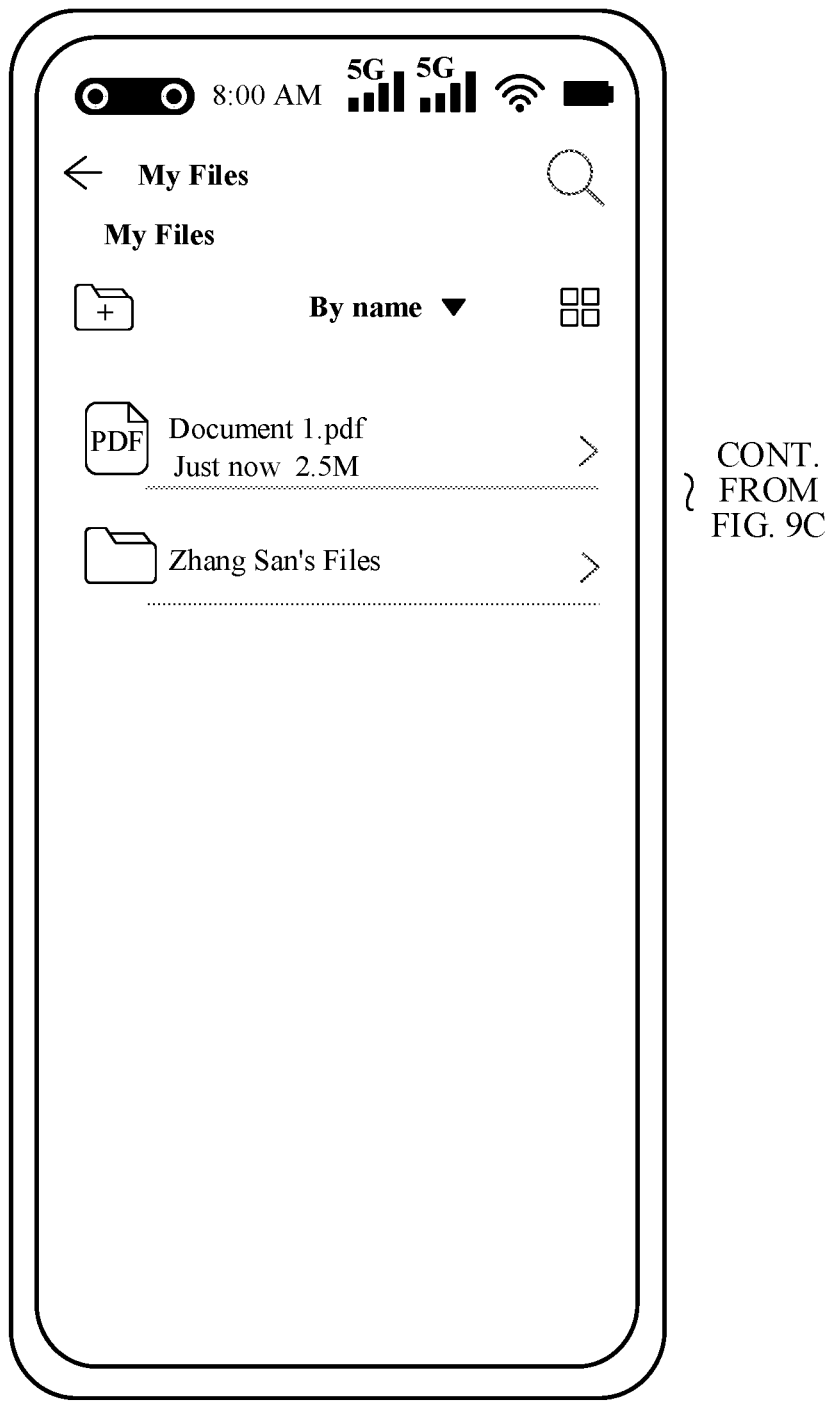

If there is a large number or variety of files in the directory, the user may also tap a button of New Folder, to add a new folder. As shown in FIG. 9A to FIG. 9D, on an interface shown in FIG. 9A, the user taps the button of "New Folder", and a dialog box of a new folder shown in FIG. 9B pops up. A name of the new folder may be "New Folder" by default. If this default name already exists in this directory, the name of the new folder may be "New Folder 2", "New Folder 3", and so on. The user may alternatively enter a customized folder name in an input field for the name of the new folder, for example, a customized folder name "Zhang San's Files" as shown in FIG. 9C. After the user enters the customized folder name, and taps a confirm button, a folder named "Zhang San's Files" is generated in this directory, as shown in FIG. 9D.

Figure 10A:
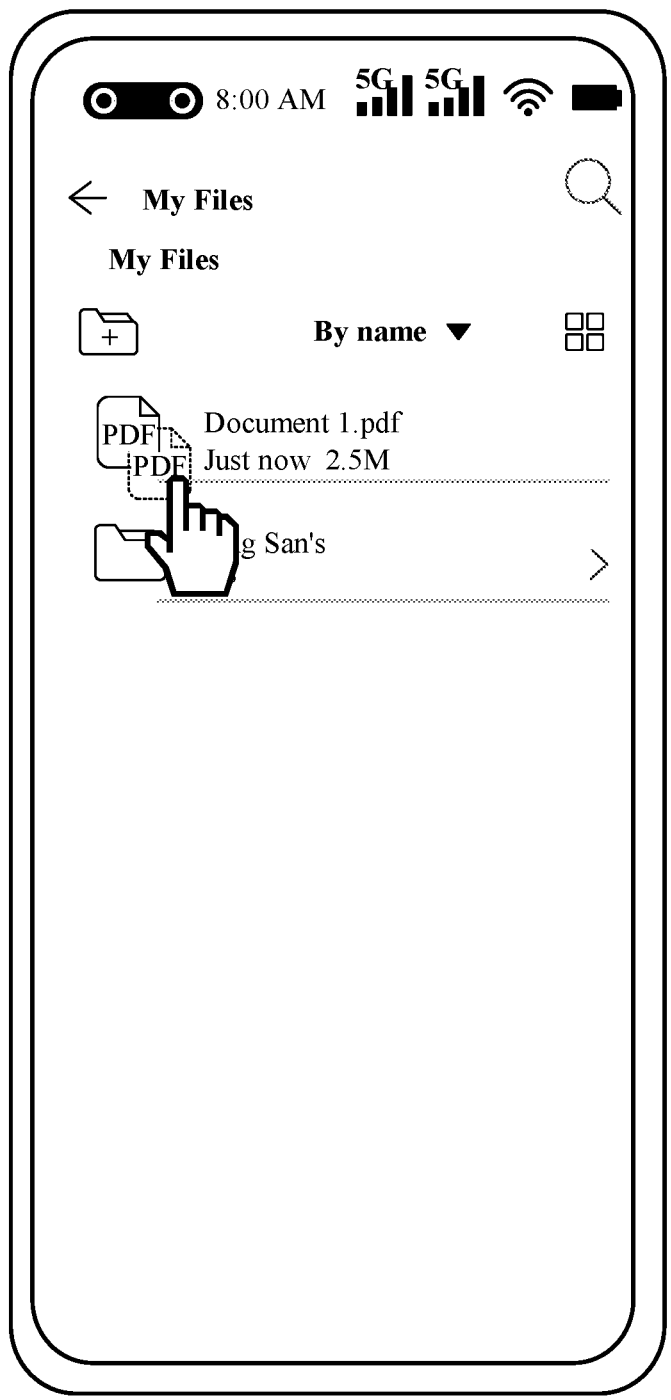
FIG. 10A to FIG. 10D are a schematic diagram of changes in an interface of a terminal device moving a file directory in "My Folder" according to an embodiment of this application.
Figure 10B:
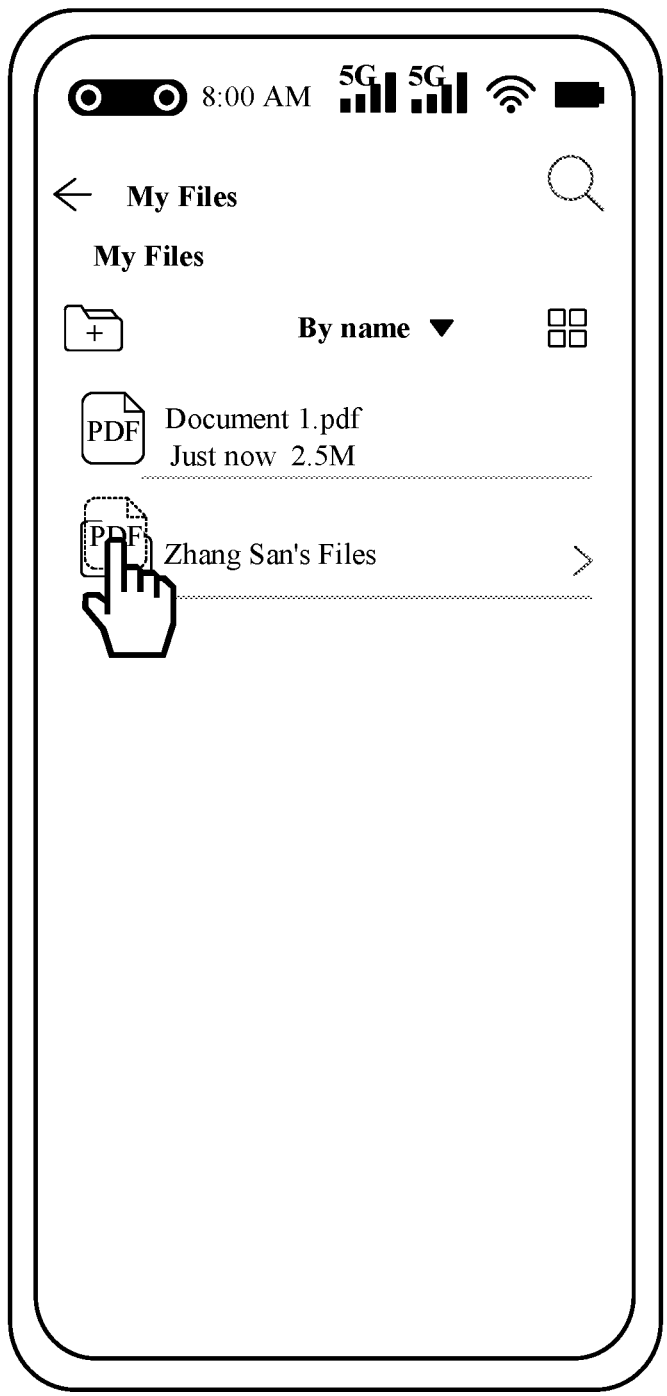
Figure 10C:
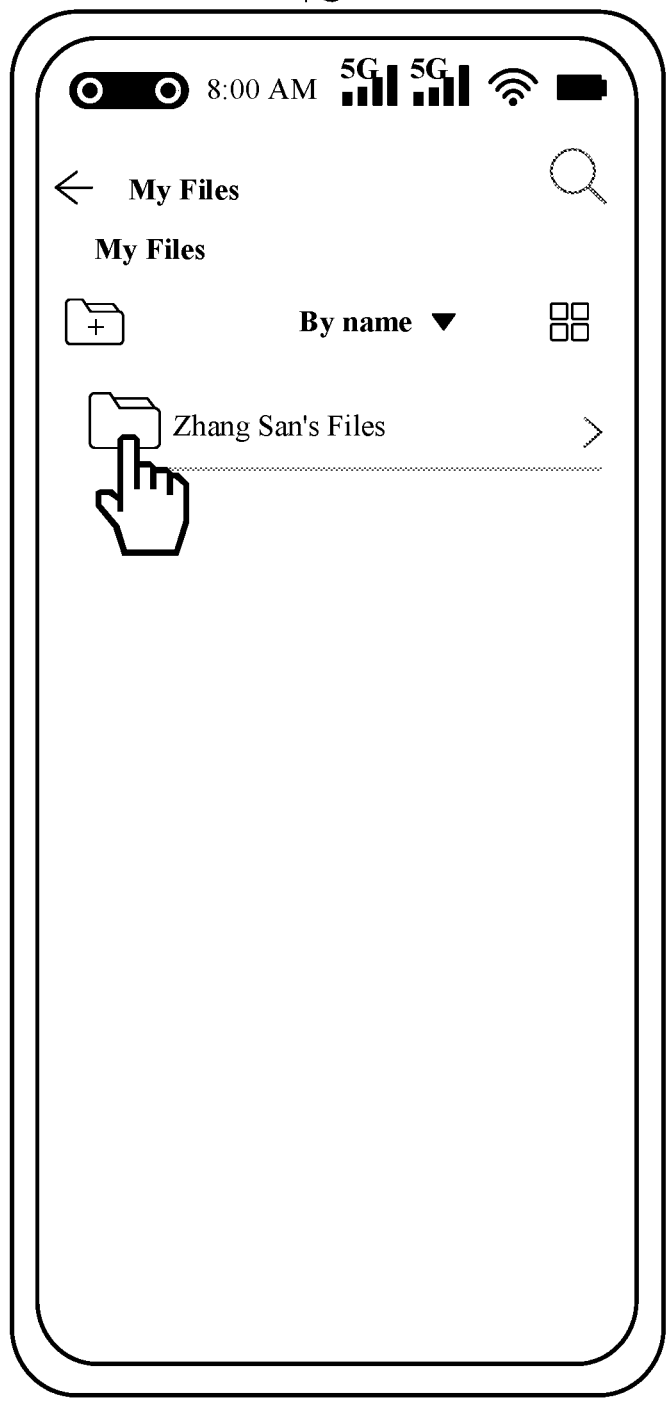
Figure 10D:
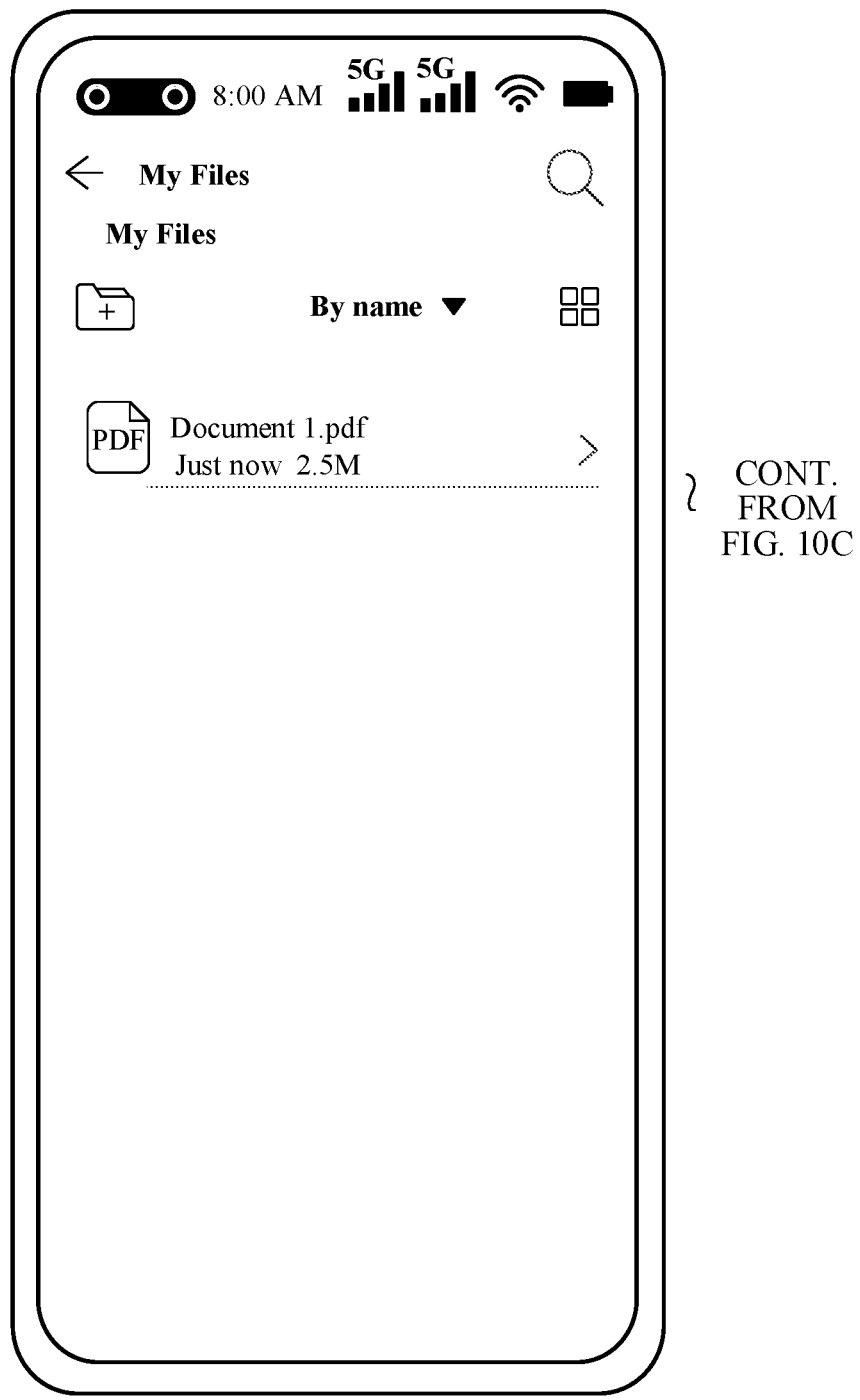

To move Document 1 to the newly created folder "Zhang San's Files", the user may operate on Document 1. For example, the user long presses the icon of Document 1, so that the icon is selected and suspended, as shown in FIG. 10A. Then the user drags the icon of Document 1 above an icon of "Zhang San's Files" and then releases it, for example, drags the icon of Document 1 to a location shown by the icon of Document 1 in a suspended state as shown in FIG. 10B, and Document 1 is transferred to be in a directory of "Zhang San's Files". In this case, because a storage directory of Document 1 has been moved and Document 1 no longer exists in the current directory, for example, on an interface shown in FIG. 10C, the current directory has the folder "Zhang San's Files" left. When the user taps and enters the directory of "Zhang San's Files", the interface may display the icon of Document 1 as shown in FIG. 10D.

Figure 8A:
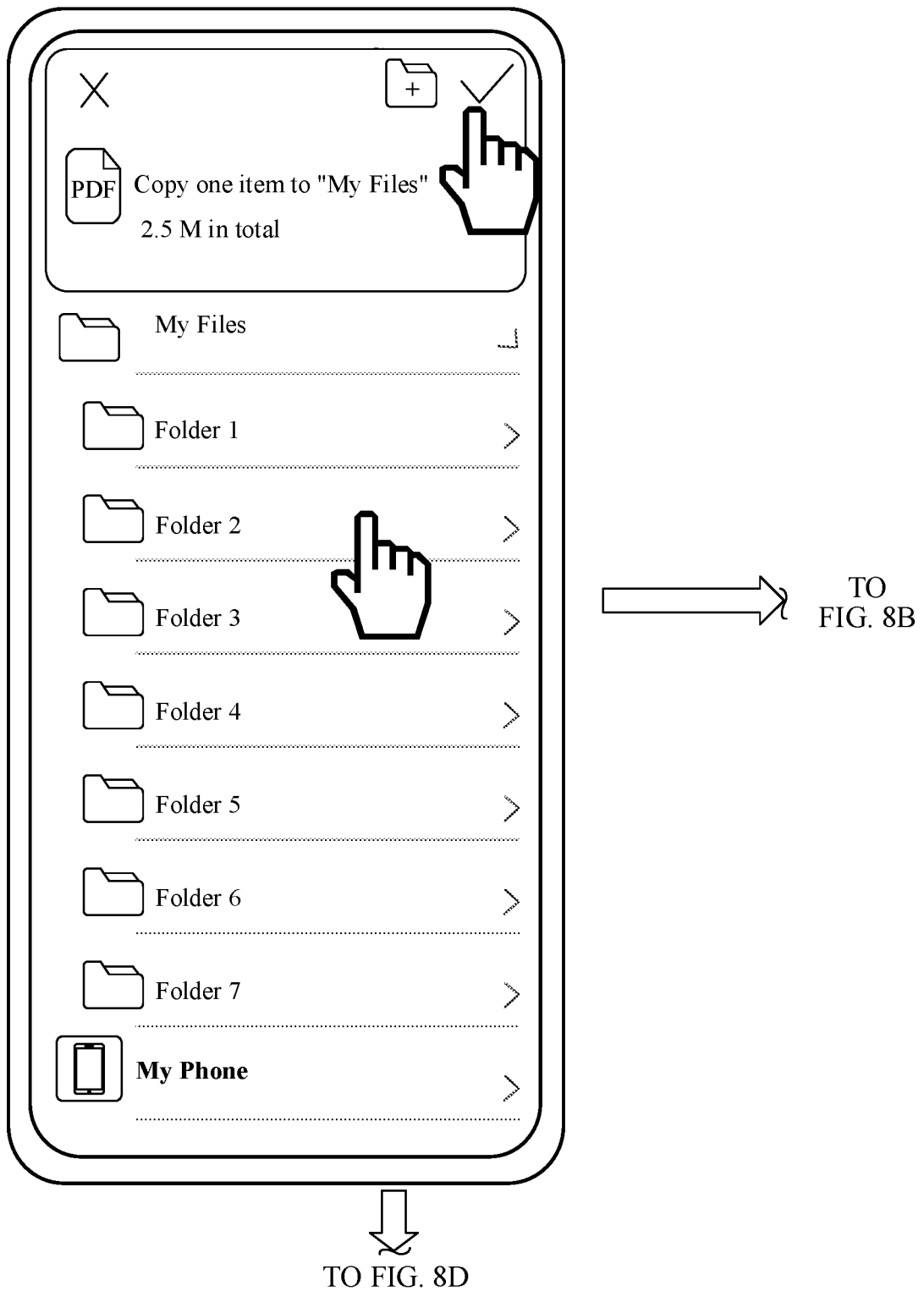
FIG. 8A to FIG. 8D are a schematic diagram of changes in an interface during saving a file by a terminal device according to an embodiment of this application.
Figure 8B:
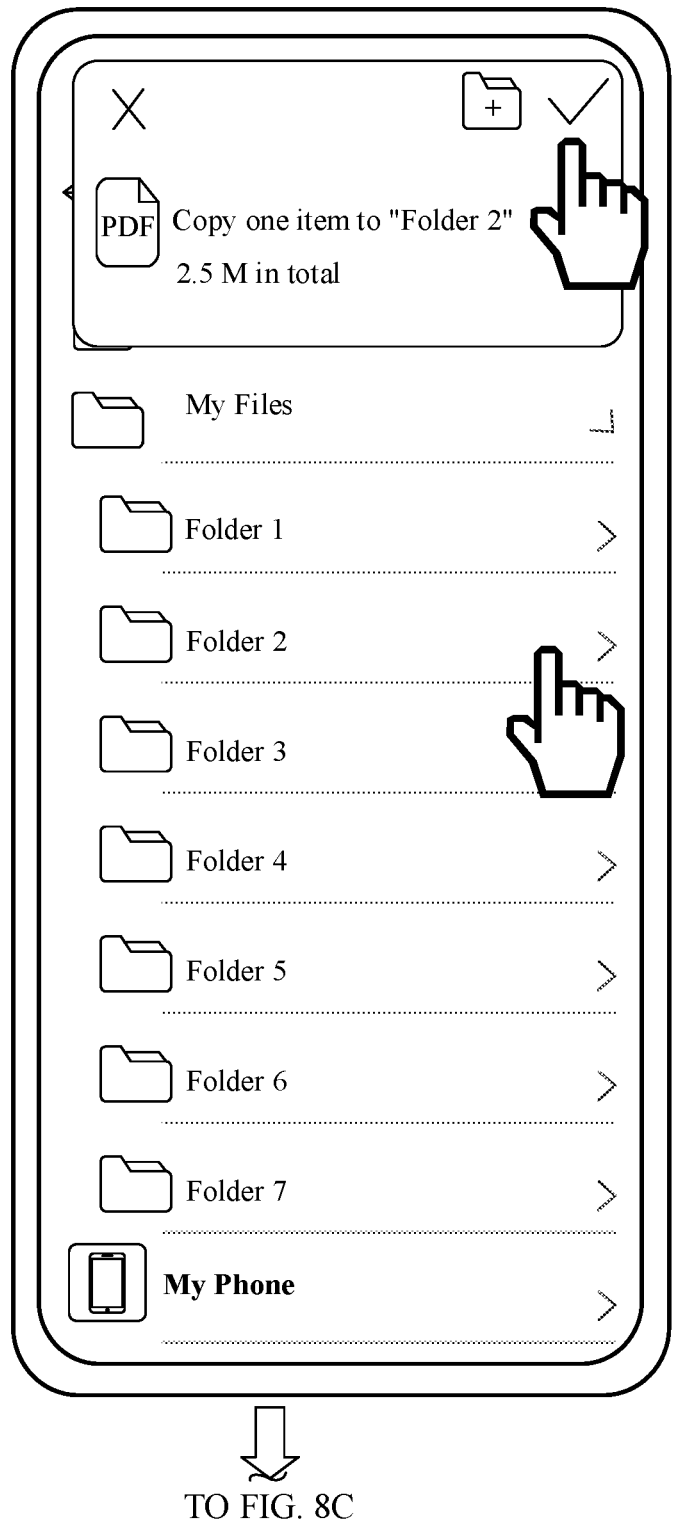
Figure 8C:
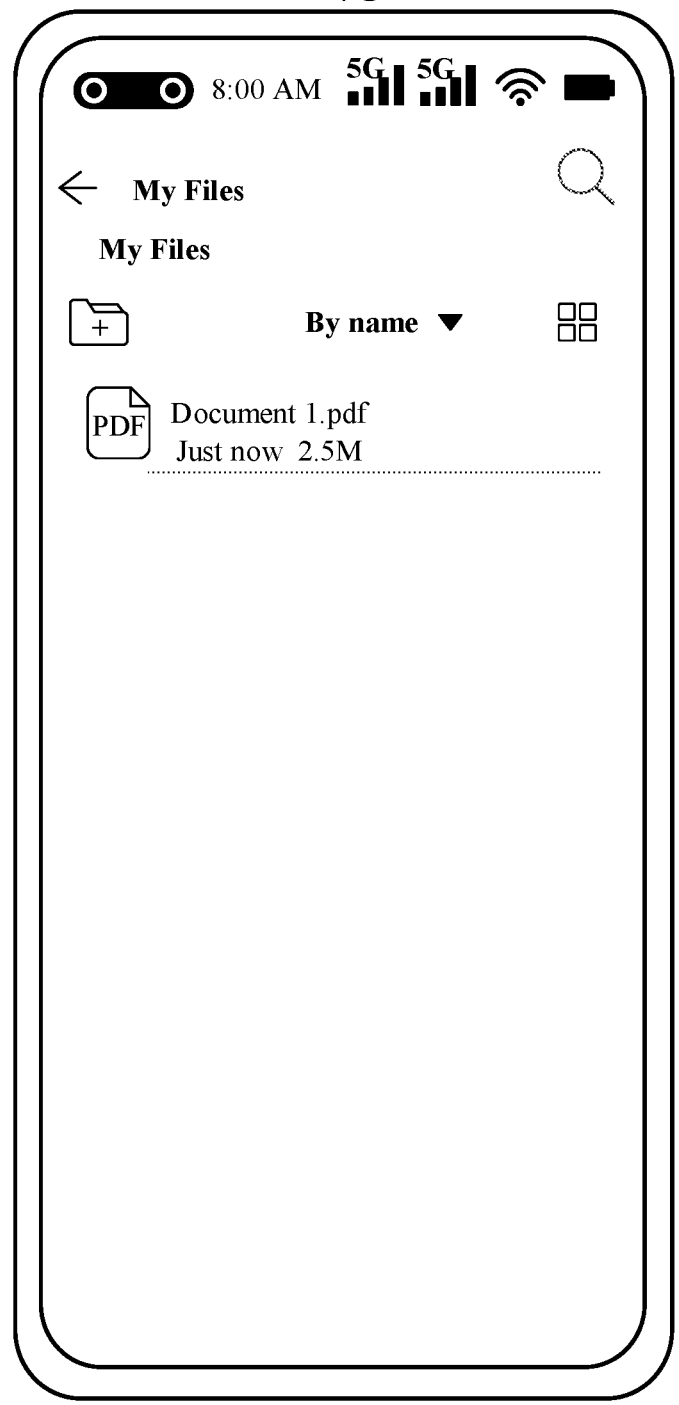
Figure 8D:
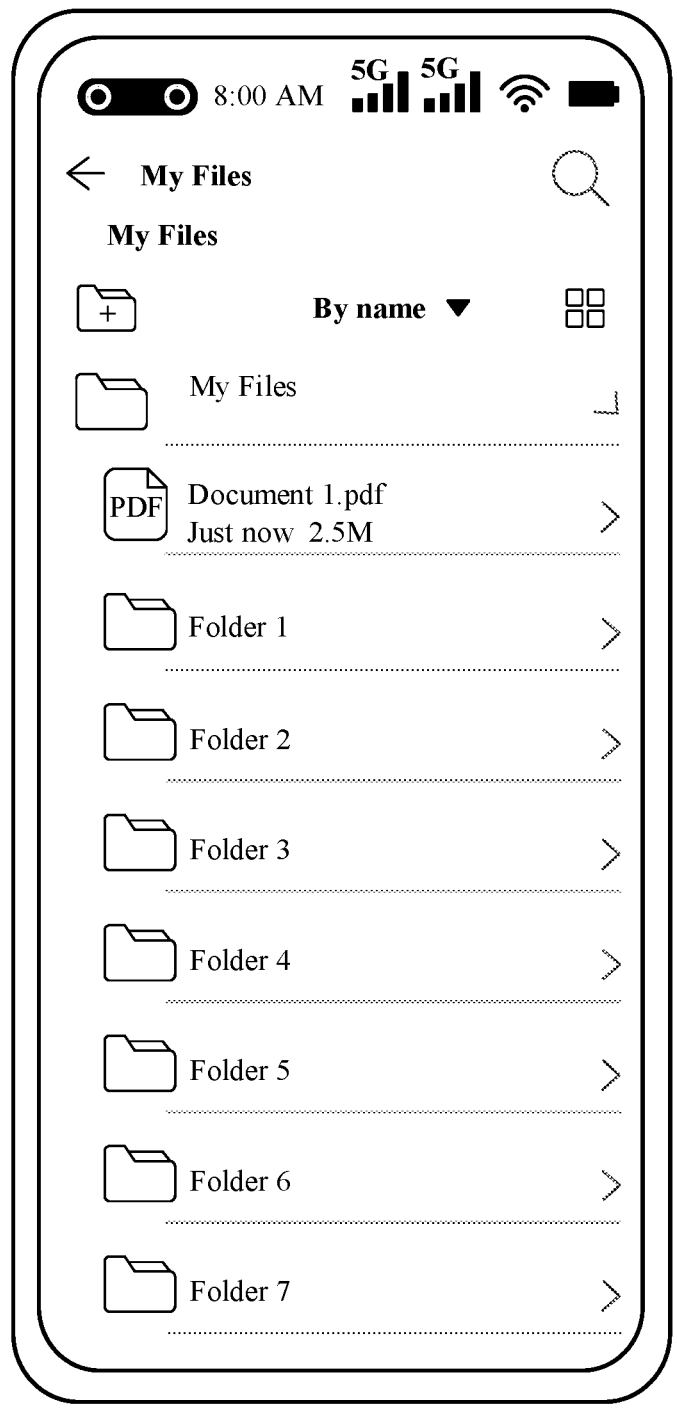

If the user taps the button "Copy to" on the banner notification and finds that there is no folder that meets a requirement on the interface shown in FIG. 8A, the user may tap the button of New Folder to add a new folder. A specific process of creating a new folder may refer to a process shown in FIG. 9A to FIG. 9D. Details will not be repeated here.

If the user taps the button "Copy to" on the banner notification and finds that the file does not need to be saved, the user may tap the cancel button, for example, a button "x" on the banner notification shown in FIG. 8A, to cancel the operation.

The file storage process shown in FIG. 8A to FIG. 8D is merely an example, and in fact, the user may alternatively select a directory of more levels to store a file as needed.

Figure 11A:
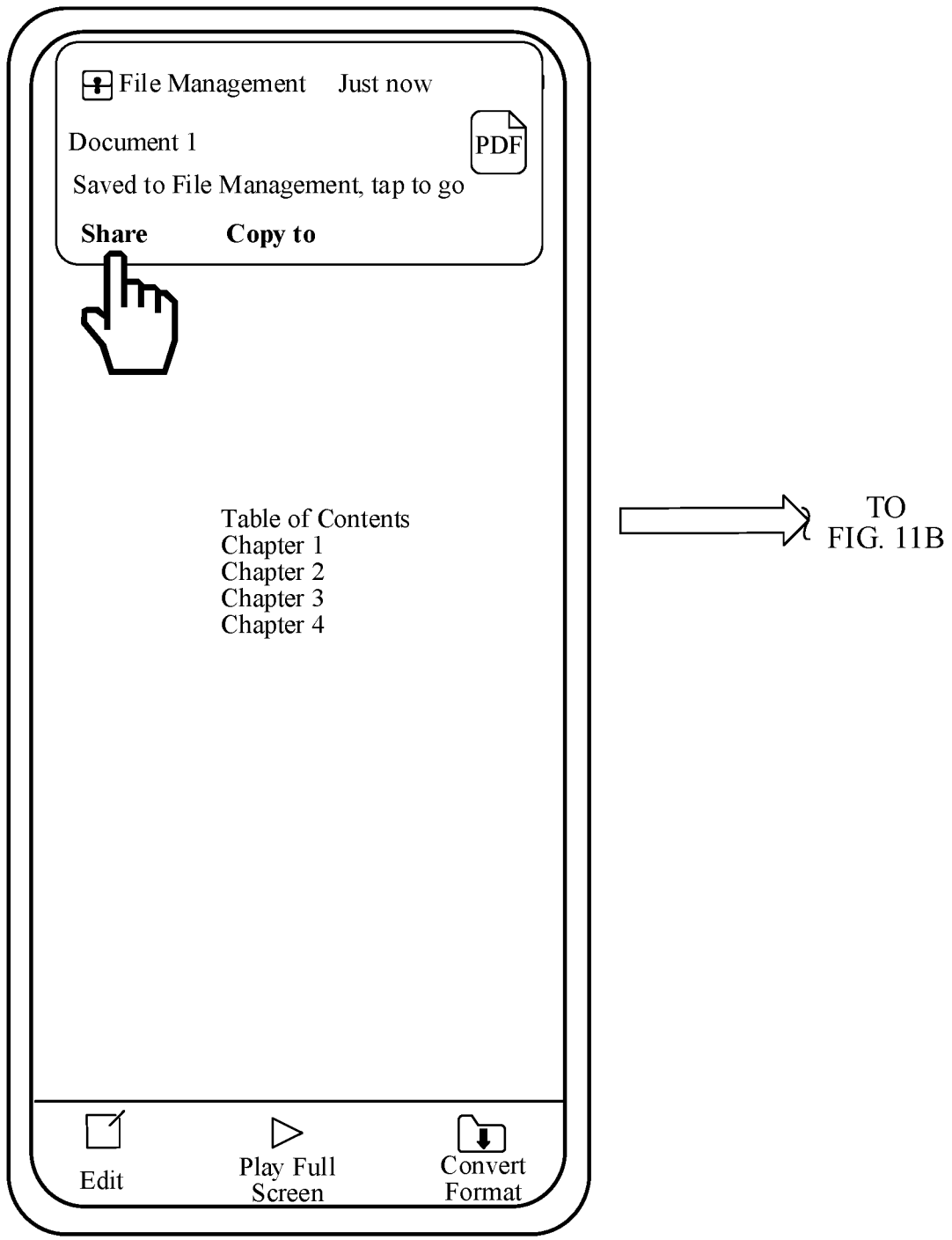
FIG. 11A to FIG. 11D are a schematic diagram of changes in an interface of a terminal device sharing a file based on a user operation according to an embodiment of this application.
Figure 11B:
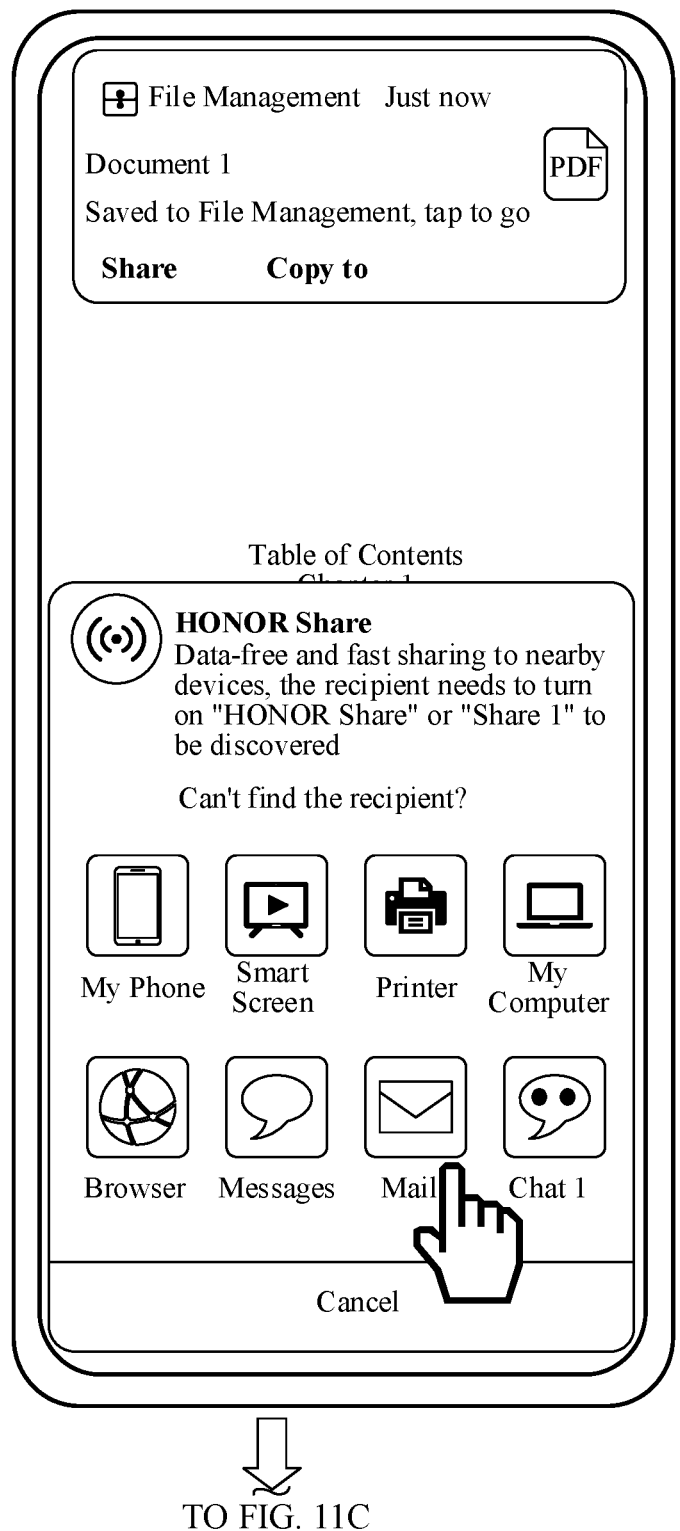

The user may further operate on the banner notification to share a file. For example, the user may tap a button "Share" on the banner notification and operates as shown in FIG. 11A, and then, a share window of HONOR pops up on the interface, as shown in FIG. 11B. The share window may display icons of a plurality of share objects. The icons may include icons of other APPs installed on the terminal device, including but not limited to an icon of a mail APP, an icon of a chat APP, an icon of a browser, and an icon of a Messages APP. The icons may further include icons of other devices, including but not limited to an icon of another mobile phone, an icon of another large-screen device (smart screen), an icon of a printer, and an icon of a computer. The user may tap and select an object to share as needed, and then share a file. The terminal devices may share a file to another APP or another device, making resource sharing richer and more diverse.

Figure 11C:
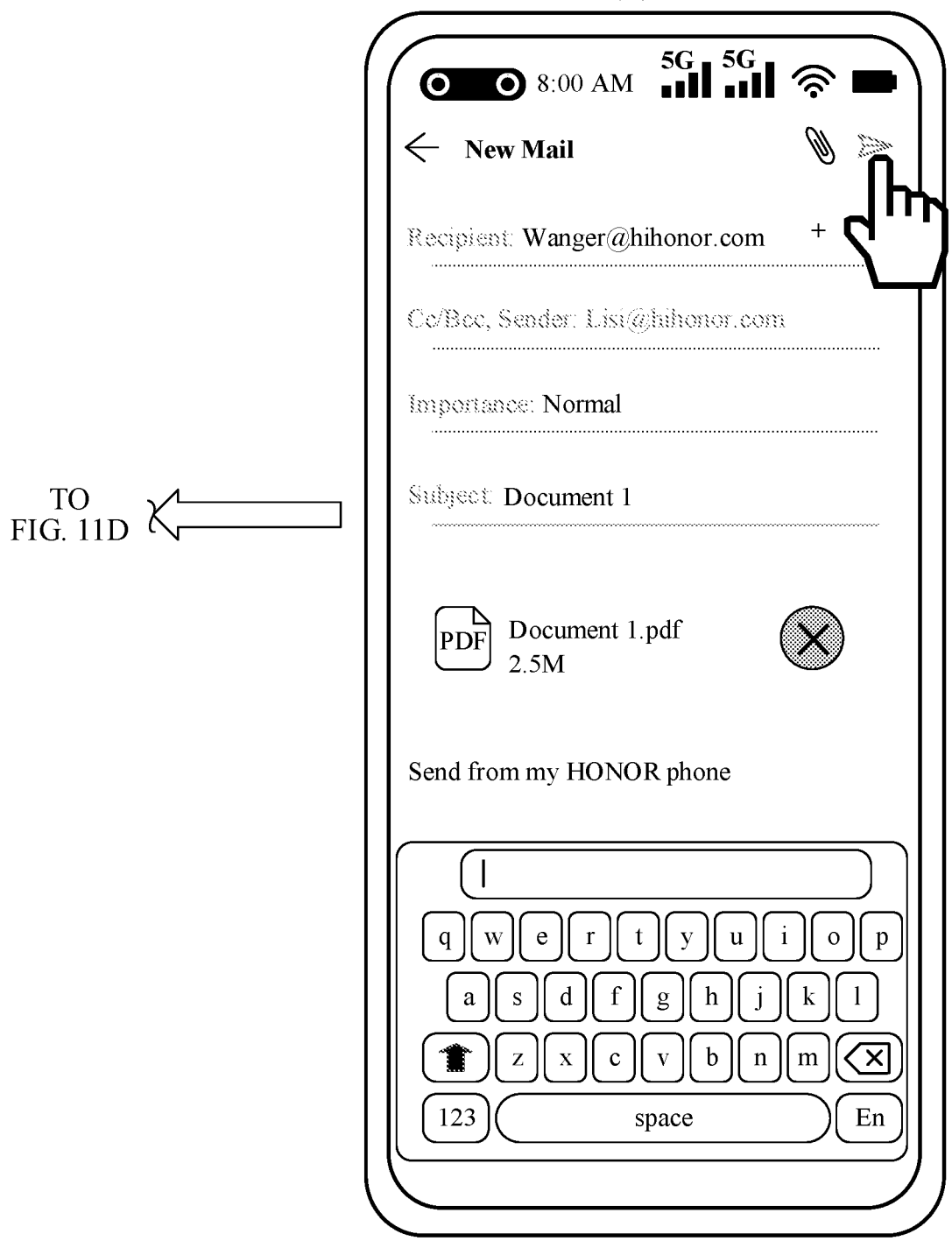
Figure 11D:
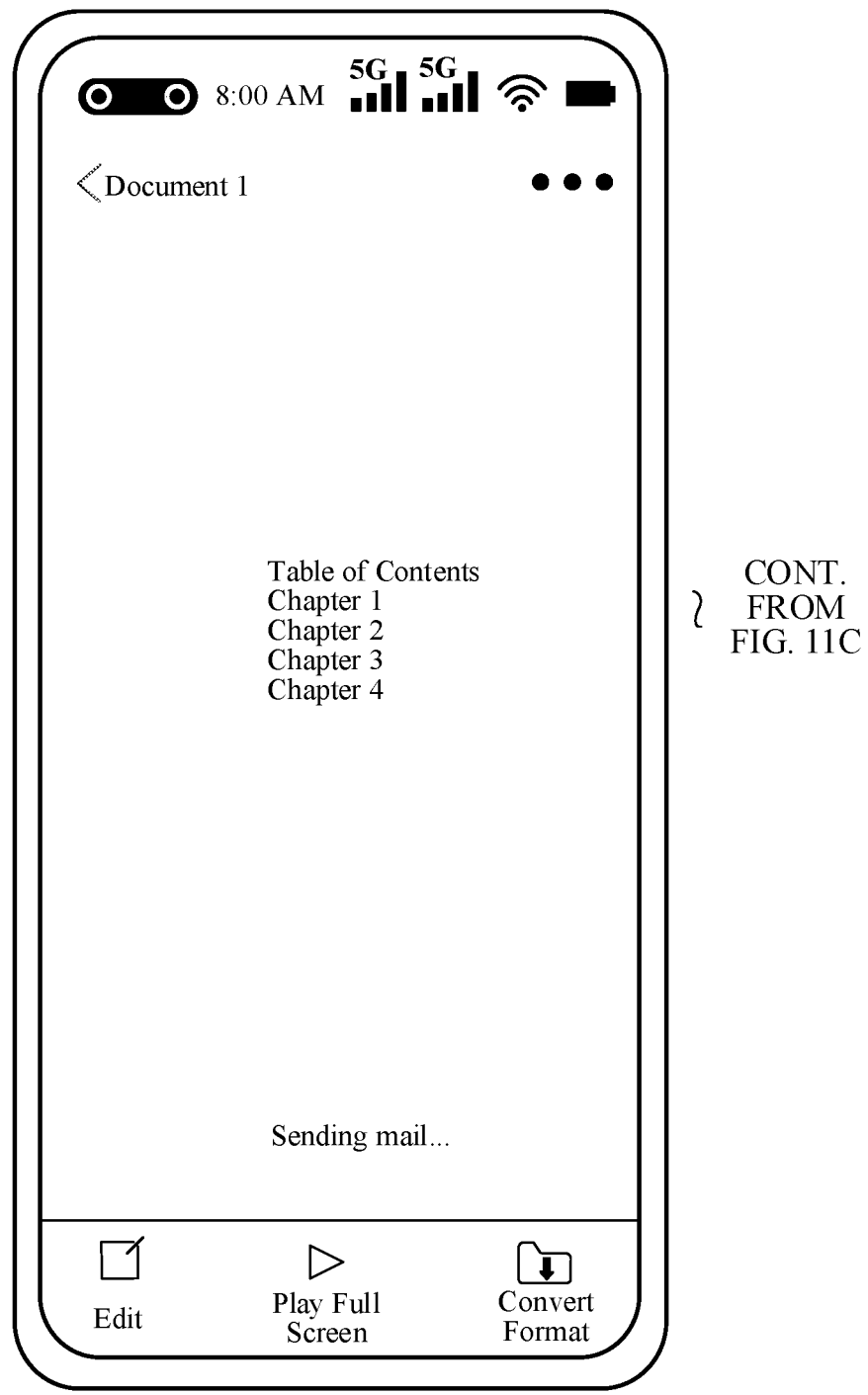

In FIG. 11A to FIG. 11D, an example in which a file is shared by mail is used to illustrate. When a user taps an icon of a mail APP in a share window on an interface shown in FIG. 11B, the interface switches to an interface of the mail APP sending a mail, as shown in FIG. 11C. At this time, Document 1 automatically appears in an attachment column, as an attachment to the mail sent this time. The user enters information for sending the mail on the mail sending interface shown in FIG. 11C, such as entering a recipient, a subject, and a mail body, selecting an importance level, and so on, and then taps a send button to send the mail, where Document 1 is shared as an attachment to the recipient's mailbox. If the user does not want to share Document 1 during entering the information for sending the mail, the user may delete the attachment by tapping a delete button "x" near an icon of the attachment in the attachment column. The information for sending the mail shown in FIG. 11C is merely an example. After the user taps the send button, the interface of the terminal device jumps from the interface of sending a mail as shown in FIG. 11C to an interface of content of Document 1, and a status of mail sending is displayed simultaneously, as shown in FIG. 11D. When the interface of the terminal device has just jumped to the interface of the content of Document 1, it is possible that the mail is being sent, and the status of mail sending shown in FIG. 11D may be displayed as "Sending mail . . . ", indicating that the mail has not been sent successfully. Optionally, when the mail is successfully sent, prompt information of the mail sending status disappears, and the content of Document 1 is displayed directly on the interface. Alternatively, the prompt information of the mail sending status is switched from "Sending mail . . . " to "Sent", and the prompt information disappears automatically after displaying a period of time. For example, after three seconds since displaying the character "Sent", the prompt for the mail sending status disappears, and the interface displays the content of Document 1.

The terminal device pulls up a share window by the user operating on a share control of a banner notification, and shares a file to a target object selected by the user, thereby implementing resource sharing and enriching a function of the terminal device. Compared to a process in which the user actively finds a file and then shares it, the method in which file sharing is implemented by directly pulling up a share window by operating a share control of a banner notification in this embodiment makes operations more convenient and faster, improves efficiency of resource sharing, and improves user experience.

Figure 12A:
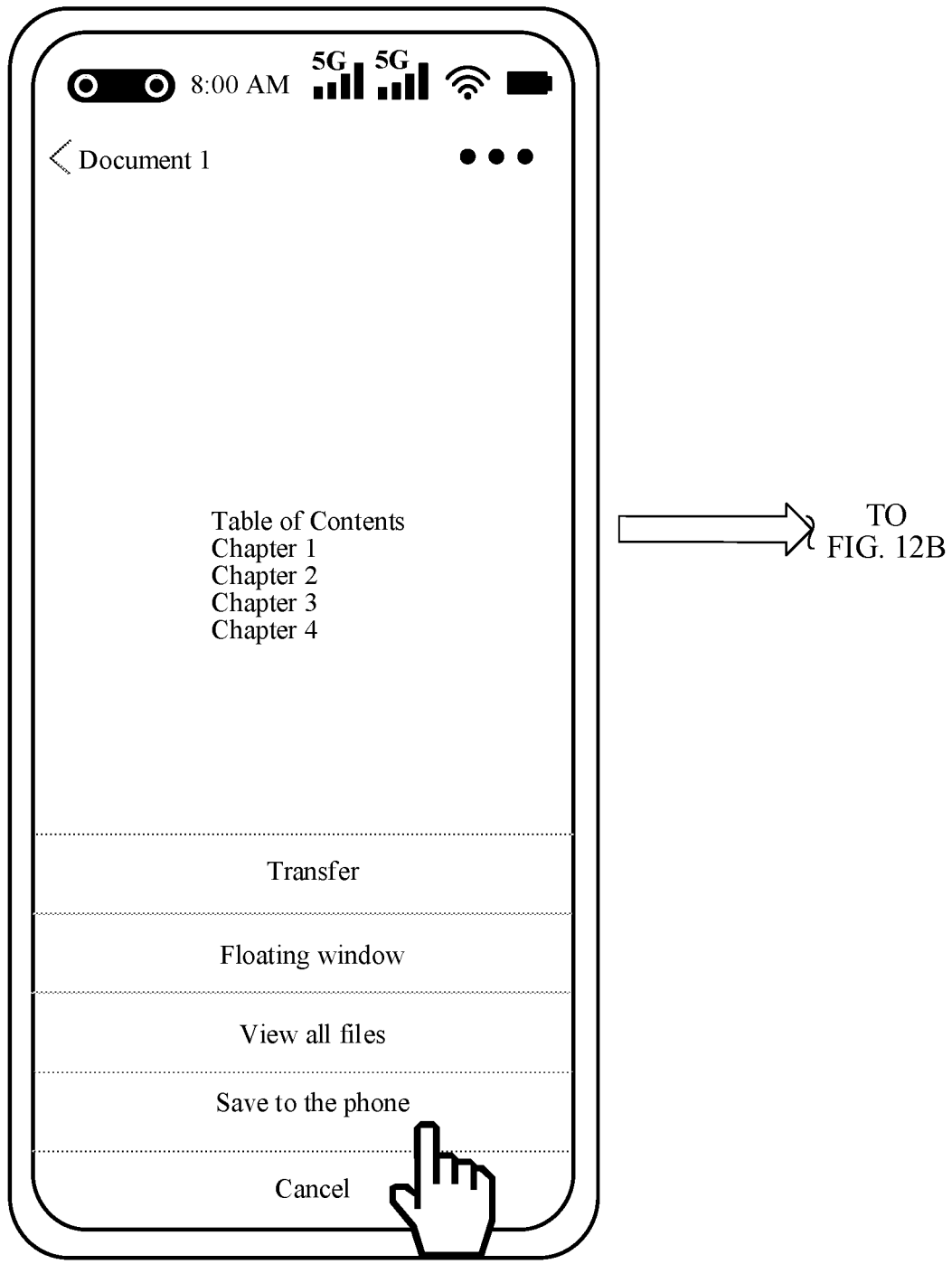
FIG. 12A and FIG. 12B are a schematic diagram of changes in an interface of a terminal device popping-up a banner notification based on a user operation according to an embodiment of this application.
Figure 12B:
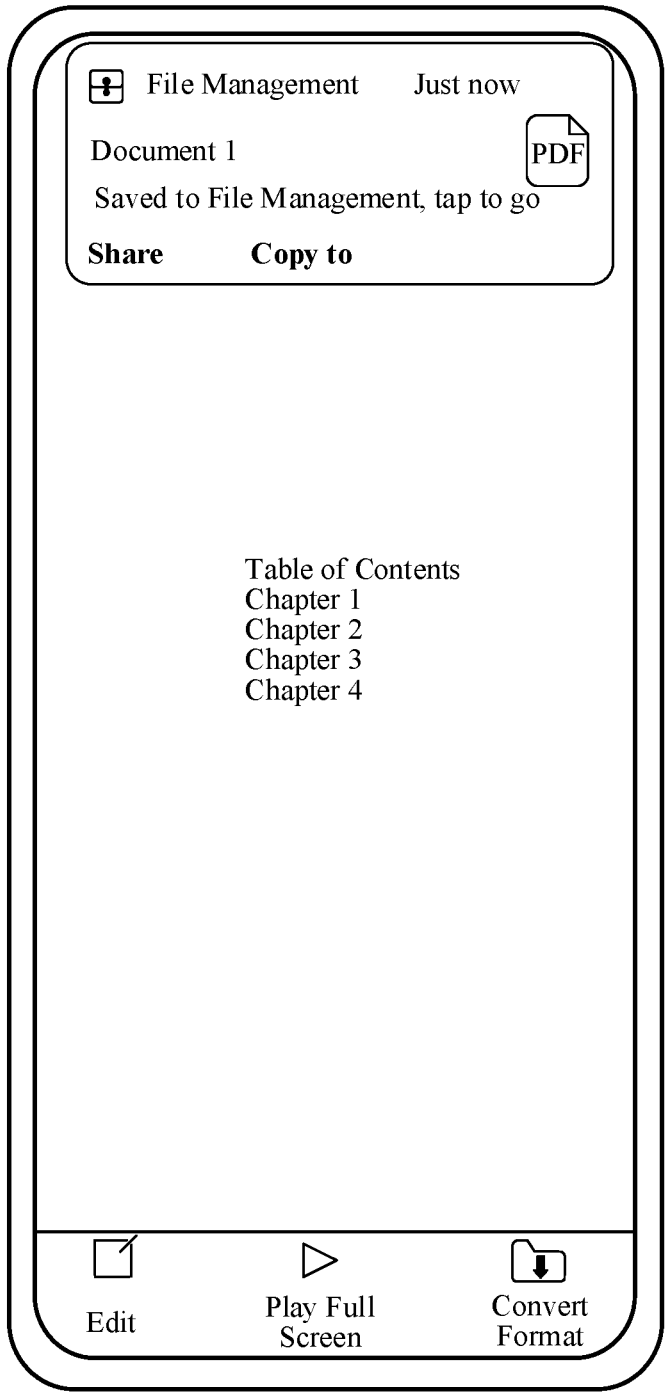

In the foregoing embodiment, the user triggers downloading of a file by tapping an icon of the file. In embodiments of this application, the user may alternatively trigger downloading of a file by manually tapping a save button for the file (e.g., tapping "Save to phone"). Downloading of Document 1 is triggered when the user taps a menu bar of Document 1 as shown in FIG. 12A and taps a save button. When the downloading of Document 1 is completed, a banner notification for Document 1 as shown in FIG. 12B pops up on the interface.

Figure 13A:
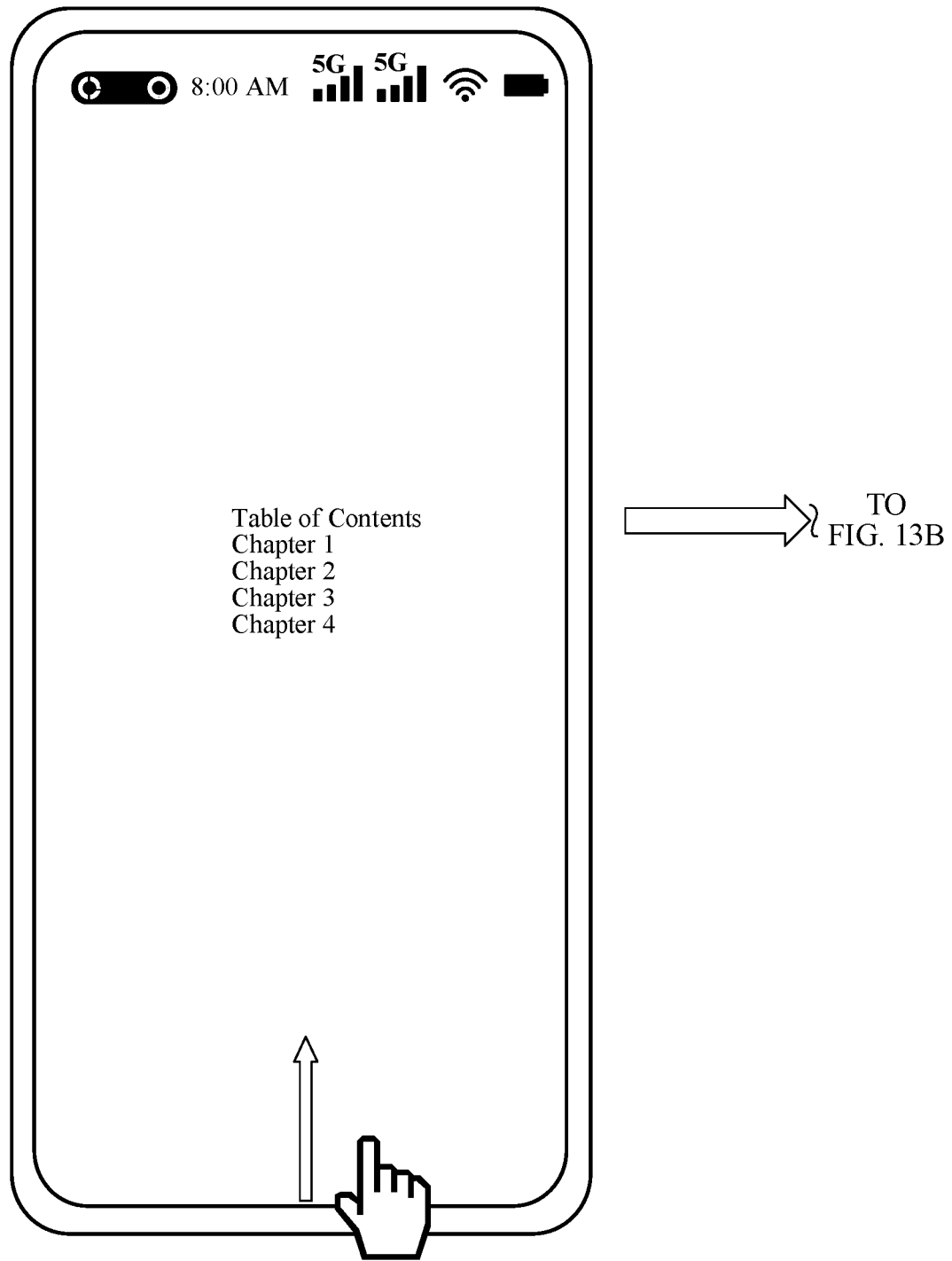
FIG. 13A and FIG. 13B are a schematic diagram of changes in an interface of a terminal device sharing a file based on a user operation according to an embodiment of this application.
Figure 13B:
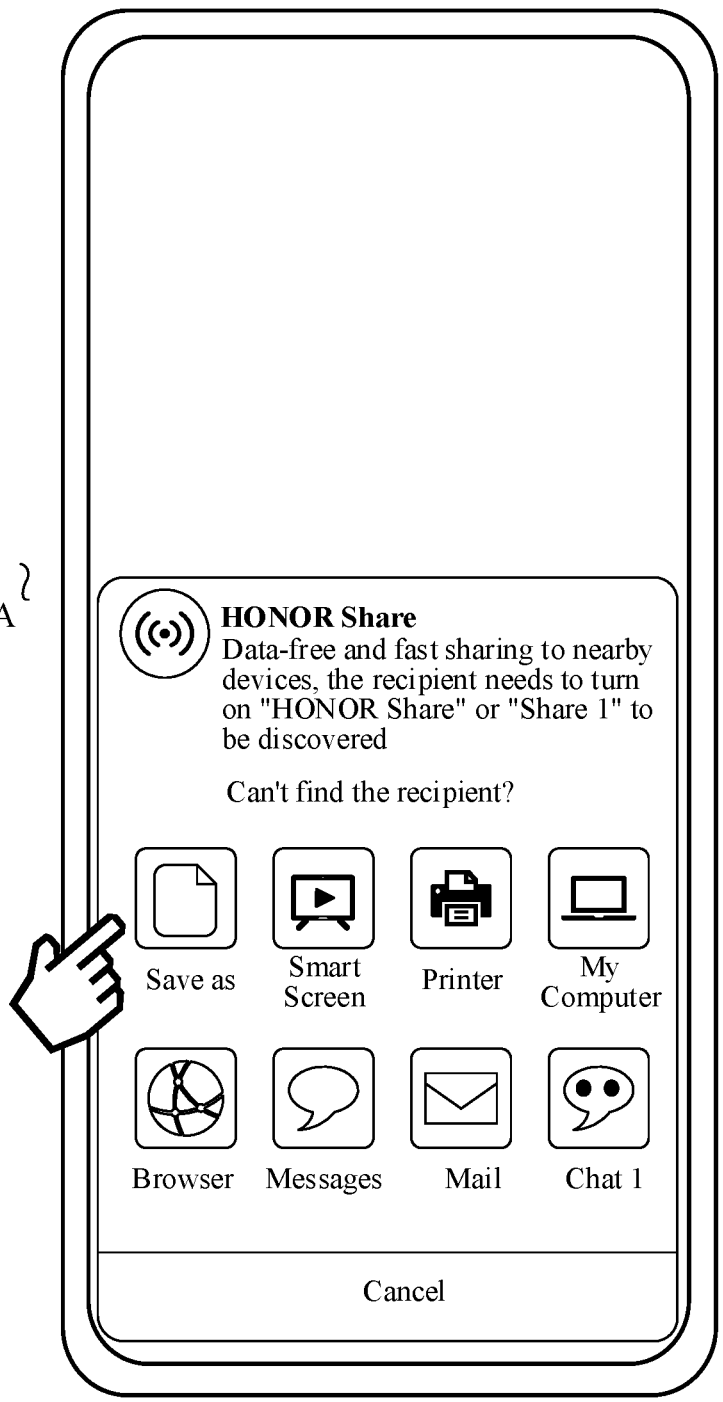

Optionally, the user may alternatively operate as shown in FIG. 13A, that is, swipe up and pull up a share window of HONOR as shown in FIG. 13B on the interface of Document 1. The share window may include a plurality of share objects, and may further include a button "Save as". When the user taps the button "Save As" in the share window, the interface may jump to the directory of "My Files" on the interface as shown in FIG. 8A, and the file is saved based on a specified path.

Figure 14A:
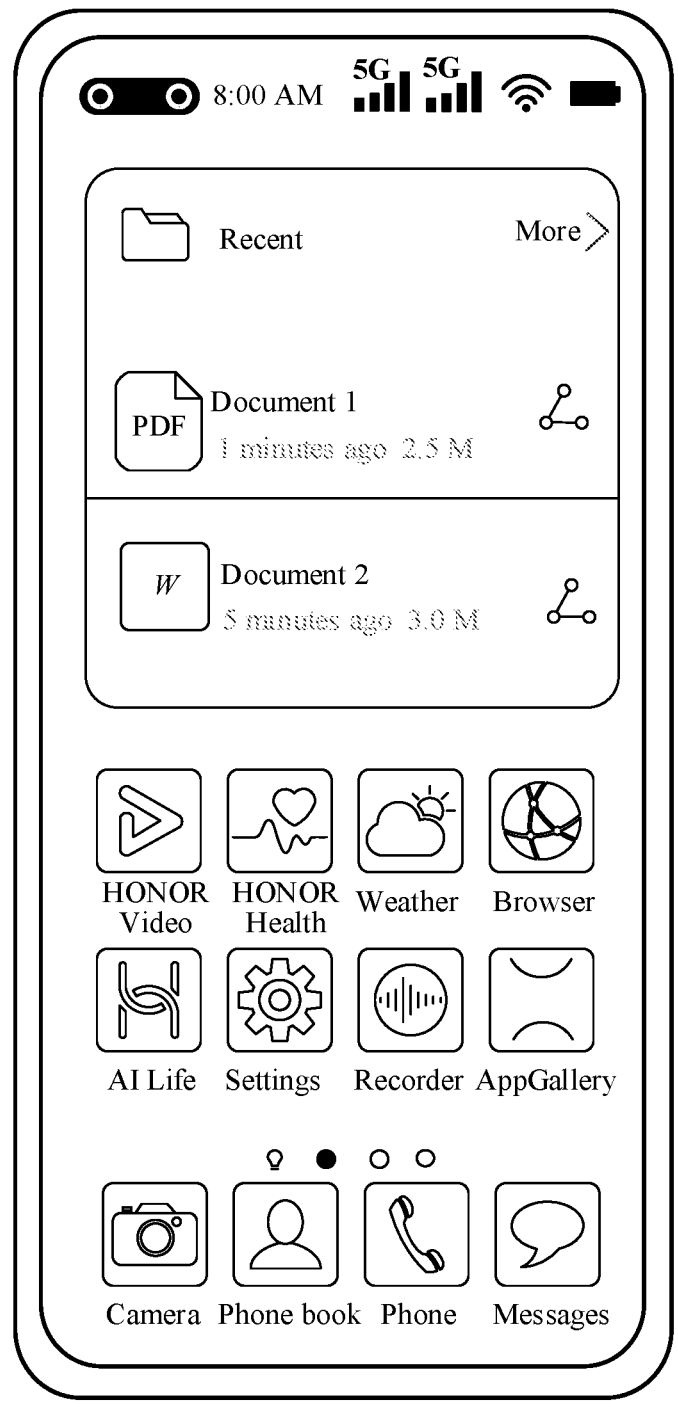
FIG. 14A to FIG. 14C are a schematic diagram of an interface for displaying a file manager widget according to an embodiment of this application.
Figure 14B:
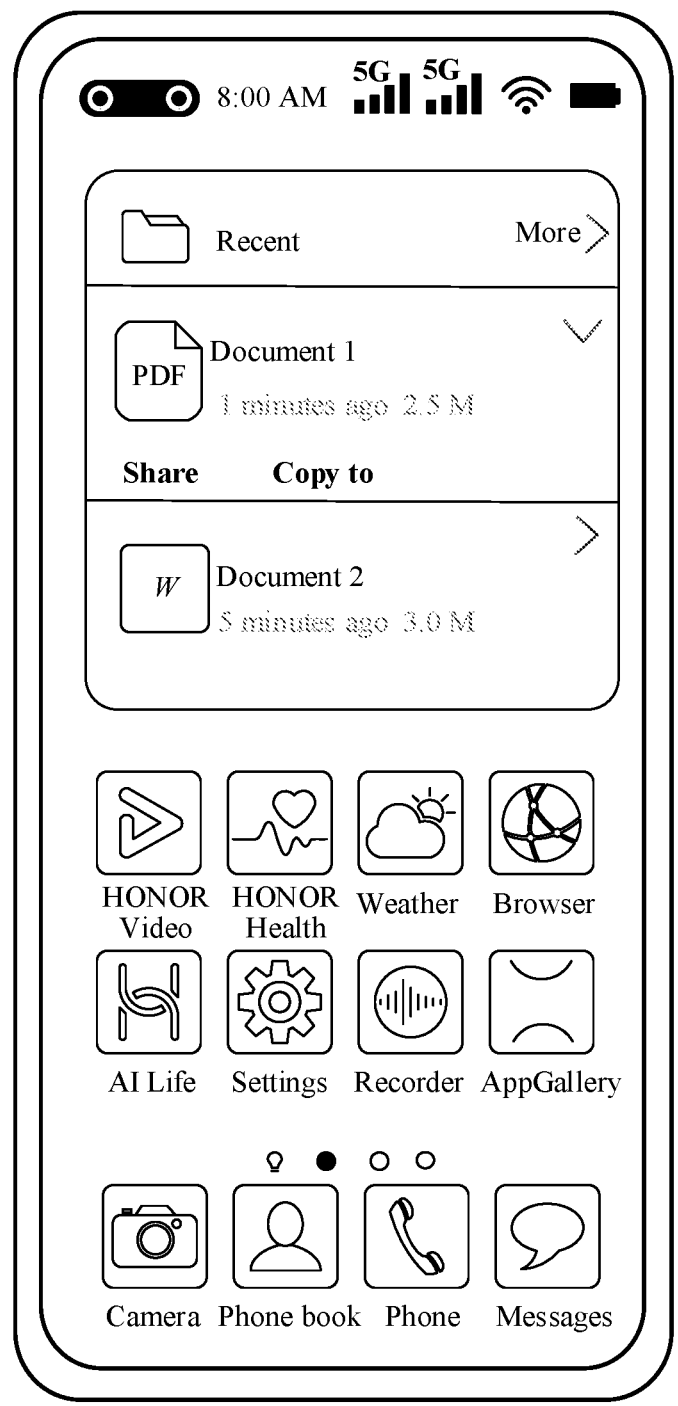
Figure 14C:

Optionally, if the user directly returns to the desktop when viewing a file, without closing the file, the desktop may further display a widget of file management as shown in FIG. 14A. Optionally, a recently accessed file may be displayed in the widget of the file management. The user may tap the widget of the file management and enter an interface of a file manager, to view a file and operate a corresponding file or folder. Alternatively, the user may directly operate a file in the widget of the file management, such as tapping a share button to implement file sharing. Optionally, if the user directly returns to the desktop when viewing a file, without closing the file, the desktop may further display a widget of file management as shown in FIG. 14B. When the user taps a pull-down menu of Document 1, buttons "Share" and "Copy to" may be displayed in the pull-down menu of Document 1, and the user may directly tap the button "Share" or "Copy to" to implement a corresponding operation. If the user swipes the widget of the file management to the left, it may be switched to a weather widget as shown in FIG. 14C.

Figure 15A:
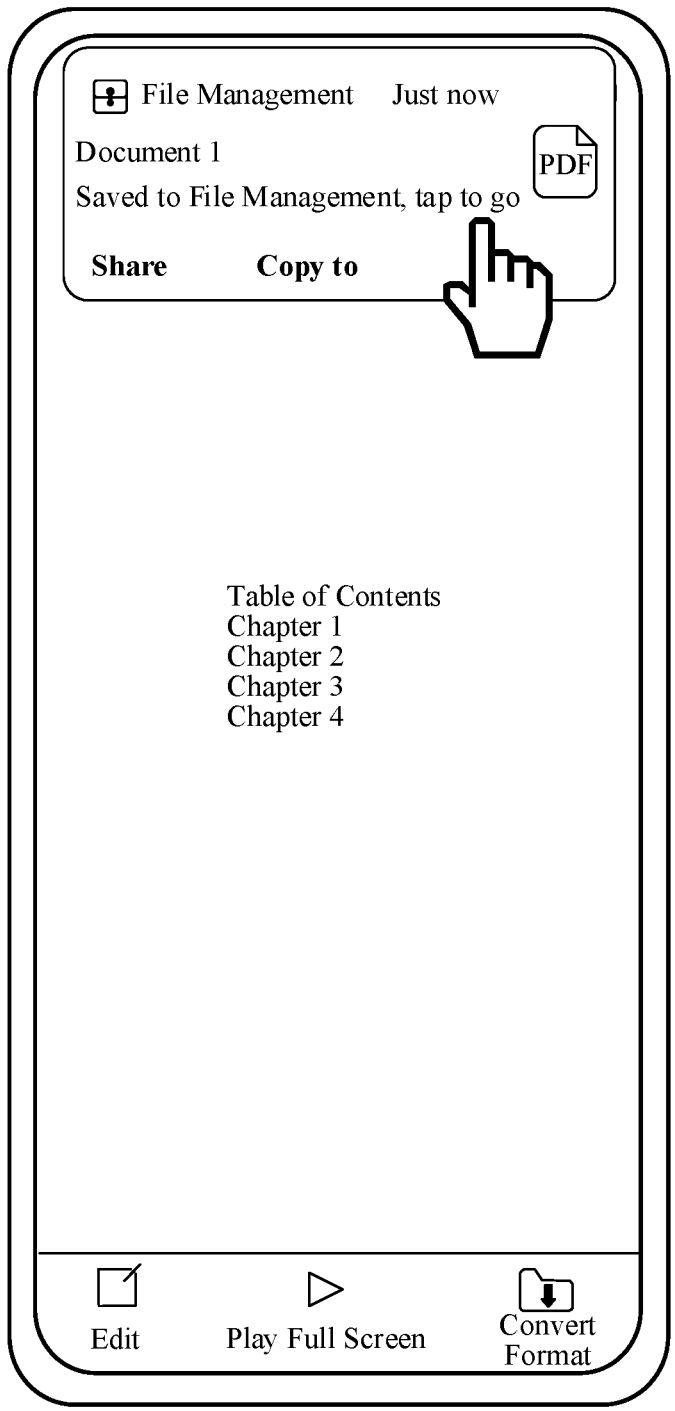
FIG. 15A to FIG. 15C are a schematic diagram of changes in an interface of a terminal device jumping to a file management APP based on a user operation according to an embodiment of this application.
Figure 15B:
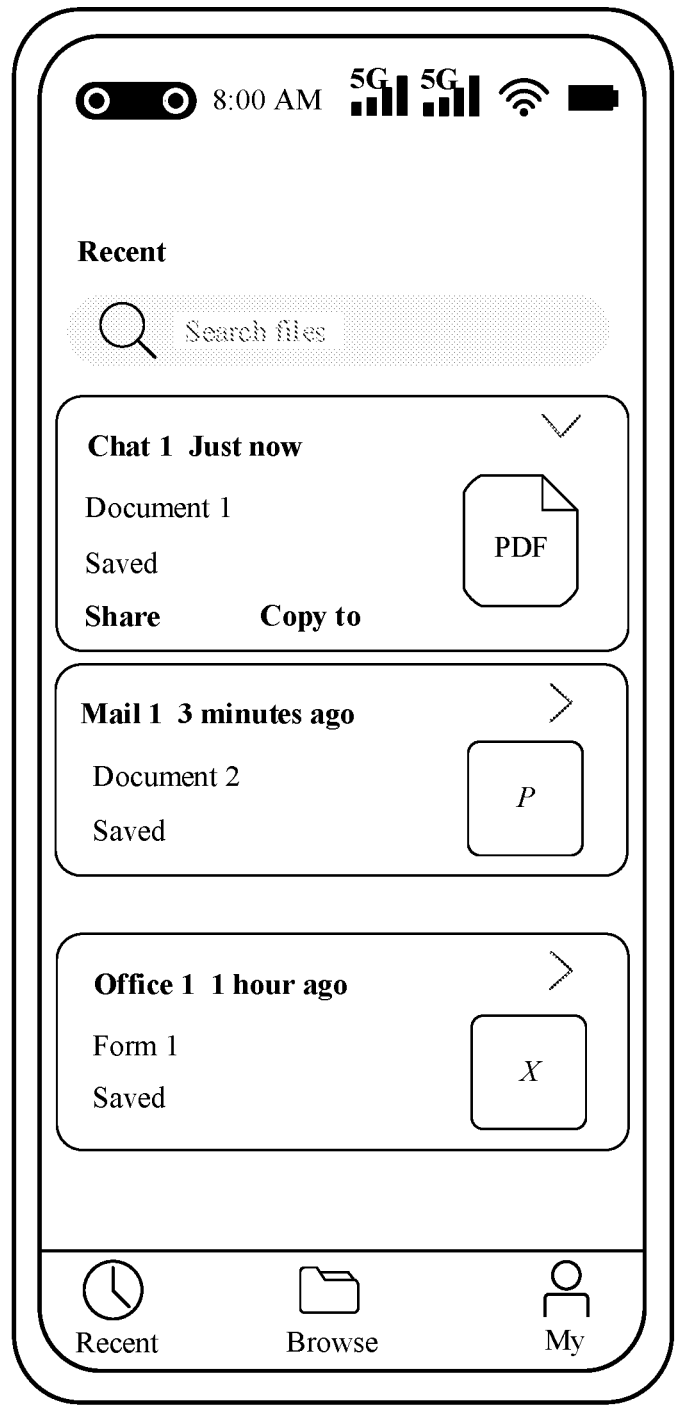
Figures 15A, 15C:
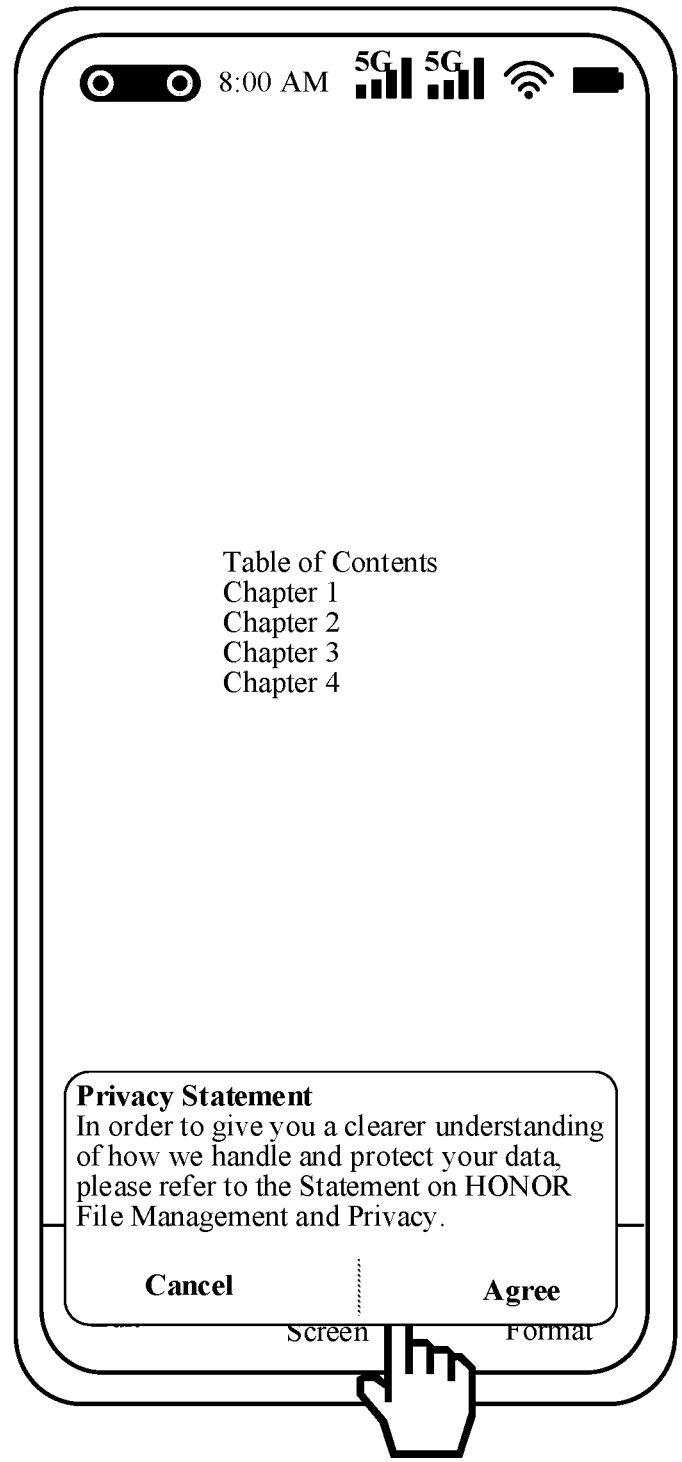

If the user taps a message body on a banner notification on an interface as shown in FIG. 15A, that is, if the user taps an area other than an area where the buttons "Share" and "Copy to" are located on the banner notification, the terminal device jumps to the interface of the file manager and displays a tab Recent of the file management APP as shown in FIG. 15B. The tab Recent of the file management APP may display an icon of Document 1 just received, and may further display other recently accessed files by the user. In FIG. 15B, an example in which the recently accessed files include Document 1 received through an APP of chat 1, Document 2 received through an APP of mail 1, and Form 1 received through an APP of office 1 is used to illustrate. The user may tap the button "Share" or "Copy to" to share a file or transfer a file to another folder. For details, refer to the description of the above embodiments. Details will not be repeated here. If the user opens an interface of a file management system for the first time, the terminal device may pop up a privacy statement interface as shown in FIG. 15C. If tapping "Agree", the user enters an interface of the file manager as shown in FIG. 15B. If tapping a button "Cancel", the terminal device abandons entering the interface of the file manager. The users may also view specific content of the statement by tapping "Statement on HONOR File Management and Privacy". In the method, by tapping a message body of a banner notification to enter an interface of a file management APP, and operating a widget of a newly received file in the interface of the file management APP, the file may be saved and shared without requiring the user to search a complex file storage path. This is easy and fast.

If the user taps "Share", "Copy to" on the banner notification or the message body of the banner notification, and the file has been deleted, for example, the file has been withdrawn by its sender or the file has been deleted in the file manager, the user may be prompted that the file does not exist.

Figure 16A:
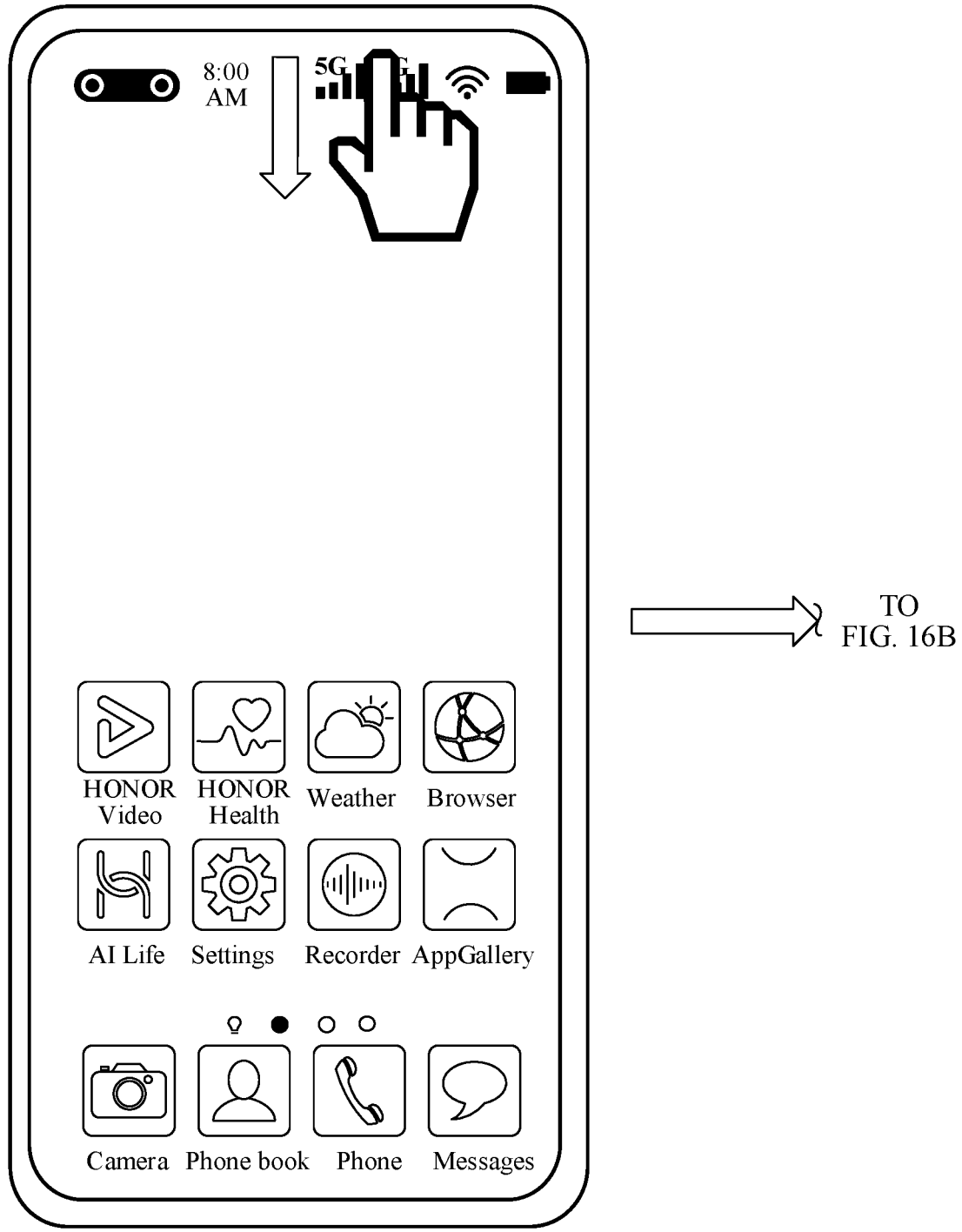
FIG. 16A to FIG. 16D are a schematic diagram of an interface of a terminal device displaying a widget of a file management APP in a pull-down notification bar according to an embodiment of this application.
Figure 16B:
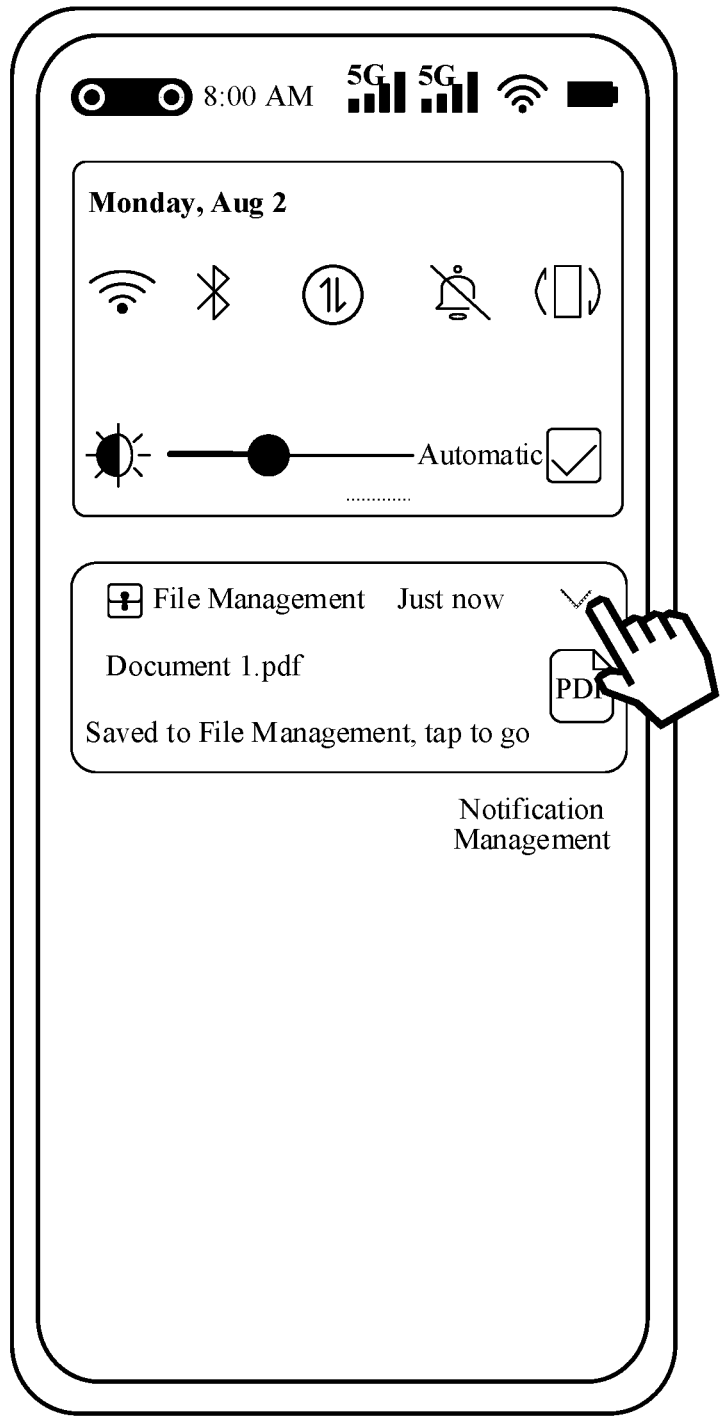
Figure 16C:
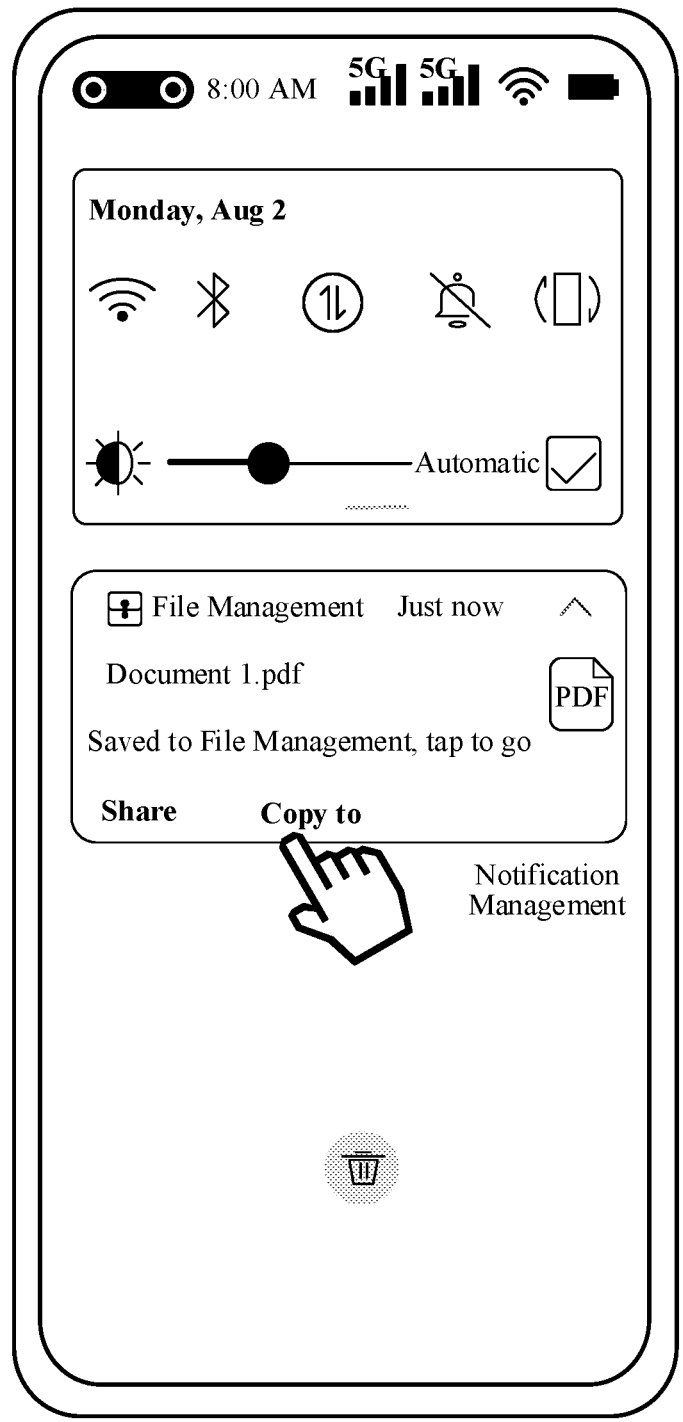
Figure 16D:
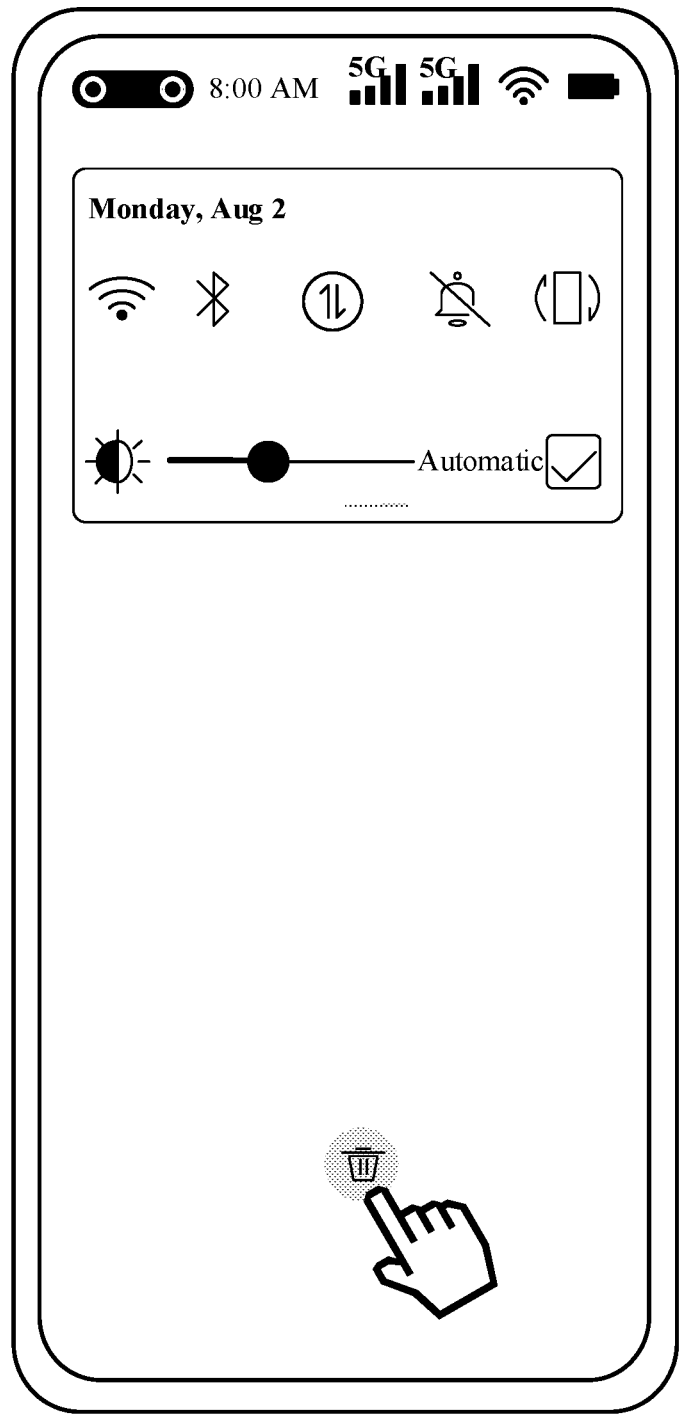
Figure 17A:
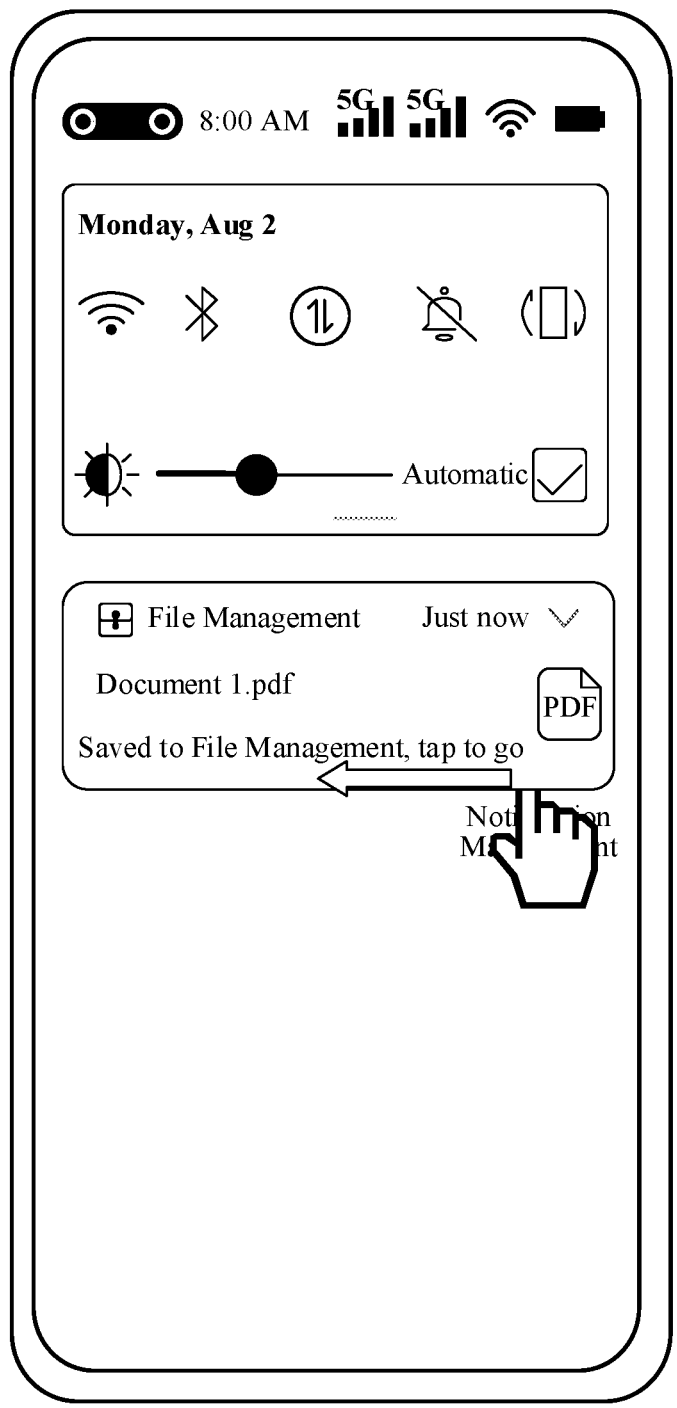
FIG. 17A and FIG. 17B are a schematic diagram of an interface of a terminal device managing a widget of a file management APP in an operation notification bar according to an embodiment of this application.
Figure 17B:
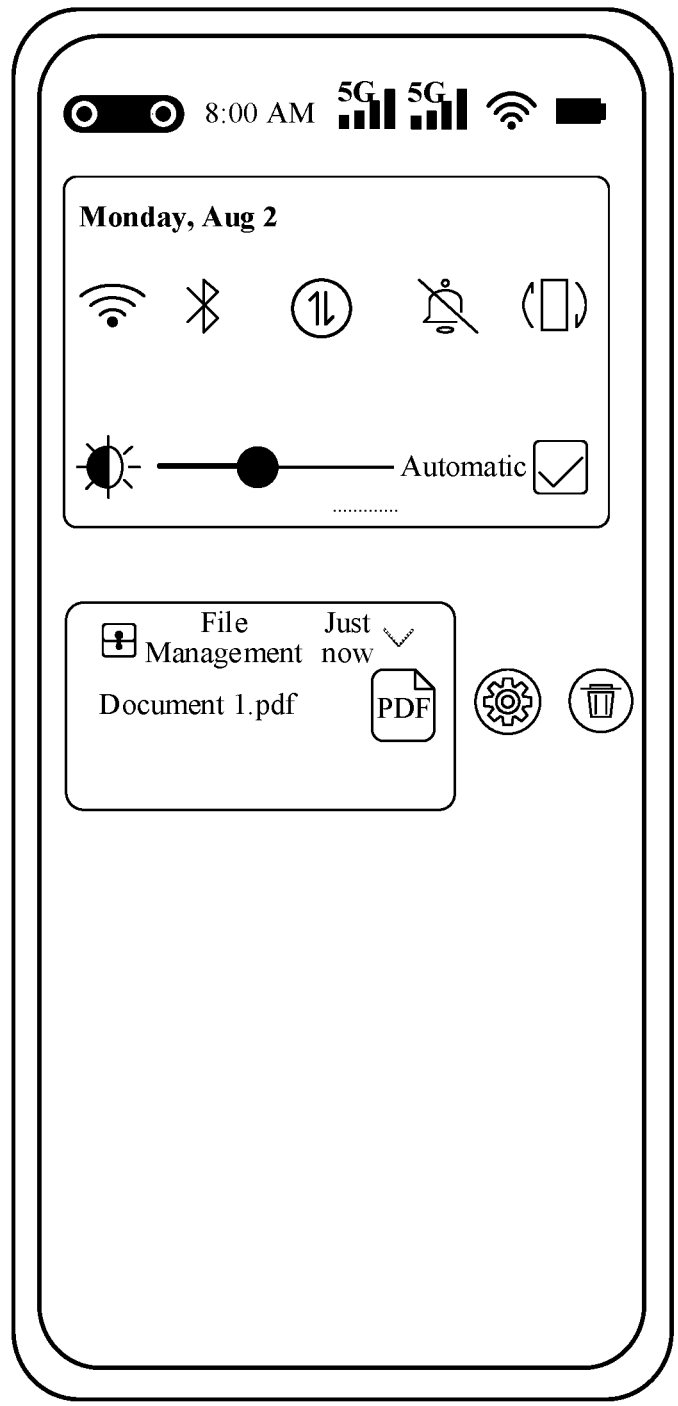

When the terminal device receives a new file through a third-party APP, the user may also pull down the notification bar to view a notification message that a file is received, and operate the notification message of the received file displayed on the notification bar. The user may also perform a pull-down operation at a top of an interface as shown in FIG. 16A to open the notification bar. The notification bar includes a floating window of a notification message of Document 1 that has just been received. A pull-down menu of each notification message in the pull-down notification bar is displayed merged by default, as shown in FIG. 16B. When the user taps a menu button on the floating window of Document 1, a button "Share" and a button "Copy to" shown in FIG. 16C are displayed in the floating window of Document 1. The user may separately operate the button "Share" and the button "Copy to" in the floating window of Document 1 to save and share Document 1. A specific process refers to embodiments in FIG. 8A to FIG. 11D, and will not be repeated here. If the user does not need to view the notification message, the notification message in the notification bar may be cleared by tapping a delete button on the notification bar as shown in FIG. 16D. After the user taps the delete button, the floating window of Document 1 in the notification bar disappears. Alternatively, if the user only does not want to view the notification message that Document 1 is received, the floating window of the notification message shown in FIG. 16B may be swiped to the left, such as an operation shown in FIG. 17A. In this way, the floating window of the notification message of Document 1 is indented to the left, and a set button and a delete button shown in FIG. 17B are displayed. The user may tap the delete button to delete the notification message, or tap the set button to set a reminding method of the notification message, such as turning off notifications, setting to silent notifications, delaying reminders, more settings, and canceling. In the method, a notification message indicating that a file has been received is operated in a pull-down notification bar, and the file may be saved and shared without requiring the user to search a complex file storage path. This is easy and fast.

Figure 18A:
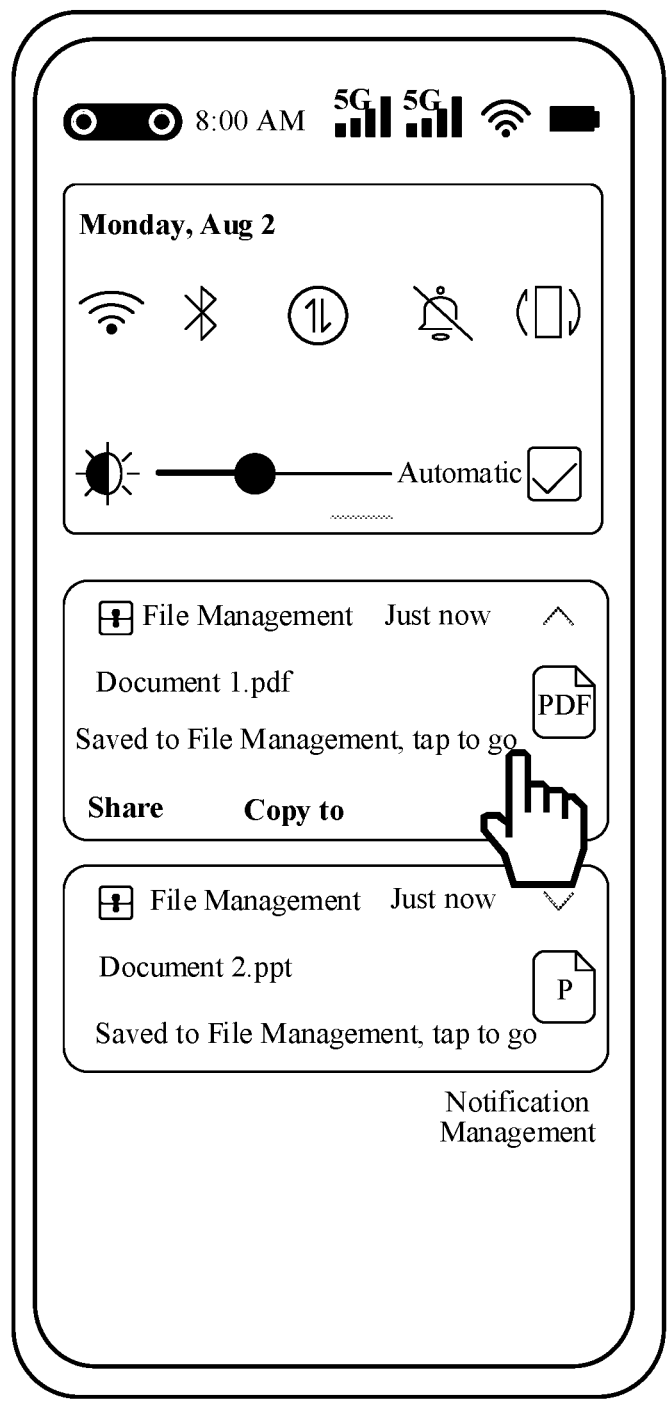
FIG. 18A and FIG. 18B are a schematic diagram of an interface of a widget of a file management APP after a terminal device operates on a file in a notification bar according to an embodiment of this application.
Figure 18B:
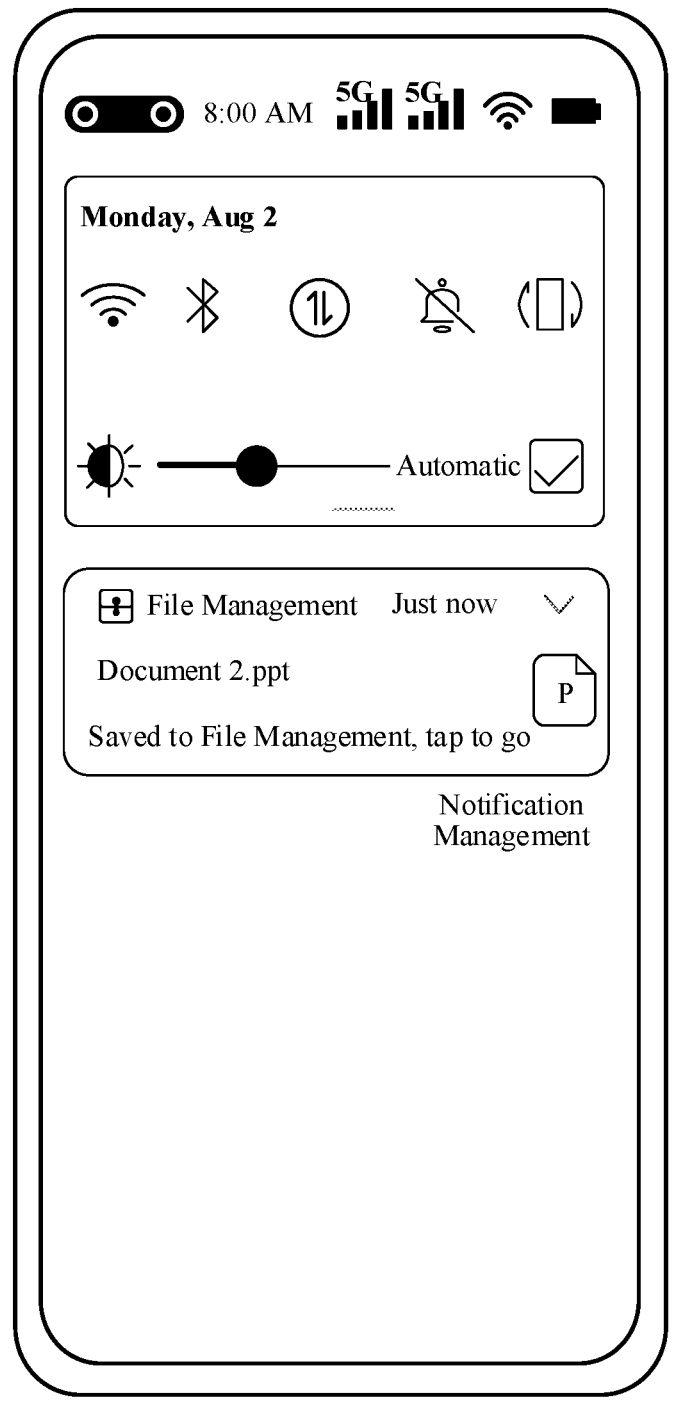

When the terminal device saves a plurality of files, a plurality of notification messages appear in the notification bar. If the user operates a notification message, the notification message is consumed and no longer appears in the notification bar. Taking FIG. 18A as an example, notification messages of Document 1 and Document 2 are displayed in the notification bar. In this case, after the user taps to expand a share button or a copy button of Document 1 and taps any one of them, the terminal device performs a corresponding operation. A specific process refers to the foregoing embodiments, and will not be repeated here. For example, if the user taps a message body of the notification message of Document 1 to view content of Document 1, the notification message corresponding to Document 1 is consumed, and as shown in FIG. 18B, the notification message of Document 1 no longer appears in the notification bar, while the notification message of Document 2 is still displayed normally.

When a number of files received by the terminal device for a fixed period of time exceeds a preset threshold, it is believed that too frequent reminding does not make sense for the user, and the terminal device may cancel reminding of the banner notification and resume the reminding after a period of time. For example, if the terminal device receives more than 25 files in one minute, the terminal device pauses the reminding of the banner notification for one minute. If the terminal device receives more than 25 files within one minute again after the reminding is resumed, the reminding of the banner notification is paused for another five minutes. Analogously, if the terminal device receives more than 25 files for the third time within one minute after the reminding is resumed, the time for pausing the reminder of the banner notification may be extended gradually, for example, it may be increased to ten minutes, twenty minutes, and so on.

The foregoing embodiment is illustrated by using an example in which a terminal device receives a file in a chat APP. Technical solutions of this application may further be to save and share a file received through another third-party application. For example, when a user accesses a web page using a browser, and taps a link of a file, a terminal device automatically downloads the file. When downloading is completed, the terminal device may use a default application to open the file, and simultaneously, a banner notification may be displayed to prompt the user that downloading of the file is completed. For another example, when the user operates the terminal device and opens an attachment of an email in a mailbox, the terminal device automatically downloads the attachment. When downloading of the attachment is completed, the terminal device may use a default application to open the file, and simultaneously, a banner notification may be displayed to prompt the user that downloading of the file is completed. At the same time, a notification of downloading a new file may also be displayed in the notification bar. The user may save and share the file by operating the banner notification or operating a floating window, in the notification bar, of a notification message that a file is received.

In embodiments of this application, when a user performs an operation such as "Save as", "Copy to" or "Transfer" on a file, a terminal device stores the file in "My Folder" by default. "My Folder" may be backed up by a backup tool of an Android system, and the file will not be cleaned up as a junk file.

When a terminal device is in a process of cloning, the terminal device does not need to remind of a received file. For example, when cloning for replacement, the terminal device may turn off a service switch of its file manager.

In solutions of embodiments of this application, a file is stored in "My Folder", and the file does not need to be stored repeatedly. Instead, a path specified by a user is regenerated for an existing file that has been stored in a default path, so that the user can find the file based on the specified path. In this way, repeated storage of a file may be avoided, and it is convenient for a user to find a file. Storage space is effectively utilized, and utilization of storage space of a terminal device is improved.

Figure 19:
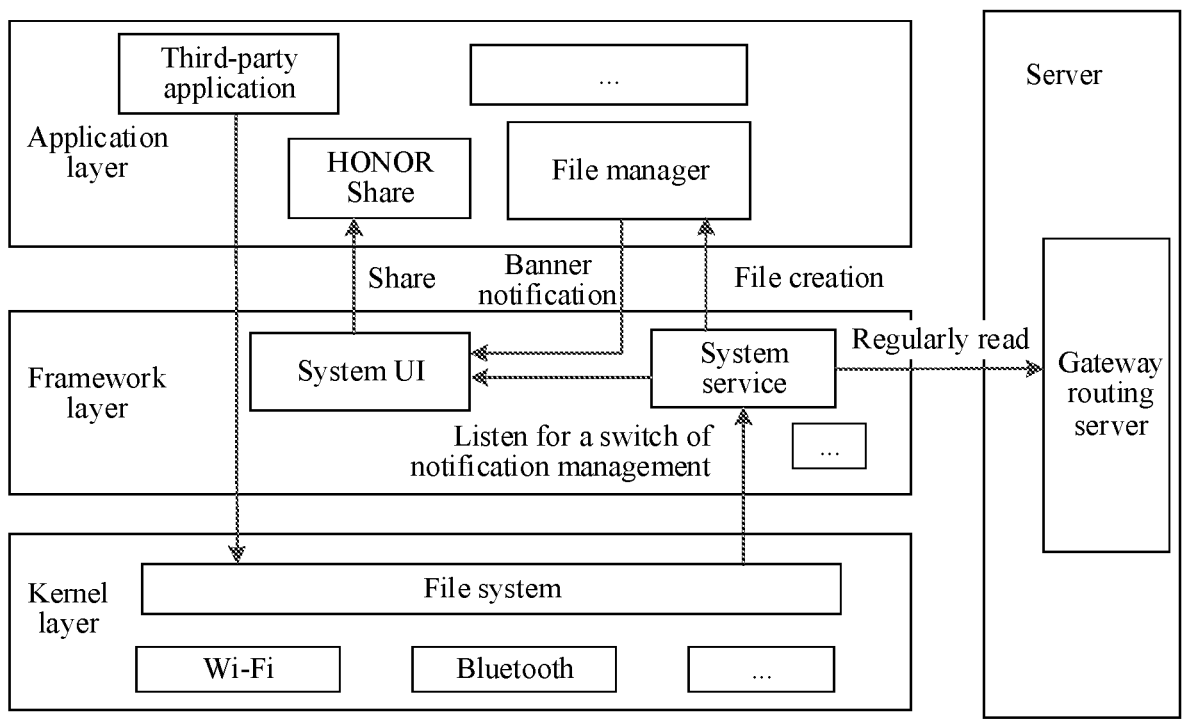
FIG. 19 is a diagram of a software architecture according to an embodiment of this application.

To implement the foregoing solutions, FIG. 19 shows a diagram of a software architecture according to an embodiment of this application. The software architecture includes an application layer, a framework layer, and a kernel layer. The framework layer includes at least a system user interface (system UI) and a system service (hwsystemserver). The application layer includes at least a plurality of third-party APPs, an HONOR Share APP, and a file management APP (i.e., a file manager). The kernel layer includes at least a Bluetooth module, a Wi-Fi module, and a file system.

When a terminal device is started, the system service is started, and a resident file monitoring service FileMonitorService in the system service is configured to obtain a switch of file management service. When the switch of the file management service is turned on for the first time, configuration information of listening paths corresponding to third-party APPs is first obtained from a gateway routing server (gatewayroutingserver, GRS) through a cloud service, and thereafter, the configuration information of the listening paths corresponding to the third-party APPs (i.e., default paths for file storage after the third-party APPs receives a file) is obtained from the GRS server through the cloud service regularly. When the switch of the file management service is turned on, the FileMonitorService uses a file listener (fileobserver) to listen for changes in a file in a listening path in the file system. When identifying a new file, the file listener filters based on a corresponding preset file type, and filters out a file that does not belong to a file type of a listening object. When the switch of the file management service is turned off, the listening path is no longer obtained, and the changes in the file in the listening path are no longer obtained through the FileObserver. Optionally, the switch of the file management service is on by default, and can be manually turned off by the user in the file manager. The fileobserver no longer listens for changes in a file after turning off. The file management service may be closed in the following manner. The notification bar as shown in FIG. 17A is pulled down by the user and is displayed. The widget of the notification message is swiped to the left, and the terminal device displays the set button in the widget of the notification message as shown in FIG. 17B. The user taps the set button to pop up a setting menu for the notification message, and the user taps a button for closing notifications in the setting menu. In this way, the file management service is closed. The file system is configured to manage all files in the terminal device, for example, to store or delete a file received by a third-party APP based on a path. After listening a new valid file, the system service is configured to broadcast a message of the new file to the file manager, and the file manager pulls up a banner notification and displays the banner notification on the system UI. The system UI is configured to display a notification message of a new file in a form of a banner notification, and display the notification message of the new file in a form of a notification message in a notification bar, and to save a file to a specified file directory by receiving the user's operation of copying the file. The system UI is further configured to pull up an HONOR Share APP based on the user's sharing operation, to implement file sharing.

Figure 20:
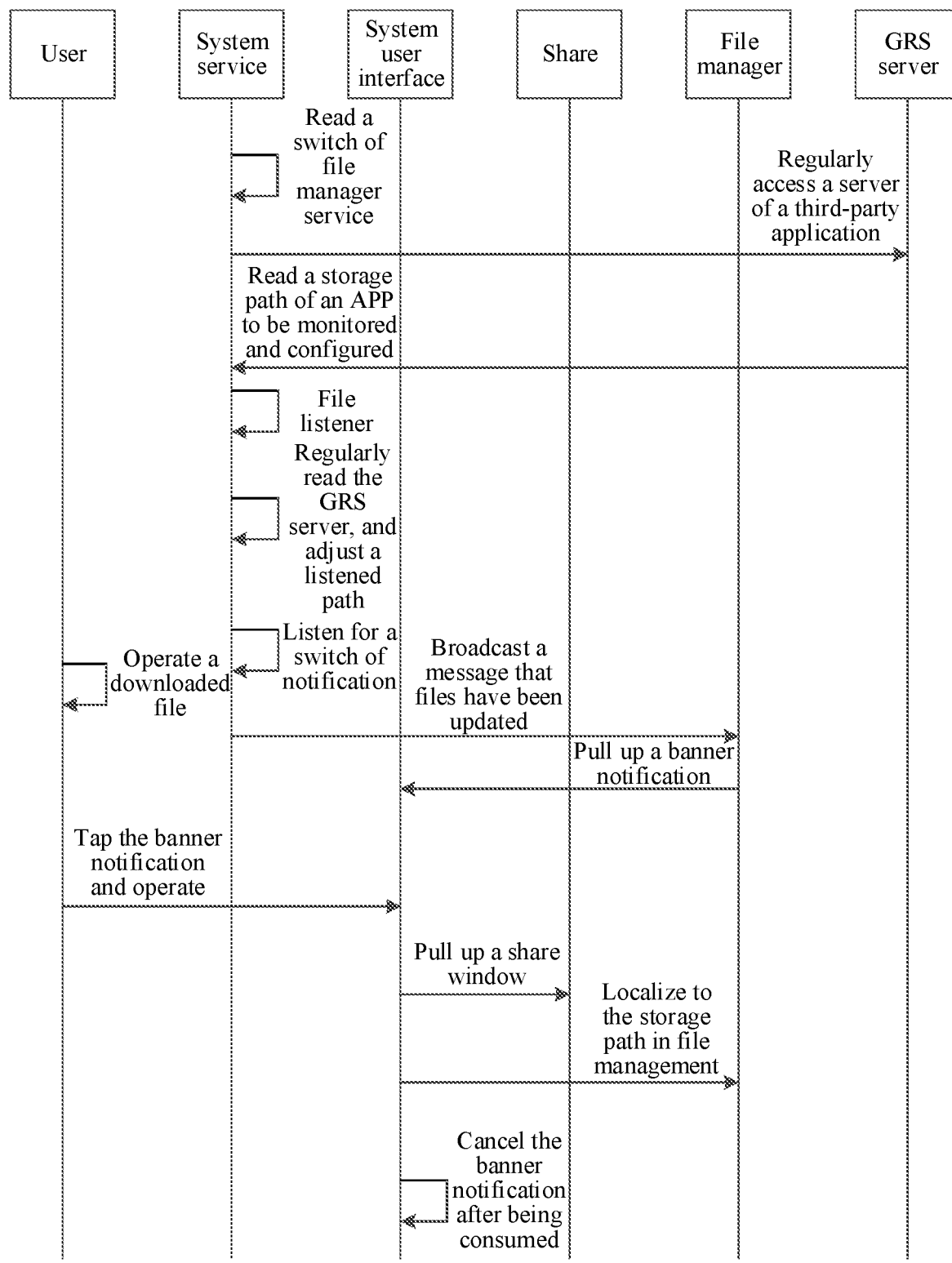
FIG. 20 is a schematic diagram of an interaction procedure of file management according to an embodiment of this application.

To more clearly describe an implementation process of solutions of this application, the solutions of this application are described in detail below, in conjunction with an interactive diagram shown in FIG. 20. As shown in FIG. 20, the system service reads the switch of the file management service through the FileMonitorService. If the switch is on, the system service regularly accesses the GRS server corresponding to a third-party APP, reads information such as a default storage path of a file of an APP to be monitored and configured, a file name, and a file type, feedbacks the information to the file manager, and adjusts a monitoring path in time. If there is online public opinion, the cloud service may adjust configuration of the monitoring path to null, and cancel monitoring a file in the monitoring path. The system service obtains changes in a file in the monitoring path through the FileObserver in the FileMonitorService. In other words, the system service monitors whether a new file is generated in the monitoring path. If the system service determines that a listening notification is on, when there is a new file in a default storage path of a file of an APP, the system service will use a broadcast message (including a file name, type, and path) to notify that the file manager has a new file, and pull up the file manager's service. At this time, the file manager sends a banner notification to the system UI, and the system UI displays the banner notification. When the user taps the banner notification, the system UI may pull up a share window for file sharing, or navigate to the storage path of the file manager to save the file. When the banner notification is operated by the user (that is, after the notification message is consumed), the banner notification can be cancelled to free up resources.

Figure 21:
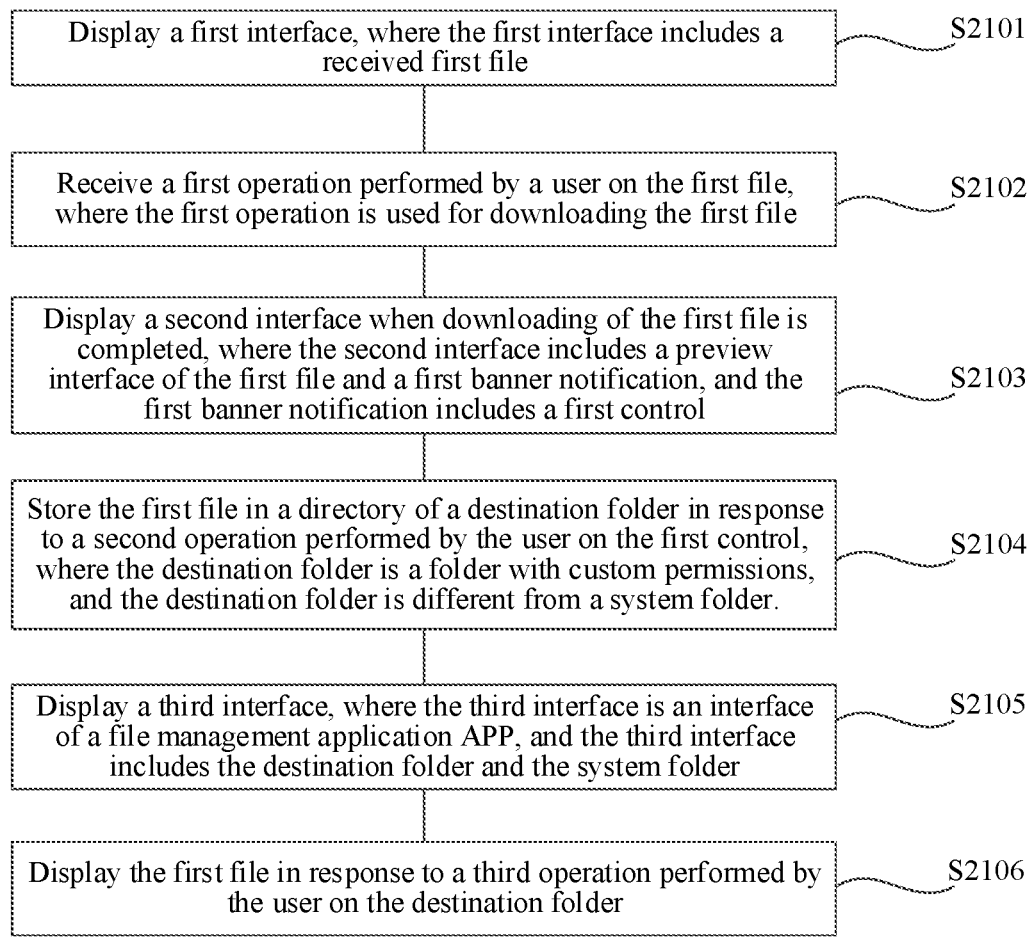
FIG. 21 is a schematic flowchart of a file management method according to an embodiment of this application.

In an embodiment, the method of this application may be shown in FIG. 21. The method includes the following steps.

S2101: Display a first interface, where the first interface includes a received first file.

S2102: Receive a first operation performed by a user on the first file, where the first operation is used for downloading the first file.

S2103: Display a second interface when downloading of the first file is completed, where the second interface includes a preview interface of the first file and a first banner notification, and the first banner notification includes a first control.

S2104: Store the first file in a directory of a destination folder in response to a second operation performed by the user on the first control, where the destination folder is a folder with custom permissions, and the destination folder is different from a system folder.

S2105: Display a third interface, where the third interface is an interface of a file management application APP, and the third interface includes the destination folder and the system folder.

S2106: Display the first file in response to a third operation performed by the user on the destination folder.

For a technical principle and a technical effect of this embodiment, refer to the foregoing embodiments. Details will not be repeated here.

Examples of the methods provided in this application are described in detail above. It may be understood that, to implement the foregoing functions, the corresponding apparatus includes a corresponding hardware structure and/or software module for performing each function. A person skilled in the art should be easily aware that units, algorithms, and steps in the examples described with reference to the embodiments disclosed herein can be implemented by hardware or a combination of hardware and computer software in this application. Whether a function is performed by hardware or hardware driven by computer software depends on particular application and design constraint conditions of the technical solutions. A person skilled in the art may use different methods to implement the described functions for each particular application, but it should not be considered that the implementation goes beyond a scope of this application.

In this application, the foregoing file management apparatus may be divided into functional modules based on the foregoing method examples. For example, functional modules may be obtained through division based on functions, or two or more functions may be integrated into one module. The integrated module may be implemented in a form of hardware, or may be implemented in a form of a software functional module. It should be noted that module division in this application is an example, and is merely logical function division. In actual implementation, there may be another division manner.

Figure 22:
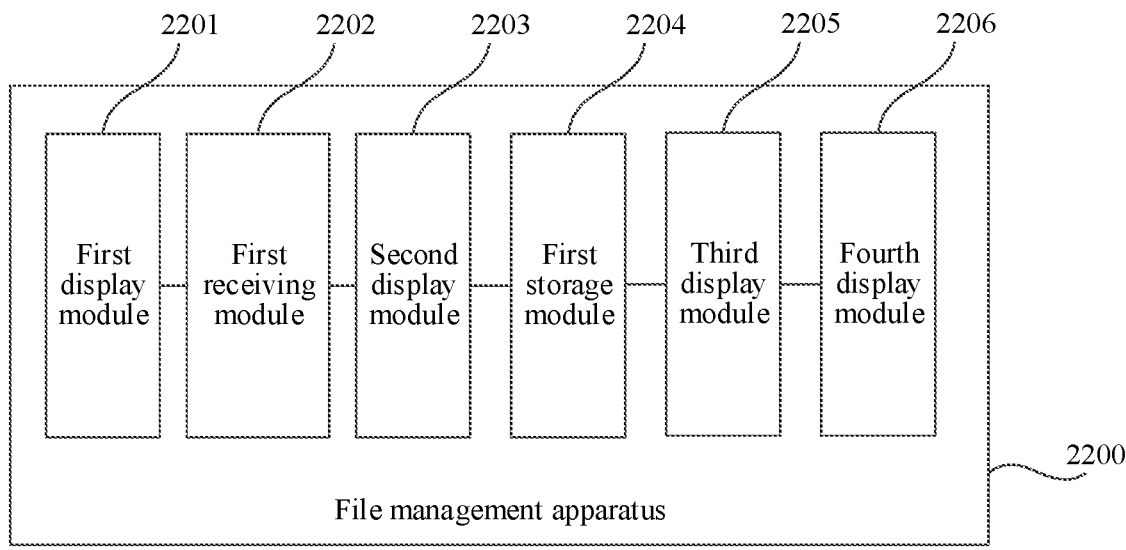
FIG. 22 is a schematic diagram of a structure of a file management apparatus according to an embodiment of this application.

FIG. 22 is a schematic diagram of a structure of a file management apparatus according to this application. The apparatus 2200 includes:
- a first display module 2201, configured to display a first interface, where the first interface includes a received first file;
- a first receiving module 2202, configured to receive a first operation performed by a user on the first file, where the first operation is used for downloading the first file;
- a second display module 2203, configured to display a second interface when downloading of the first file is completed, where the second interface includes a preview interface of the first file and a first banner notification, and the first banner notification includes a first control;
- a first storage module 2204, configured to store the first file in a directory of a destination folder in response to a second operation performed by the user on the first control, where the destination folder is a folder with custom permissions, and the destination folder is different from a system folder;
- a third display module 2205, configured to display a third interface, where the third interface is an interface of a file management application APP, and the third interface includes the destination folder and the system folder; and a fourth display module 2206, configured to display the first file in response to a third operation performed by the user on the destination folder.

Optionally, the apparatus 2200 further includes: a second receiving module, configured to receive a fourth operation performed by the user on a second file, where the fourth operation is used for downloading the second file, and the second file is different form the first file;
- a fifth display module, configured to display a fourth interface when downloading of the second file is completed, where the fourth interface includes a preview interface of the second file and a second banner notification; and a second storage module, configured to store the second file in the system folder based on a default path.

Optionally, the first banner notification further includes a second control, and the apparatus 2200 further includes:
- a sixth display module, configured to display a fifth interface in response to a fifth operation performed by the user on the second control, where the fifth interface includes the preview interface of the first file and a share window, the share window includes icons of a plurality of share objects, and the icons of the plurality of share objects include an icon of a target object;
- a seventh display module. configured to display an operation interface of the target object in response to a sixth operation performed by the user on the icon of the target object; and
- a sending module, configured to send the first file to the target object in response to a seventh operation performed by the user on the operation interface of the target object.

Optionally, the target object is a target APP.

Optionally, the target object is a target device.

Optionally, the first storage module 2204 is specifically configured to display a sixth interface in response to the second operation performed by the user on the first control, where the sixth interface includes an interface of a root directory of the destination folder and a first prompt box, and the first prompt box includes a third control; and store the first file in the root directory of the destination folder in response to an eighth operation performed by the user on the third control.

Optionally, the first storage module 2204 is specifically configured to display a seventh interface in response to a ninth operation performed by the user on a first folder in the sixth interface, where the seventh interface includes the interface of the root directory of the destination folder and a second prompt box, the second prompt box includes a fourth control, and the first folder is a folder in the root directory of the destination folder; and store the first file in a directory of the first folder in response to a tenth operation performed by the user on the fourth control.

Optionally, the apparatus 2200 further includes:
- an eighth display module, configured to display an eighth interface in response to an eleventh operation performed by the user, where the eighth interface includes a first notification message of the first file; and display a first control and a second control of the first notification message in response to a twelfth operation performed by the user on a menu button of the first notification message.

Optionally, the apparatus 2200 further includes:
- a ninth display module, configured to display a ninth interface in response to a twelfth operation performed by the user on the first banner notification, where the ninth interface is the interface of the file management APP, and the ninth interface includes a widget of the first file; and display the first control and the second control in response to a thirteenth operation performed by the user on a menu button of the widget of the first file.

Optionally, the first file is any one of a document, a picture, a video, audio, an installation package, and a compressed package.

Optionally, the first interface is a chat interface.

Optionally, the first interface is an inbox interface for email.

Optionally, the first interface is an interface of a web page including a download link.

Optionally, the first banner notification is displayed at a top of a screen.

Optionally, the apparatus 2200 further includes a system service, a file manager, a system UI, and a display module.

The system service is configured to read a switch of a file management service.

When the switch of the file management service is on, the system service regularly accesses a server corresponding to a third-party APP, to obtain a default save path of the first file, where the default save path is a path in a directory of the system folder.

The system service is configured to monitor whether the first file is generated in the default save path.

If the first file is generated in the default save path, the system service sends a file update message to a file manager.

In response to the file update message, the file manager sends the first banner notification to a system user interface UI.

The system UI is configured to display the first banner notification, where the first banner notification includes a share button and a copy button.

In response to a tap operation performed by the user on the share button, the file manager stores the first file in the directory of the destination folder, where the destination folder is a folder with custom permissions, and the destination folder is different from the system folder.

In response to the tap operation performed by the user on the share button, the system UI displays the share window, where the share window includes the icons of the plurality of share objects, and the icons of the plurality of share objects include the icon of the target object.

In response to a tap operation performed by the user on the icon of the target object, the display module displays the operation interface of the target object.

In response to a share operation performed by the user on the operation interface of the target object, the file manager sends the first file to the target object.

The display module is configured to display the interface of the file management APP, and the interface of the file management APP includes the destination folder and the system folder.

In response to a select operation performed by the user on the destination folder, the display module displays the first file.

Optionally, the system service is further configured to monitor whether the second file is generated in the default save path.

If the second file is generated in the default save path, the display module displays the second file in response to a multi-level select operation performed by the user on the system folder based on the default save path.

For a specific manner in which the apparatus 2200 perform the file management method and resulting beneficial effects, refer to related descriptions in the method embodiments. Details will not be repeated here.

An embodiment of this application further provides an electronic device, including the processor. The electronic device provided in this embodiment may be the terminal device 100 shown in FIG. 1, and is configured to perform the foregoing file management method. When an integrated unit is used, the terminal device may include a processing module, a storage module, and a communication module. The processing module may be configured to control and manage an action of the terminal device, for example, may be configured to support the terminal device in performing steps performed by a display unit, a detection unit, and a processing unit. The storage module may be configured to support the terminal device in storing program code, data, and the like. The communication module may be configured to support communication between the terminal device and another device.

The processing module may be a processor or controller. The processing module can implement or execute various example logical blocks, modules, and circuits described with reference to content disclosed in this application. The processor may alternatively be a combination for implementing computing functions, for example, a combination of one or more microprocessors, a combination of a digital signal processor (digital signal processing, DSP) and a microprocessor. The storage module may be a memory. The communication module may specifically be a radio frequency circuit, a Bluetooth chip, a Wi-Fi chip, or another device that interacts with another terminal device.

In an embodiment, when the processing module is a processor and the storage module is a memory, the terminal device in this embodiment may be a device be of the structure shown in FIG. 1.

An embodiment of this application further provides a computer-readable medium.

The computer-readable medium stores a computer program, and when the computer program is executed by a processor, the processor is enabled to perform file management methods according to any one of the foregoing embodiments.

An embodiment of this application further provides a computer program product.

When the computer program product is run on a computer, the computer is enabled to perform the related steps, to implement file management methods in the foregoing embodiments.

The electronic device, the computer-readable storage medium, the computer program product, or the chip provided in embodiments of this application may be configured to perform the corresponding method provided above. Therefore, for beneficial effects that can be achieved, refer to the beneficial effects of the corresponding method provided above. Details will not be repeated here.

In the several embodiments provided in this application, it should be understood that the disclosed apparatus and method may be implemented in other manners. For example, the described apparatus embodiment is merely an example. For example, the module or the unit division is merely a logical function division and may be another division in an actual implementation. For example, a plurality of units or components may be combined or integrated into another apparatus, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When an integrated unit is implemented in a form of a software function unit and sold or used as an independent product, the integrated unit may be stored in a readable storage medium. Based on such an understanding, the technical solutions in embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of claims.

What is claimed is:

1. A file management method, comprising:
    displaying a first interface, wherein the first interface comprises an indication of a received first file;
    receiving a first operation performed by a user on the indication of the first file, wherein the first operation is used for downloading the first file;
    displaying a second interface when downloading of the first file is completed, wherein the second interface comprises a preview interface of the first file and a first banner notification, and the first banner notification comprises a first control;
    storing the first file in a directory of a destination folder in response to a second operation performed by the user on the first control, wherein the destination folder is a folder with custom permissions, and the destination folder is different from a system folder;
    displaying a third interface, wherein the third interface is an interface of a file management application (APP), and the third interface comprises an indication of the destination folder and an indication of the system folder; and
    displaying the first file in response to a third operation performed by the user on the indication of the destination folder.

2. The method according to claim 1, wherein the method further comprises:
    receiving a fourth operation performed by the user on an indication of a second file, wherein the fourth operation is used for downloading the second file, and the second file is different from the first file;
    displaying a fourth interface when downloading of the second file is completed, wherein the fourth interface comprises a preview interface of the second file and a second banner notification; and
    storing the second file in the system folder based on a default path.

3. The method according to claim 1, wherein the first banner notification further comprises a second control, and the method further comprises:

displaying a fifth interface in response to a fifth operation performed by the user on the second control, wherein the fifth interface comprises the preview interface of the first file and a share window, the share window comprises icons of a plurality of share objects, and the icons of the plurality of share objects comprise an icon of a target object;

displaying an operation interface of the target object in response to a sixth operation performed by the user on the icon of the target object; and sending the first file to the target object in response to a seventh operation performed by the user on the operation interface of the target object.

4. The method according to claim 3, wherein the target object is a target APP.

5. The method according to claim 3, wherein the target object is a target device.

6. The method according to claim 1, wherein the storing the first file in a directory of a destination folder in response to a second operation performed by the user on the first control comprises:

displaying a sixth interface in response to the second operation performed by the user on the first control, wherein the sixth interface comprises an interface of a root directory of the destination folder and a first prompt box, and the first prompt box comprises a third control; and storing the first file in the root directory of the destination folder in response to an eighth operation performed by the user on the third control.

7. The method according to claim 6, wherein the method further comprises:

displaying a seventh interface in response to a ninth operation performed by the user on a first folder in the sixth interface, wherein the seventh interface comprises the interface of the root directory of the destination folder and a second prompt box, the second prompt box comprises a fourth control, and the first folder is a folder in the root directory of the destination folder; and storing the first file in a directory of the first folder in response to a tenth operation performed by the user on the fourth control.

8. The method according to claim 1, wherein the method further comprises:

displaying an eighth interface in response to an eleventh operation performed by the user, wherein the eighth interface comprises a first notification message of the first file; and displaying a first control and a second control of the first notification message in response to a twelfth operation performed by the user on a menu button of the first notification message, wherein the second control is a control for pulling up a share window, and the share window comprises icons of a plurality of share objects.

9. The method according to claim 1, wherein the method further comprises:

displaying a ninth interface in response to a twelfth operation performed by the user on the first banner notification, wherein the ninth interface is the interface of the file management APP, and the ninth interface comprises a widget of the first file; and displaying the first control and a second control in response to a thirteenth operation performed by the user on a menu button of the widget of the first file, wherein the second control is a control for pulling up a share window, and the share window comprises icons of a plurality of share objects.

10. The method according to claim 1, wherein the first file is any one of a document, a picture, a video, audio, an installation package, or a compressed package.

11. The method according to claim 1, wherein the first interface is a chat interface.

12. The method according to claim 1, wherein the first interface is an inbox interface for email.

13. The method according to claim 1, wherein the first interface is an interface of a web page comprising a download link.

14. The method according to claim 1, wherein the first banner notification is displayed at a top of a screen.

15. The method according to claim 1, wherein the method further comprises:

reading, by a system service, a switch of a file management service;

when the switch of the file management service is on, regularly accessing, by the system service, a server corresponding to a third-party APP, to obtain a default save path of the first file, wherein the default save path is a path in a directory of the system folder;

monitoring, by the system service, whether the first file is generated in the default save path;

when the first file is generated in the default save path, sending, by the system service, a file update message to a file manager;

sending, by the file manager, the first banner notification to a system user interface (UI) in response to the file update message;

displaying, by the system UI, the first banner notification, wherein the first banner notification comprises a share button and a copy button;

storing, by the file manager, the first file in the directory of the destination folder in response to a tap operation performed by the user on the share button, wherein the destination folder is a folder with custom permissions, and the destination folder is different from the system folder;

displaying, by the system UI, a share window in response to the tap operation performed by the user on the share button, wherein the share window comprises icons of a plurality of share objects, and the icons of the plurality of share objects comprise an icon of a target object;

displaying, by a display module, an operation interface of the target object in response to a tap operation performed by the user on the icon of the target object;

sending, by the file manager, the first file to the target object in response to a share operation performed by the user on the operation interface of the target object;

displaying, by the display module, the interface of the file management APP, wherein the interface of the file management APP comprises the destination folder and the system folder; and displaying, by the display module, the first file in response to a select operation performed by the user on the destination folder.

16. An electronic device, comprising a processor, a memory, and an interface;

wherein the processor, the memory, and the interface cooperate with each other, to enable the electronic device to perform the following steps:

displaying a first interface, wherein the first interface comprises an indication of a received first file;

receiving a first operation performed by a user on the indication of the first file, wherein the first operation is used for downloading the first file;

displaying a second interface when downloading of the first file is completed, wherein the second interface comprises a preview interface of the first file and a first banner notification, and the first banner notification comprises a first control;

storing the first file in a directory of a destination folder in response to a second operation performed by the user on the first control, wherein the destination folder is a folder with custom permissions, and the destination folder is different from a system folder;

displaying a third interface, wherein the third interface is an interface of a file management application APP, and the third interface comprises an indication of the destination folder and an indication of the system folder; and displaying the first file in response to a third operation performed by the user on the indication of the destination folder.

17. The electronic device according to claim 16, wherein the electronic device further performs the following steps:

receiving a fourth operation performed by the user on an indication of a second file, wherein the fourth operation is used for downloading the second file, and the second file is different from the first file;

displaying a fourth interface when downloading of the second file is completed, wherein the fourth interface comprises a preview interface of the second file and a second banner notification; and storing the second file in the system folder based on a default path.

18. The electronic device according to claim 16, wherein the electronic device further performs:

displaying a fifth interface in response to a fifth operation performed by the user on a second control, wherein the fifth interface comprises the preview interface of the first file and a share window, the share window comprises icons of a plurality of share objects, and the icons of the plurality of share objects comprise an icon of a target object;

displaying an operation interface of the target object in response to a sixth operation performed by the user on the icon of the target object; and sending the first file to the target object in response to a seventh operation performed by the user on the operation interface of the target object.

19. The electronic device according to claim 18, wherein the target object is a target APP or a target device.

20. A non-transitory computer-readable storage medium, wherein the non-transitory computer-readable storage medium stores a computer program; and when the computer program is executed by a processor, the processor is enabled to implement:

displaying a first interface, wherein the first interface comprises an indication of a received first file;

receiving a first operation performed by a user on the indication of the first file, wherein the first operation is used for downloading the first file;

displaying a second interface when downloading of the first file is completed, wherein the second interface comprises a preview interface of the first file and a first banner notification, and the first banner notification comprises a first control;

storing the first file in a directory of a destination folder in response to a second operation performed by the user on the first control, wherein the destination folder is a folder with custom permissions, and the destination folder is different from a system folder;

displaying a third interface, wherein the third interface is an interface of a file management application (APP), and the third interface comprises an indication of the destination folder and an indication of the system folder; and displaying the first file in response to a third operation performed by the user on the indication of the destination folder.

* * * * *